US011356643B2

(12) United States Patent
Goulden et al.

(10) Patent No.: US 11,356,643 B2
(45) Date of Patent: Jun. 7, 2022

(54) SYSTEMS AND METHODS OF PRESENTING APPROPRIATE ACTIONS FOR RESPONDING TO A VISITOR TO A SMART HOME ENVIRONMENT

(71) Applicant: Google LLC, Mountain View, CA (US)

(72) Inventors: Jason Evans Goulden, Los Gatos, CA (US); Rengarajan Aravamudhan, Sunnyvale, CA (US); Hae Rim Jeong, San Francisco, CA (US); Michael Dixon, Sunnyvale, CA (US); James Edward Stewart, Mountain View, CA (US); Sayed Yusef Shafi, San Jose, CA (US); Sahana Mysore, Menlo Park, CA (US); Seungho Yang, Mountain View, CA (US); Yu-An Lien, Mountain View, CA (US); Christopher Charles Burns, Santa Clara, CA (US); Rajeev Conrad Nongpiur, Palo Alto, CA (US); Jeffrey Boyd, San Rafael, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/400,887

(22) Filed: Aug. 12, 2021

(65) Prior Publication Data

US 2021/0377493 A1    Dec. 2, 2021

Related U.S. Application Data

(63) Continuation of application No. 15/809,900, filed on Nov. 10, 2017, now Pat. No. 11,134,227.

(51) Int. Cl.
*H04N 7/18* (2006.01)
*G05B 15/02* (2006.01)
(Continued)

(52) U.S. Cl.
CPC ............. *H04N 7/186* (2013.01); *G05B 15/02* (2013.01); *G06K 9/00362* (2013.01); *G06K 9/78* (2013.01);
(Continued)

(58) Field of Classification Search
CPC combination set(s) only.
See application file for complete search history.

(56) References Cited

U.S. PATENT DOCUMENTS 4,967,046 A    10/1990  Priesemuth
5,237,408 A    8/1993   Blum et al.
(Continued)

FOREIGN PATENT DOCUMENTS

CN    104794834 A   *  7/2015
CN    105612564       5/2016
(Continued)

OTHER PUBLICATIONS

Request for Examination from counterpart European Application No. 18172420.4, dated Sep. 17, 2019, 21 pp.
(Continued)

*Primary Examiner* — Joon Kwon
(74) *Attorney, Agent, or Firm* — Colby Nipper PLLC

(57) ABSTRACT

A method of presenting appropriate actions for responding to a visitor to a smart home environment via an electronic greeting system of the smart home environment, including detecting a visitor of the smart home environment; obtaining context information from the smart home environment regarding the visitor; based on the context information, identifying a plurality of appropriate actions available to a user of a client device for interacting with the visitor via the electronic greeting system; and causing the identified actions to be presented to the user of the client device.

20 Claims, 22 Drawing Sheets

(51) Int. Cl.
*G06K 9/00* (2006.01)
*G08B 7/06* (2006.01)
*G06K 9/78* (2006.01)
*H04M 11/02* (2006.01)
*G08B 13/196* (2006.01)
*G08B 3/10* (2006.01)
*H04N 7/14* (2006.01)
*G06F 3/0482* (2013.01)

(52) U.S. Cl.
CPC ............... *G08B 3/10* (2013.01); *G08B 7/06* (2013.01); *G08B 13/19656* (2013.01); *G08B 13/19684* (2013.01); *H04M 11/02* (2013.01); *H04M 11/025* (2013.01); *G06F 3/0482* (2013.01); *G08B 13/19695* (2013.01); *H04N 7/141* (2013.01)

(56) References Cited

U.S. PATENT DOCUMENTS

| | | |
|---|---|---|
| D339,543 S | 9/1993 | Martin |
| 6,046,745 A | 4/2000 | Moriya et al. |
| 6,144,375 A | 11/2000 | Jain et al. |
| D450,059 S | 11/2001 | Itou |
| 6,366,296 B1 | 4/2002 | Boreczky et al. |
| 6,400,378 B1 | 4/2002 | Snook |
| 6,424,370 B1 | 7/2002 | Courtney |
| 6,476,858 B1 | 11/2002 | Ramirez Diaz et al. |
| 6,496,598 B1 | 12/2002 | Harman |
| 6,535,793 B2 | 3/2003 | Allard |
| 6,571,050 B1 | 5/2003 | Park |
| 6,600,784 B1 | 7/2003 | Divakaran et al. |
| 6,611,653 B1 | 8/2003 | Kim et al. |
| 6,628,835 B1 | 9/2003 | Brill et al. |
| 6,643,416 B1 | 11/2003 | Daniels et al. |
| 6,647,200 B1 | 11/2003 | Tanaka |
| D483,281 S | 12/2003 | Cobigo |
| 6,665,423 B1 | 12/2003 | Mehrotra et al. |
| 6,697,103 B1 | 2/2004 | Fernandez et al. |
| 6,741,977 B1 | 5/2004 | Nagaya et al. |
| D491,956 S | 6/2004 | Ombao et al. |
| 6,792,676 B2 | 8/2004 | Haji et al. |
| 6,816,184 B1 | 11/2004 | Brill et al. |
| D499,740 S | 12/2004 | Ombao et al. |
| D510,584 S | 10/2005 | Tierney |
| 6,970,183 B1 | 11/2005 | Monroe |
| 7,016,415 B2 | 3/2006 | Alvarez |
| 7,023,469 B1 | 4/2006 | Olson |
| 7,142,600 B1 | 11/2006 | Schonfeld et al. |
| D555,661 S | 11/2007 | Kim |
| 7,403,116 B2 | 7/2008 | Bittner |
| 7,421,455 B2 | 9/2008 | Hua et al. |
| 7,421,727 B2 | 9/2008 | Oya et al. |
| 7,433,493 B1 | 10/2008 | Miyashi et al. |
| 7,440,613 B2 | 10/2008 | Xu |
| 7,447,337 B2 | 11/2008 | Zhang et al. |
| D584,749 S | 1/2009 | Smith et al. |
| D590,412 S | 4/2009 | Saft et al. |
| D607,001 S | 12/2009 | Ording |
| 7,629,995 B2 | 12/2009 | Salivar et al. |
| 7,685,519 B1 | 3/2010 | Duncan et al. |
| 7,760,908 B2 | 7/2010 | Curtner et al. |
| 7,765,482 B2 | 7/2010 | Wood et al. |
| D621,413 S | 8/2010 | Rasmiussen |
| D625,323 S | 10/2010 | Matsushima et al. |
| 7,813,525 B2 | 10/2010 | Aggarwal |
| 7,823,066 B1 | 10/2010 | Kuramura |
| 7,920,626 B2 | 4/2011 | Fernandez et al. |
| 7,924,323 B2 | 4/2011 | Walker et al. |
| D638,025 S | 5/2011 | Saft et al. |
| 7,995,096 B1 | 8/2011 | Cressy et al. |
| 8,115,623 B1 | 2/2012 | Green |
| 8,122,038 B2 | 2/2012 | Handy et al. |
| 8,130,839 B2 | 3/2012 | Kawashima et al. |
| 8,200,669 B1 | 6/2012 | Iampietro et al. |
| 8,204,273 B2 | 6/2012 | Chambers et al. |
| 8,284,258 B1 | 10/2012 | Cetin et al. |
| 8,295,597 B1 | 10/2012 | Sharma et al. |
| 8,300,890 B1 | 10/2012 | Gaikwad et al. |
| 8,305,447 B1 | 11/2012 | Wong |
| 8,390,684 B2 | 3/2013 | Piran et al. |
| 8,401,232 B2 | 3/2013 | Fan |
| 8,494,234 B1 | 7/2013 | Bozinovic et al. |
| 8,515,128 B1 | 8/2013 | Hildreth |
| 8,525,665 B1 | 9/2013 | Trundle et al. |
| 8,537,219 B2 | 9/2013 | Desimone et al. |
| D690,757 S | 10/2013 | Bart et al. |
| 8,577,091 B2 | 11/2013 | Ivanov et al. |
| 8,587,653 B1 | 11/2013 | Vidunas et al. |
| 8,613,070 B1 | 12/2013 | Borzycki et al. |
| 8,676,493 B2 | 3/2014 | M et al. |
| 8,688,483 B2 | 4/2014 | Watts et al. |
| 8,707,194 B1 | 4/2014 | Jenkins et al. |
| 8,775,242 B2 | 7/2014 | Tavares et al. |
| 8,780,201 B1 | 7/2014 | Scalisi et al. |
| 8,854,457 B2 | 10/2014 | De Vleeschouwer et al. |
| 8,861,804 B1 | 10/2014 | Johnson |
| 8,872,915 B1 | 10/2014 | Scalisi et al. |
| 8,902,085 B1 | 12/2014 | Ray et al. |
| 8,941,733 B2 | 1/2015 | Albers et al. |
| 8,941,736 B1 | 1/2015 | Scalisi |
| 8,942,438 B2 | 1/2015 | Ivanov et al. |
| 8,953,848 B2 | 2/2015 | Ivanov et al. |
| 8,958,602 B1 | 2/2015 | Lane et al. |
| 8,966,368 B2 | 2/2015 | Kuramura |
| 8,982,141 B2 | 3/2015 | Freyhult |
| 9,014,429 B2 | 4/2015 | Badawy |
| 9,025,836 B2 | 5/2015 | Ptucha |
| 9,064,393 B2 | 6/2015 | He |
| 9,082,018 B1 | 7/2015 | Laska et al. |
| 9,124,858 B2 | 9/2015 | Jang et al. |
| 9,158,974 B1 | 10/2015 | Laska et al. |
| 9,172,911 B2 | 10/2015 | Kristiansen et al. |
| 9,213,903 B1 | 12/2015 | Laska et al. |
| 9,269,243 B2 | 2/2016 | Shet et al. |
| 9,325,905 B2 | 4/2016 | Noyes |
| 9,361,011 B1 | 6/2016 | Burns |
| 9,373,076 B1 | 6/2016 | Appelman et al. |
| D764,958 S | 8/2016 | Scalisi |
| 9,420,331 B2 | 8/2016 | Laska et al. |
| 9,432,631 B2 | 8/2016 | Allegra et al. |
| D765,530 S | 9/2016 | Scalisi |
| 9,449,229 B1 | 9/2016 | Laska et al. |
| 9,479,822 B2 | 10/2016 | Laska et al. |
| 9,516,053 B1 | 12/2016 | Muddu et al. |
| 9,575,178 B2 | 2/2017 | Kanamori et al. |
| D782,495 S | 3/2017 | Laska et al. |
| 9,600,723 B1 | 3/2017 | Pantofaru et al. |
| 9,602,860 B2 | 3/2017 | Laska et al. |
| 9,613,524 B1 | 4/2017 | Lamb et al. |
| 9,621,798 B2 | 4/2017 | Zhang et al. |
| 9,628,286 B1 | 4/2017 | Nguyen et al. |
| D789,363 S | 6/2017 | Jentz et al. |
| D789,364 S | 6/2017 | Jentz et al. |
| D789,365 S | 6/2017 | Jentz et al. |
| D789,366 S | 6/2017 | Jentz et al. |
| D789,367 S | 6/2017 | Jentz et al. |
| 9,674,453 B1 | 6/2017 | Tangeland et al. |
| D793,268 S | 8/2017 | Ye |
| D795,109 S | 8/2017 | Olodort et al. |
| 9,753,994 B2 | 9/2017 | Anderson |
| D800,201 S | 10/2017 | Song |
| D805,570 S | 12/2017 | Shi |
| D806,154 S | 12/2017 | Shi |
| 9,940,523 B2 | 4/2018 | Laska et al. |
| 9,997,053 B2 | 6/2018 | Maneskiold et al. |
| 10,063,815 B1 | 8/2018 | Spivey et al. |
| 10,108,862 B2 | 10/2018 | Laska et al. |
| 10,303,278 B2 | 5/2019 | Cheng et al. |
| 10,309,145 B2 | 6/2019 | Castro et al. |
| 10,380,429 B2 | 8/2019 | Chaudhry et al. |
| 10,410,086 B2 | 9/2019 | Bapat et al. |
| 10,475,311 B2 | 11/2019 | Siminoff |

(56) References Cited

U.S. PATENT DOCUMENTS

| | | |
|---|---|---|
| 10,599,950 B2 | 3/2020 | Bapat et al. |
| 10,664,688 B2 | 5/2020 | Goulden et al. |
| 10,708,472 B2 | 7/2020 | Jeong et al. |
| 11,134,227 B2 | 9/2021 | Goulden et al. |
| 11,256,908 B2 | 2/2022 | Goulden et al. |
| 2001/0024517 A1 | 9/2001 | Labelle |
| 2002/0002425 A1 | 1/2002 | Dossey et al. |
| 2002/0113813 A1 | 8/2002 | Yoshimine |
| 2002/0126224 A1 | 9/2002 | Lienhart |
| 2003/0063093 A1 | 4/2003 | Howard |
| 2003/0101104 A1 | 5/2003 | Dimitrova et al. |
| 2004/0021647 A1 | 2/2004 | Iwema et al. |
| 2004/0100560 A1 | 5/2004 | Stavely et al. |
| 2004/0109059 A1 | 6/2004 | Kawakita |
| 2004/0123328 A1 | 6/2004 | Coffey et al. |
| 2004/0125908 A1 | 7/2004 | Cesmeli |
| 2004/0133647 A1 | 7/2004 | Ozkan et al. |
| 2004/0143602 A1 | 7/2004 | Ruiz et al. |
| 2004/0153670 A1* | 8/2004 | Casey ............ H04N 21/6587 726/10 |
| 2004/0174434 A1 | 9/2004 | Walker et al. |
| 2004/0229569 A1* | 11/2004 | Franz ................ H04M 3/16 455/66.1 |
| 2005/0047672 A1 | 3/2005 | Ben-Ezra et al. |
| 2005/0057653 A1 | 3/2005 | Maruya |
| 2005/0074140 A1 | 4/2005 | Grasso et al. |
| 2005/0132414 A1 | 6/2005 | Bentley et al. |
| 2005/0151851 A1 | 7/2005 | Schnell |
| 2005/0200486 A1 | 9/2005 | Greer |
| 2005/0246119 A1 | 11/2005 | Koodali |
| 2005/0248443 A1* | 11/2005 | Steinetz .............. G08B 3/10 340/392.1 |
| 2005/0285734 A1 | 12/2005 | Sheynman et al. |
| 2006/0038663 A1* | 2/2006 | Steinetz .............. G08B 3/10 340/392.1 |
| 2006/0056056 A1 | 3/2006 | Ahiska et al. |
| 2006/0063517 A1* | 3/2006 | Oh .................... H04N 7/186 455/415 |
| 2006/0072847 A1 | 4/2006 | Chor et al. |
| 2006/0093998 A1 | 5/2006 | Vertegaal |
| 2006/0195716 A1 | 8/2006 | Bittner |
| 2006/0228015 A1 | 10/2006 | Brockway et al. |
| 2006/0239645 A1 | 10/2006 | Curtner et al. |
| 2006/0274949 A1 | 12/2006 | Gallagher et al. |
| 2007/0002141 A1 | 1/2007 | Lipton et al. |
| 2007/0014554 A1 | 1/2007 | Sasaki |
| 2007/0038570 A1* | 2/2007 | Halbritter .......... G06Q 10/10 705/50 |
| 2007/0041727 A1 | 2/2007 | Lee et al. |
| 2007/0061862 A1 | 3/2007 | Berger et al. |
| 2007/0132558 A1 | 6/2007 | Rowe et al. |
| 2007/0186238 A1* | 8/2007 | Schrager .......... H04N 21/41407 725/35 |
| 2007/0216764 A1* | 9/2007 | Kwak .............. G07C 9/00309 348/14.06 |
| 2007/0220569 A1 | 9/2007 | Ishii |
| 2007/0257986 A1 | 11/2007 | Ivanov et al. |
| 2008/0051648 A1 | 2/2008 | Suri et al. |
| 2008/0122926 A1 | 5/2008 | Zhou et al. |
| 2008/0170123 A1 | 7/2008 | Albertson et al. |
| 2008/0178069 A1 | 7/2008 | Stallings |
| 2008/0184245 A1 | 7/2008 | St-Jean |
| 2008/0192129 A1 | 8/2008 | Walker et al. |
| 2008/0244453 A1 | 10/2008 | Cafer |
| 2008/0270363 A1 | 10/2008 | Hunt et al. |
| 2008/0303903 A1 | 12/2008 | Bentley et al. |
| 2008/0316311 A1 | 12/2008 | Albers et al. |
| 2009/0016599 A1 | 1/2009 | Eaton et al. |
| 2009/0018996 A1 | 1/2009 | Hunt et al. |
| 2009/0033746 A1 | 2/2009 | Brown et al. |
| 2009/0100007 A1 | 4/2009 | Campbell et al. |
| 2009/0141939 A1 | 6/2009 | Chambers et al. |
| 2009/0207257 A1 | 8/2009 | Jung et al. |
| 2009/0232416 A1 | 9/2009 | Murashita |
| 2009/0244291 A1 | 10/2009 | Saptharishi |
| 2009/0262189 A1 | 10/2009 | Marman |
| 2009/0288011 A1 | 11/2009 | Piran et al. |
| 2009/0316956 A1 | 12/2009 | Higuchi et al. |
| 2009/0319829 A1 | 12/2009 | Takayama |
| 2010/0002070 A1 | 1/2010 | Ahiska |
| 2010/0002071 A1 | 1/2010 | Ahiska |
| 2010/0002911 A1 | 1/2010 | Wu et al. |
| 2010/0004839 A1 | 1/2010 | Yokoyama et al. |
| 2010/0008547 A1 | 1/2010 | Yagnik et al. |
| 2010/0033573 A1 | 2/2010 | Malinovski et al. |
| 2010/0042949 A1 | 2/2010 | Chen |
| 2010/0066822 A1 | 3/2010 | Steingberg et al. |
| 2010/0133008 A1 | 6/2010 | Gawski et al. |
| 2010/0162114 A1 | 6/2010 | Roth |
| 2010/0210240 A1 | 8/2010 | Mahaffey et al. |
| 2010/0245107 A1 | 9/2010 | Fulker et al. |
| 2010/0304731 A1 | 12/2010 | Bratton et al. |
| 2011/0001605 A1 | 2/2011 | Gal et al. |
| 2011/0167369 A1 | 7/2011 | Van Os |
| 2011/0199488 A1 | 8/2011 | Gorilovskij et al. |
| 2011/0199535 A1 | 8/2011 | Isu et al. |
| 2011/0254972 A1 | 10/2011 | Yaguchi |
| 2011/0255741 A1 | 10/2011 | Jung et al. |
| 2011/0255775 A1 | 10/2011 | McNamer et al. |
| 2011/0291925 A1 | 12/2011 | Israel |
| 2011/0312350 A1 | 12/2011 | Agerholm |
| 2012/0052972 A1 | 3/2012 | Bentley |
| 2012/0098918 A1 | 4/2012 | Murphy |
| 2012/0176496 A1 | 7/2012 | Carbonell et al. |
| 2012/0195363 A1 | 8/2012 | Laganiere et al. |
| 2012/0257000 A1 | 10/2012 | Singhai |
| 2012/0280783 A1 | 11/2012 | Gerhardt et al. |
| 2013/0027581 A1 | 1/2013 | Price et al. |
| 2013/0057695 A1 | 3/2013 | Huisking |
| 2013/0125039 A1 | 5/2013 | Murata |
| 2013/0128022 A1 | 5/2013 | Bose et al. |
| 2013/0145270 A1 | 6/2013 | Piran et al. |
| 2013/0201329 A1 | 8/2013 | Thornton et al. |
| 2013/0242093 A1 | 9/2013 | Cobb et al. |
| 2013/0301939 A1 | 11/2013 | Ochi et al. |
| 2014/0013243 A1 | 1/2014 | Flynn, III et al. |
| 2014/0044404 A1 | 2/2014 | Grundmann et al. |
| 2014/0049371 A1* | 2/2014 | Tung ................ H04M 11/025 340/5.61 |
| 2014/0056479 A1 | 2/2014 | Bobbitt et al. |
| 2014/0068349 A1 | 3/2014 | Scott et al. |
| 2014/0075370 A1 | 3/2014 | Guerin et al. |
| 2014/0082497 A1 | 3/2014 | Chalouhi et al. |
| 2014/0085088 A1 | 3/2014 | Graphenius |
| 2014/0098227 A1 | 4/2014 | Chen et al. |
| 2014/0142907 A1 | 5/2014 | Gellaboina et al. |
| 2014/0146125 A1 | 5/2014 | Kristiansen et al. |
| 2014/0149078 A1 | 5/2014 | Lee et al. |
| 2014/0160294 A1 | 6/2014 | Naylor |
| 2014/0172906 A1 | 6/2014 | Sud et al. |
| 2014/0198237 A1 | 7/2014 | Noyes |
| 2014/0210646 A1 | 7/2014 | Subramanua |
| 2014/0240504 A1* | 8/2014 | Cho ............... G08B 13/19617 348/155 |
| 2014/0300722 A1 | 10/2014 | Garcia |
| 2014/0313142 A1 | 10/2014 | Yairi |
| 2014/0313542 A1 | 10/2014 | Benchorin et al. |
| 2014/0320740 A1 | 10/2014 | Wan et al. |
| 2014/0347475 A1 | 11/2014 | Divakaran et al. |
| 2015/0022660 A1 | 1/2015 | Kavadeles |
| 2015/0029335 A1* | 1/2015 | Kasmir ............. H04M 1/0291 348/143 |
| 2015/0046184 A1 | 2/2015 | Cocco et al. |
| 2015/0054949 A1 | 2/2015 | Scalisi |
| 2015/0054981 A1 | 3/2015 | Saiki et al. |
| 2015/0074535 A1 | 3/2015 | Siberstein et al. |
| 2015/0081548 A1 | 3/2015 | Robinet |
| 2015/0098613 A1 | 4/2015 | Gagvani |
| 2015/0109104 A1 | 4/2015 | Fadell et al. |
| 2015/0116108 A1 | 4/2015 | Fadell et al. |
| 2015/0138353 A1 | 5/2015 | Yang et al. |
| 2015/0156030 A1 | 6/2015 | Fadell et al. |

(56) References Cited

U.S. PATENT DOCUMENTS

| | | | |
|---|---|---|---|
| 2015/0156031 A1* | 6/2015 | Fadell | G08B 19/005 700/276 |
| 2015/0181088 A1 | 6/2015 | Wu et al. | |
| 2015/0194134 A1 | 7/2015 | Dureau et al. | |
| 2015/0201152 A1 | 7/2015 | Cho et al. | |
| 2015/0222820 A1 | 8/2015 | Costigan et al. | |
| 2015/0228167 A1 | 8/2015 | Scalisi et al. | |
| 2015/0234571 A1 | 8/2015 | Lee et al. | |
| 2015/0235551 A1 | 8/2015 | Maneskiold et al. | |
| 2015/0242687 A1 | 8/2015 | Seo | |
| 2015/0242994 A1 | 8/2015 | Shen et al. | |
| 2015/0279182 A1 | 10/2015 | Kanaujia et al. | |
| 2015/0325067 A1 | 11/2015 | Lee | |
| 2015/0339702 A1 | 11/2015 | Lin et al. | |
| 2015/0341599 A1 | 11/2015 | Carey | |
| 2015/0363989 A1 | 12/2015 | Scalisi | |
| 2016/0006932 A1 | 1/2016 | Zhang et al. | |
| 2016/0006988 A1 | 1/2016 | Zhao | |
| 2016/0026862 A1 | 1/2016 | Anderson | |
| 2016/0027196 A1 | 1/2016 | Schiffer et al. | |
| 2016/0041724 A1 | 2/2016 | Kirkby et al. | |
| 2016/0042621 A1 | 2/2016 | Hogg | |
| 2016/0072831 A1 | 3/2016 | Rieke | |
| 2016/0092737 A1 | 3/2016 | Laska et al. | |
| 2016/0092738 A1 | 3/2016 | Laska et al. | |
| 2016/0103559 A1 | 4/2016 | Maheshwari et al. | |
| 2016/0103887 A1 | 4/2016 | Fletcher et al. | |
| 2016/0110612 A1 | 4/2016 | Sabripour | |
| 2016/0117951 A1 | 4/2016 | Fleisher et al. | |
| 2016/0189531 A1 | 6/2016 | Modi | |
| 2016/0195716 A1 | 7/2016 | Nakanuma | |
| 2016/0219248 A1 | 7/2016 | Reznik et al. | |
| 2016/0235344 A1 | 8/2016 | Auerbach | |
| 2016/0241818 A1 | 8/2016 | Palanisamy et al. | |
| 2016/0274771 A1 | 9/2016 | Seong et al. | |
| 2016/0307418 A1 | 10/2016 | Pantus | |
| 2016/0316176 A1 | 10/2016 | Laska et al. | |
| 2016/0316256 A1 | 10/2016 | Laska et al. | |
| 2016/0321257 A1 | 11/2016 | Cheng et al. | |
| 2016/0321889 A1 | 11/2016 | Gagvani | |
| 2016/0335861 A1 | 11/2016 | Shimura | |
| 2016/0360116 A1 | 12/2016 | Penha et al. | |
| 2016/0366036 A1 | 12/2016 | Gupta | |
| 2016/0371534 A1 | 12/2016 | Koul et al. | |
| 2017/0019605 A1 | 1/2017 | Wang et al. | |
| 2017/0039729 A1 | 2/2017 | Wang et al. | |
| 2017/0048495 A1 | 2/2017 | Scalisi | |
| 2017/0085843 A1 | 3/2017 | Scalisi et al. | |
| 2017/0111494 A1 | 4/2017 | Kidron et al. | |
| 2017/0123492 A1 | 5/2017 | Marggraff et al. | |
| 2017/0162230 A1 | 6/2017 | Maliuk et al. | |
| 2017/0163929 A1 | 6/2017 | Maliuk et al. | |
| 2017/0180678 A1 | 6/2017 | Fish et al. | |
| 2017/0257612 A1 | 9/2017 | Emeott et al. | |
| 2017/0272706 A1 | 9/2017 | Jeong | |
| 2017/0301203 A1 | 10/2017 | Matsuura | |
| 2018/0004784 A1 | 1/2018 | Tompkins | |
| 2018/0012462 A1 | 1/2018 | Heitz, III et al. | |
| 2018/0089328 A1 | 3/2018 | Bath et al. | |
| 2018/0096197 A1 | 4/2018 | Kephart | |
| 2018/0121035 A1 | 5/2018 | Filippi | |
| 2018/0139332 A1 | 5/2018 | Kerzner | |
| 2018/0144314 A1 | 5/2018 | Miller | |
| 2018/0182148 A1 | 6/2018 | Yanagisawa | |
| 2018/0218053 A1 | 8/2018 | Koneru | |
| 2018/0219897 A1 | 8/2018 | Muddu et al. | |
| 2018/0249134 A1 | 8/2018 | Siminoff et al. | |
| 2018/0330169 A1 | 11/2018 | van Hoof et al. | |
| 2019/0004639 A1 | 1/2019 | Faulkner | |
| 2019/0087646 A1* | 3/2019 | Goulden | G06K 9/00255 |
| 2019/0089934 A1 | 3/2019 | Goulden et al. | |
| 2020/0279459 A1* | 9/2020 | Singh | G10L 15/16 |
| 2020/0285841 A1 | 9/2020 | Goulden et al. | |
| 2021/0174095 A1 | 6/2021 | Kong et al. | |

FOREIGN PATENT DOCUMENTS

| | | |
|---|---|---|
| EP | 1024666 | 8/2000 |
| JP | 2011044171 | 3/2011 |
| JP | 2012048689 | 3/2012 |
| WO | 2007011709 | 1/2007 |
| WO | 2009138037 | 11/2009 |
| WO | 2016/205213 A1 | 12/2016 |
| WO | 2016205213 | 12/2016 |
| WO | 2017078793 | 5/2017 |

OTHER PUBLICATIONS

Inquiry re processing of the file for counterpart European Application No. 18172420.4, dated Sep. 17, 2020, 30 pp.

Google LLC, Extended Search Report, EP 18172420.4, dated Nov. 26, 2018, 7 pgs.

Communication Pursuant to Article 94(3) EPC from counterpart European Application No. 18172420.4, dated Apr. 26, 2021, 6 pp.

Response to Communication pursuant to Article 49(3) EPC dated Apr. 26, 2021 from counterpart European Application No. 18172420.4, filed Aug. 13, 2021, 16 pp.

Prosecution History from U.S. Appl. No. 15/809,900, dated Jun. 17, 2019 through May 27, 2021, 133 pp.

Notice of Allowance from U.S. Appl. No. 15/809,900, dated Sep. 3, 2021, 2 pp.

"Clustered/Stacked Filled Bar Graph Generator", http://www.burningcutlery.com/derek/bargraph/, Mar. 24, 2014, 16 pages.

"Configuring Main System—Chapter 1", (GEOVision) 2009—https://videos.cctvcamerapros.com/pdf/geovision/geovision-8-manual-ch1.pdf, 79 pages.

"EP Patent Certificate", EP Patent No. 3022720, Jan. 31, 2018, 1 page.

"Extended European Search Report", EP Application No. 18156967.4, dated Oct. 17, 2018, 12 pages.

"FI8921W email notification and motion alarm", http://foscam.us/forum/fi8921w-email-notification-and-motion-alarm-t5874.html, Jun. 4, 2013, 2 pages.

"File:savedemo.png", https://wiki.freepascal.org/File:savedemo.png, Apr. 3, 2014, 2 pages.

"Foreign Office Action", CN Application No. 201880033972.7, dated Jan. 28, 2021, 8 pages.

"Graph Maker", https://forum.unity.com/threads/released-graph-maker-ugui-ngui-dfgui-line-graphs-bar-gaphs-pie-graphs-etc.202437, 21 pages.

"Histograms", Retrieved at: https://root.cern.ch/root/htmldoc/guides/users-guide/Histograms.html—on Dec. 20, 2018, 55 pages.

"How to set up motion detection in a Mobotix network camera", https://www.networkwebcams.co.uk/blog/2010/03/03/setting-up-motion-detection-mobotix/, Mar. 3, 2010, 5 pages.

"How to Setup Motion Detection on your D-Link Camera", http://blog.dlink.com/how-to-set-up-motion-detection-on-your-d-link-camera, Apr. 9, 2014, 8 pages.

"International Search Report and Written Opinion", Application No. PCT/US2015/039425, dated Sep. 28, 2015, 12 pages.

"International Search Report and Written Opinion", Application No. PCT/US2018/046811, dated Mar. 14, 2019, 16 pages.

"International Search Report and Written Opinion", Application No. PCT/US2018/032770, dated Nov. 2, 2018, 18 pages.

"IZON App Guide", www.izoncam.com/wp-content/uploads/2014/06/IZON-App-Guide.pdf, Jun. 2014, 30 pages.

"Logitech Alert Video Security System: Getting to Know", https://docplayer.net/19510884-Logitech-alert-video-security-system-getting-to-know.html, 2010, 9 pages.

"Motion Detection Setting up Motion Detection", https://www.ispyconnect.com/userguide-motion-detection.aspx, Dec. 11, 2011, 4 pages.

"Notice of Allowance", U.S. Appl. No. 16/883,932, dated Oct. 14, 2021, 8 pages.

"Notification of Registration, 004086437", Google, Jul. 13, 2017, 6 pages.

"Patent Certificate for Design", Certificate No. 4493940, Patent No. Z201730288012.3, Jan. 30, 2018, 1 page.

(56) References Cited

OTHER PUBLICATIONS

"Prosecution History", U.S. Appl. No. 15/809,924, filed Jun. 4, 2019 through Apr. 24, 2020, 61 pages.
"Systems and Methods of Presenting Appropriate Actions for Responding to a Visitor to a Smart Home Environment", U.S. Appl. No. 17/400,887, filed Aug. 12, 2021, 75 pages.
"Words of Estimative Probability", https://www.cia.gov/library/center-for-the-study-of-intelligence/csi-publications/books-and-monographs/sherman-kent-and-the-board-of-national-estimates-collected-essays/6words.html, May 25, 2018, 11 pages.
"You Tube, Sky News Live", (screenshot of website illustrating live stream video with timeline having preview thumbnail of past images within the stream) retrieved at: https://www.youtube.com/watch?v=9Auq9mYxFEE, Aug. 10, 2015, 2 pages.
Akhtar, Zahid , "Biometric Template Update Under Facial Aging", Jan. 2015, 7 pages.
Ballan, Lamberto , "Event Detection and Recognition for Semantic Annotation of Video", Nov. 2011, pp. 279-302.
Birk, Yitzhak , "Deterministic Load-Balancing Schemes for Disk-Based Video-on-Demand Storage Servers", Sep. 1995, 10 pages.
Buzan, Dan , "Extraction and Clustering of Motion Trajectories in Video", Apr. 23, 2004, 4 pages.
Camplani, Massimo et al., "Accurate depth-color scene modeling for 3D contents generation with low cost depth cameras", Oct. 2012, 5 pages.
Castellanos Jimenez, , "Event detection in video using motion analysis", Oct. 2010, pp. 57-62.
Delbruck, Tobi , "Frame-free dynamic digital vision", Mar. 2008, 6 pages.
Ellis, T J. et al., "Model-Based Vision for Automatic Interpretation", Nov. 1990, pp. 62-67.
Franco, Annalisa et al., "Incremental Template Updating for Face Recognition in Home Environments", Aug. 2010, 13 pages.
Gresham, Jim , "Review: iZon wi-fi Video monitor and its companion iOS app", https://www.idownloadblog.com/2012/11/21/stem-izon-review/, Nov. 21, 2012, 17 pages.
Halliquist, , "How do I set up Activity Alerts", http://support.dropcam.com/entries/27880086-How-do-i-set-up-Activity-Alerts, 2013, 3 pages.
Ivanov, Yuri et al., "Toward Spatial Queries for Spatial Surveillance Tasks", Jan. 2006, 9 pages.
Jiang, Yu-Gang et al., "High-Level Event Recognition in Unconstrained Videos", Nov. 2012, pp. 73-101.
Kumar, K. N. K. , "Motion activated security camera using raspberry Pi", Apr. 2017, 4 pages.
Li, L et al., "Statistical Modeling of Complex Backgrounds for Foreground Object Detection", Nov. 2004, pp. 1459-1472.
Medioni, Gerard et al., "Event Detection and Analysis from Video Streams", Sep. 2001, 10 pages.
Oh, Jimmy , "Literature Review—Graphical Tool", https://www.stat.auckland.ac.nz/~joh024/LitReviews/LitReview_GraphicalTools.pdf, 23 pages.
Schraml, Stephan et al., "A Spatio-temporal Clustering Method Using Real-Time Motion Analysis on Event-Based 3D Vision", Jul. 2010, 7 pages.
Shim, Young-Bin et al., "A Study on Surveillance System of Object's Abnormal Behavior by Blob Composition Analysis", Mar. 2014, pp. 333-340.
Villier, Marie-Bernadette , "Amplification of the Antibody Response by C3b Complexed to Antigen Through an Ester Link", https://www.jimmunol.org/content/162/6/3647, Mar. 15, 1999, 7 pages.
Yoon, Kyongii et al., "Event Detection from MPEG Video in the Compressed Domain", Jan. 2000, 7 pages.
Zelnik-Manor, Lihi et al., "Event-Based Analysis of Video", Feb. 2001, 18 pages.
Zhou, F , "Aligned Cluster Analysis for Temporal Segmentation of Human Motion", Oct. 2008, 7 pages.

\* cited by examiner

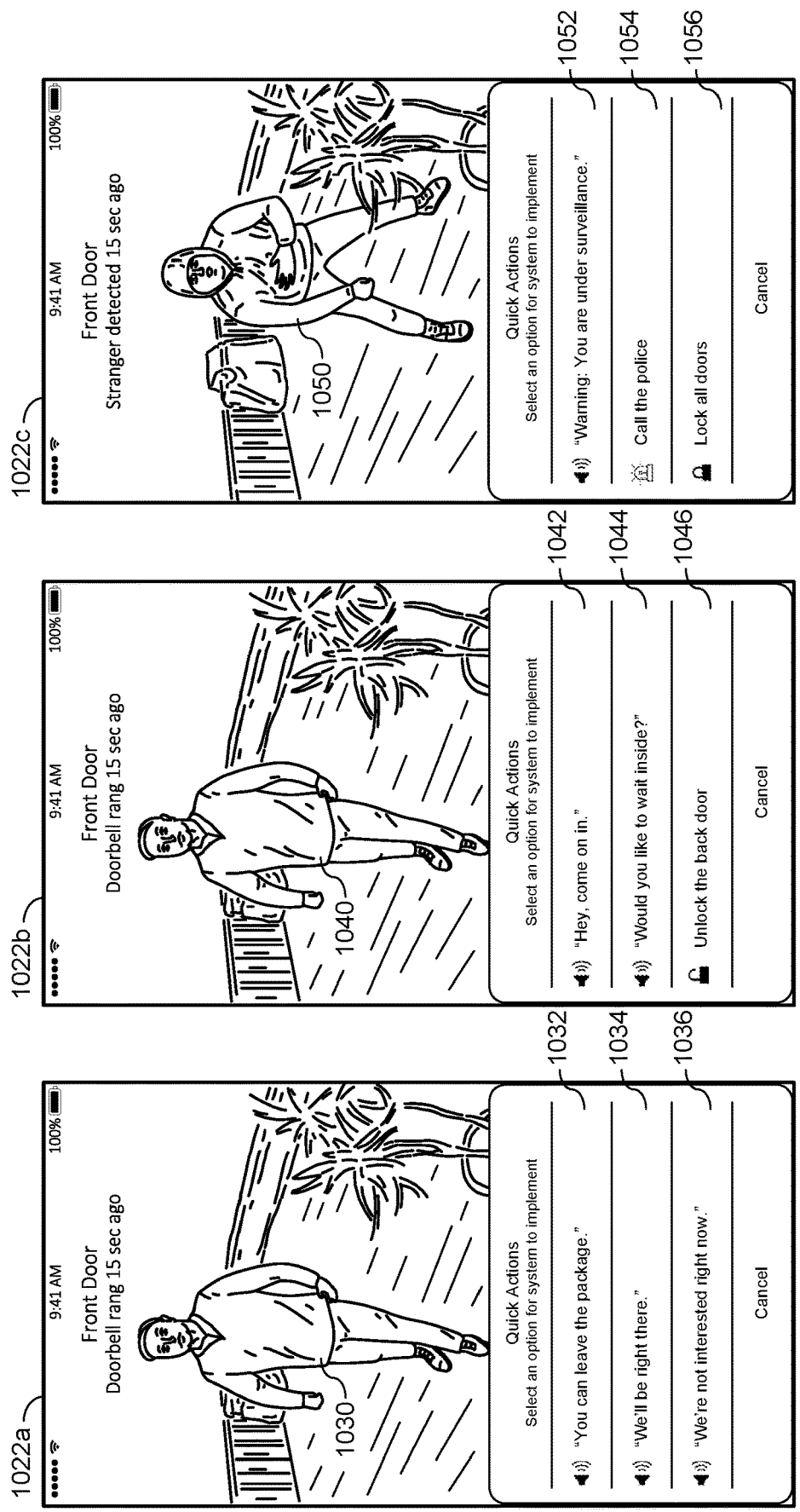

SYSTEMS AND METHODS OF PRESENTING APPROPRIATE ACTIONS FOR RESPONDING TO A VISITOR TO A SMART HOME ENVIRONMENT

RELATED APPLICATIONS

This application claims priority to U.S. patent application Ser. No. 15/809,900, filed Nov. 10, 2017, which claims priority to U.S. Provisional Application No. 62/561,132, filed Sep. 20, 2017, each of which is hereby incorporated by reference in its entirety.

This application is related to U.S. patent application Ser. No. 15/710,783, filed Sep. 20, 2017, entitled "Doorbell Camera;" U.S. patent application Ser. No. 15/676,848, filed Aug. 14, 2017, entitled "Systems and Methods of Person Recognition in Video Streams;" U.S. patent application Ser. No. 15/676,868, filed Aug. 14, 2017, entitled "Systems and Methods for Person Recognition Data Management;" U.S. patent application Ser. No. 15/207,458, filed Jul. 11, 2016, entitled "Methods and Systems for Providing Event Alerts;" and U.S. patent application Ser. No. 15/207,459, filed Jul. 11, 2016, entitled "Methods and Systems for Person Detection in a Video Feed;" and U.S. patent application Ser. No. 15/594,518, filed May 12, 2017, entitled "Methods and Systems for Presenting Image Data for Detected Regions of Interest," each of which is hereby incorporated by reference in its entirety.

BACKGROUND

Home entryways are sensitive areas often associated with the security and peace of mind of the home's occupants. Home owners and occupants have an interest in monitoring their entryways for security and convenience. Some existing surveillance systems detect persons in the field of view of a security camera, and some initiate a general alert upon such detection. However, a single type of alert is not appropriate for all detected persons; some persons may be welcome guests, occupants, unwelcome visitors, or merely persons passing by the entryway.

It is a challenge to accurately identify and categorize visitors to a home. It is also a challenge to provide meaningful options to occupants of the home for responding to such visitors. Human-friendly techniques for discovering and categorizing visitors, as well as providing relevant options to users for responding to the visitors are in great need.

SUMMARY

Accordingly, there is a need for systems and/or devices with more efficient, accurate, and intuitive methods for entity (e.g., person) and event identification, categorization, and presentation. Such systems, devices, and methods optionally complement or replace conventional systems, devices, and methods for entity and event identification, categorization, and/or presentation. Further, there is a need for systems and/or devices with more efficient and intuitive methods for identification and presentation of actions associated with responding to entities and events. Such systems, devices, and methods optionally complement or replace conventional systems, devices, and methods for action identification and presentation.

Users of home monitoring systems can potentially be bombarded with alerts and notifications about unimportant and trivial events if the systems do not employ some recognition/identification and categorization processes. The large number of unnecessary or incomplete information places a larger burden on the users and makes it more difficult to identify and respond to important events. For example, a user who receives entryway motion notifications every time a person walks in front of a camera mounted at an entryway of the home may not be able to distinguish between passersby and visitors. Thus, it is beneficial to be able to recognize when a detection event is caused by a visitor approaching the entryway. It is also beneficial to be able to recognize contextual information regarding the person's actions in distinguishing whether the person is a visitor approaching the entryway. For example, rather than sending a notification stating that "motion was detected," the system could send a notification detailing that "an unknown person is approaching the front door," or "an unknown person has been waiting by the front door for the past 30 seconds and has not yet rung the doorbell." The user can see at a glance the nature of the event and request more details (e.g., a clip of the event) and/or generate a response (e.g., alert the authorities, or initiate a communication). Further, by recognizing contextual information during the visitor's approach, the home monitoring system can determine relevant information for the user before the visitor reaches the entryway. Accordingly, by the time the visitor has reached the entryway and rings the doorbell or knocks on the door, the home monitoring system has already recognized enough contextual information to send relevant information to the user or take appropriate actions without having to wait for the visitor to reach the entryway, thereby increasing the efficiency of the system for both the user (e.g., can respond more quickly to a detection event) and the visitor (e.g., can interact with the home monitoring system with little to no processing delay).

In addition, users of home monitoring systems often have limited options available for responding to a detected visitor. Further, if an arbitrary subset of available options is presented, they may not be relevant to the situation at hand. Thus, it is beneficial to have a wide range of options available for responding to a visitor, such as alerting the authorities, initiating two-way communication with the visitor, adjusting security settings in the home, and the like. Moreover, it is beneficial to be able to recognize contextual information regarding the visitor and present an appropriate subset of the options that are relevant to the specific situation. For example, if a known visitor approaches the entryway, the system can provide a subset of actions that are appropriate for a known visitor (e.g., a greeting, and/or an option to unlock the door). On the other hand, if an unknown visitor approaches the entryway, the system can provide a different subset of actions that are appropriate for an unknown visitor (e.g., a warning, an option to lock the door, and/or an option to call the authorities).

In one aspect, some implementations include a method for recognizing an approaching visitor and initiating a response based on context information. In some implementations, the method includes: (1) determining that a visitor is approaching an entryway; (2) initiating a facial recognition operation while the visitor is approaching the entryway; (3) initiating an observation window in response to the determination that the visitor is approaching the entryway; (4) obtaining context information from one or more sensors of the smart home environment during the observation window; and (5) at the end of the observation window, initiating a response to the detected approach of the visitor based on the context information and an outcome of the facial recognition operation.

In some implementations, the observation window is initiated before the visitor reaches a physical interaction area of the entryway, the physical interaction area being defined a region in which the visitor is close enough to the entryway to physically interact with an element of the entryway, such as a door, a doorbell, a paging system, or a component of the electronic greeting system. For example, the observation window is initiated and context information (for use as a basis for initiating a response) is obtained before the visitor is close enough to ring the doorbell or knock on the door.

In some implementations, the observation window is initiated (and context information is obtained) at any time before the visitor initiates an announcement, such as a door knock, a doorbell button press, a verbal announcement, or a physical interaction with a component of the electronic greeting system. For example, even if the visitor is close enough to the entryway to ring the doorbell or knock on the door, the observation window is initiated and context information is obtained at any time before the visitor actually rings the doorbell or knocks on the door (or makes any other kind of announcement).

In some implementations, determining that a visitor is approaching the entryway includes obtaining and analyzing presence information indicative of an approaching visitor or a visitor in proximity to the entryway. In some implementations, part or all of the presence information is derived from motion data of one or more motion sensors of the smart home environment, including, for example, a passive infrared (PIR) sensor, an ultrasonic sensor, a microwave sensor, and/or a tomographic sensor. In some implementations, part or all of the presence information is derived from video data of one or more cameras having a field of view corresponding to the entryway. For example, presence information is derived by determining that an amount of motion detected by a camera or other type of motion sensor meets one or more motion criteria, such as an amount of motion exceeding a threshold. As a further example, presence information is derived by analyzing a plurality of image frames to determine whether a difference in position of an object (e.g., measured in pixels) in the plurality of image frames exceeds a threshold. In some implementations, part or all of the presence information is derived from an audio signal obtained from an audio sensor. For example, an audio signal capturing an audio event (such as a footstep, a verbal announcement, a doorbell sound, or a door knock) is indicative of a visitor's presence.

In some implementations, determining that a visitor is approaching the entryway includes comparing a dimension of a characteristic of the visitor over time. In some implementations, determining that the visitor is approaching includes tracking one or more dimensions of the visitor over time. For example, determining that a visitor is approaching the entryway includes obtaining a first measurement of a dimension of a characteristic of the visitor (such as an initial height measurement of the visitor's head), obtaining a subsequent measurement of the dimension of the characteristic of the visitor (such as a second height measurement of the visitor's head at a predetermined amount of time after the initial height measurement), and determining whether a difference between the first measurement and the subsequent measurement exceeds a threshold. For example, if the visitor's head height increases between the first and second measurements, the visitor is likely approaching; otherwise, if the visitor's head height does not increase, the visitor is likely not approaching or is standing still.

In some implementations, determining that a visitor is approaching the entryway comprises determining that the visitor is within a threshold distance to the entryway. For example, if a person is detected within a predetermined distance from the entryway, the person is determined to be an approaching visitor. For example, once the visitor is within 15 feet, 10 feet, or 5 feet of the entryway, the observation window is initiated and context information is obtained. In some implementations, initiating the observation window in response to the determination that the visitor is approaching the entryway includes initiating the observation window in response to the determination that the visitor is on a track to the entryway (e.g., has entered a walkway, hallway, or perimeter gate leading to the entryway).

In some implementations, determining that a visitor is approaching the entryway includes deriving a motion stream. In some implementations, the motion stream is a data stream derived from a video stream of the camera, wherein the data stream serves as a basis for motion analysis. In some implementations, the motion stream is derived from the video stream by detecting information regarding an amount of motion in a field of view of the camera, or by comparing an amount of detected motion in a field of view of the camera to a threshold. In some implementations, the motion stream includes a motion mask for a motion event detected in the video stream.

In some implementations, the method further includes capturing from the motion stream a crop of a face of the visitor when a size of the face exceeds a threshold proportion of a frame of the motion stream. For example, once the visitor is within a threshold distance to the camera (e.g., 10 feet, 5 feet, or 3 feet) the camera generates a cropped image of the visitor's face.

In some implementations, determining that a visitor is approaching the entryway includes obtaining position data from a sensor of the smart home environment; identifying, based on analysis of the position data, a position of the visitor with respect to the entryway; and comparing the position of the visitor to a threshold distance from the entryway, or to a previous position of the visitor.

In some implementations, determining that a visitor is approaching the entryway includes detecting the visitor entering or occupying a user-defined activity zone. For example, if the visitor enters a zone defined by a 3-foot radius around a delivered package, the system determines that a visitor is approaching. This information is also a useful basis for contextual information, described below.

In some implementations, determining that a visitor is approaching the entryway includes detecting at least one of a face, height, shape, or movement characteristic (e.g., a particular walking style such as limping) of the visitor. In some implementations, a visitor profile for a particular visitor is set (e.g., set manually by a user, or set via machine learning) to associate a particular face, height, shape, or movement characteristic with the visitor.

In some implementations, context information is obtained only while the visitor is approaching and before reaching a predetermined distance (e.g., in proximity) of the entryway. In some implementations, context information is obtained both while the visitor is approaching and while the visitor is in proximity to the entryway. In some implementations, context information is obtained only while the visitor is in proximity to the entryway.

In some implementations, context information includes a detected announcement event (e.g., a doorbell button press, a door knock, or a verbal announcement), or an absence of detected announcement events during a predetermined time threshold. For example, a visitor who rings the doorbell within 5 seconds of reaching the entryway may warrant a different response from the electronic greeting system than a visitor who has reached the entryway but has lingered for more than 30 seconds without ringing the doorbell or knocking on the door. In some implementations, a doorbell press, door knock, or verbal announcement is part of a pre-assigned pattern of doorbell presses or door knocks associated with, or is otherwise associated with, a known visitor. For example, the smart home environment (e.g., a smart doorbell) determines that a particular visitor always knocks at a particular location on the door, in a particular pattern, and with a particular amount of force. In this example, the smart home environment associates such knock attributes with the particular visitor. In another example, a visitor profile for a particular visitor is set (e.g., set manually by a user, or set via machine learning) to associate a particular knock pattern, a particular doorbell ring pattern, or a particular verbal announcement with the particular visitor.

In some implementations, context information is based on a facial recognition analysis result, one or more behavior characteristics of the visitor, one or more physical characteristics of the visitor, one or more clothing and/or accessory characteristics of the visitor, a time of day during which the visitor approaches the entryway, a day of the week during which the visitor approaches the entryway, audio data from the smart home environment, proximity in time to a pre-scheduled event, proximity in time to a prescheduled status of the smart home environment, a known or unknown status of a user of the electronic greeting system, an expected or unexpected status of a user of the electronic greeting system, a location of a user of the electronic greeting system, an identity of a user of the electronic greeting system, and/or one or more detected visitor actions (e.g., a doorbell activation, a door knock, an audio announcement, and/or any other interaction between the visitor and the electronic greeting system). In some implementations, the context information is based on a timing of the one or more detected visitor actions (e.g., how long it took for the visitor to press the doorbell or knock on the door since the visitor was detected or was determined to have been approaching or in proximity to the entryway, or how long the visitor has been lingering without pressing the doorbell or knocking on the door since the visitor was detected or was determined to have been approaching or in proximity to the entryway).

In some implementations, the context information includes characteristics of the visitor, such as height, gender, age, and the like. In some implementations, the context information includes determined biometrics of the visitor. In some implementations, if a group of visitors approach the entryway together, the context information includes the number of visitors and/or identified interactions between the visitors. In some implementations, the context information includes information regarding whether the visitor is holding any items and/or identification of such items (e.g., a box, crowbar, or food items). In some implementations, the context information includes information regarding any active or recent (e.g., within the last hour, day, or week) security alerts in the vicinity of the smart home (e.g., within a block, a mile, or 10 miles). In some implementations, the context information includes information regarding previous visitors to the smart home (e.g., whether previous visitors were criminals, salesmen, or neighbors).

In some implementations, the observation window ends at the earlier of: (1) a predetermined time threshold; and (2) a detected visitor announcement. For example, if a responsive visitor rings a doorbell or knocks on the door, the observation window ends regardless of whether the predetermined time threshold is reached, allowing for a prompt response by the electronic greeting system. As another example, if a lingering visitor has not pressed a doorbell button or knocked on the door by the time the predetermined time threshold is reached, the observation window ends even though the visitor has not yet made an announcement, allowing for a prompt response by the electronic greeting system.

In some implementations, responding to the visitor includes conveying a communication to the visitor; initiating a security action; and/or transmitting a notification to a user of the electronic greeting system, to a preselected contact of the user, and/or to public or private law enforcement personnel.

In some implementations, the communication includes at least one of: a communication conveying a status of a user of the electronic greeting system; a communication directing the visitor to perform an action; a communication directing the visitor to leave a message; a preprogrammed customized communication; a user-composed text message for conversion to an audio message; an audio communication conveyed by a synthesized voice; and/or a visual communication presented on a display.

In some implementations, the security action includes at least one of: activating a light or adjusting a lighting level of the smart home environment; locking or unlocking a door of the smart home environment; activating an alarm or adjusting an alarm sensitivity of the smart home environment; activating a sprinkler system of the smart home environment; activating a simulated dog bark; activating a security system or adjusting a security status of the smart home environment; transmitting a notification or an alert to public or private law enforcement personnel; transmitting a notification or an alert to a preselected contact of the user; and/or recording an image or video of the visitor.

In some implementations, the notification includes at least one of: information about the visitor; information about an outcome of the facial recognition operation; information about a detected visitor announcement event or lack thereof; and/or information about the obtained context information.

In another aspect, some implementations include an electronic greeting system of a smart home environment including: (1) a camera; (2) one or more processors; and (3) memory coupled to the one or more processors, the memory storing one or more programs configured to be executed by the one or more processors. In some implementations, the one or more programs include instructions for implementing one or more of the above operations.

In another aspect, some implementations include a non-transitory computer-readable storage medium storing one or more programs. In some implementations, the one or more programs include instructions, which when executed by a computing system, cause the system to implement one or more of the above operations.

In another aspect, some implementations include a method of providing appropriate actions for responding to or interacting with a visitor to a smart home environment. In some implementations, the method includes: (1) detecting a visitor of the smart home environment; (2) obtaining context information from the smart home environment regarding the visitor; (3) based on the context information, identifying a plurality of appropriate actions available to a user of a client device for interacting with the visitor via the electronic greeting system; and (4) causing the identified actions to be presented to the user of the client device. For example, the smart home environment may detect a deliveryman approaching with a box and send the smart home user appropriate actions (sometimes referred to herein as "quick actions") enabling the user to (1) instruct the deliveryman to leave the box on the porch, (2) instruct the deliveryman to retry delivery at a later time, or (3) ask the deliveryman if a signature is required for delivery.

In some implementations, (1) detecting a visitor includes determining that (a) a visitor is approaching an entryway of the smart home environment, or (b) a visitor is in proximity to an entryway of the smart home environment. In some implementations, determining that the visitor is approaching or in proximity to an entryway includes any of the previously described aspects and implementations.

In some implementations, (1) detecting a visitor includes (a) obtaining motion data from the sensor; and (b) identifying, based on analysis of the motion data, a motion event involving a visitor approaching an entryway of the smart home environment. In some implementations, (a) obtaining motion data includes: (i) analyzing a plurality of image frames to determine whether motion between two or more frames of the plurality of frames satisfies motion criteria; (ii) analyzing infrared data from an infrared sensor to determine whether a difference in infrared data satisfies motion criteria; and/or (iii) analyzing data from a motion sensor to determine whether the data satisfies motion criteria. For example, the smart home analyzes a video stream to determine whether an amount of motion present exceeds a preset motion threshold. As another example, the smart home utilizes a passive infrared (PIR) sensor to determine whether a distance between the user and the smart home entryway is shrinking. In some implementations, (b) identifying the motion event includes: (i) detecting the visitor entering an activity area in proximity to the entryway; (ii) detecting a face of the visitor; and/or (iii) detecting at least one of a height, shape, and movement characteristic of the visitor.

In some implementations, (2) context information is obtained based on any of the previously described aspects and implementations.

In some implementations, (2) context information is obtained based on: (i) a facial recognition analysis; (ii) on one or more behavior characteristics of the visitor; (iii) on one or more clothing characteristics of the visitor; (iv) a time of day during which the visitor approaches the entryway; (v) audio data; (vi) proximity in time to a prescheduled event; (vii) proximity in time to a prescheduled status of the smart home environment; (viii) a status or location of the user; (ix) a detected visitor action (e.g., a doorbell push, a door knock, an audio or verbal announcement, and/or an interaction between the visitor and the electronic greeting system); and/or (x) on a timing of a detected visitor action (e.g., comparing a timing of the detected visitor action with a timing of the identification of the motion event involving the visitor approaching the entryway). In some implementations, the context information includes information regarding a location and/or status of the smart home user.

In some implementations, the plurality of appropriate actions includes any of the responses in previously described aspects and implementations.

In some implementations, the plurality of appropriate actions includes: (i) one or more communication-based actions; (ii) one or more action-based actions; (iii) one or more person-specific actions; (iv) one or more location-specific actions; (v) one or more building-specific actions; and/or (vi) one or more user disposition-specific actions.

In some implementations, (i) one or more communication-based actions include: (a) sending a message regarding a status of the user; (b) sending a message directing the visitor to perform an action; (c) sending a message directing the visitor to leave a message; (d) sending a preprogrammed customized message to the visitor; (e) sending a user-composed text message to be converted to an audio message for the visitor; (f) sending an audio message spoken by a synthesized voice to the visitor; and/or (g) sending a visual message displayed on a screen to the visitor. In some implementations, a user selection of a communication-based action is received during a contemporaneous audio communication between the user and the visitor.

In some implementations, (ii) one or more action-based actions include: (a) adjusting a security level of the smart home environment; (b) locking or unlocking a door of the smart home environment; (c) adjusting a brightness level of a light of the smart home environment; (d) alerting law enforcement personnel; (e) alerting a preselected contact of the user; (f) recording an image or video of the visitor; and/or (g) turning on an alarm of the smart home environment.

In some implementations, (iii) one or more person-specific actions are selected based on: (a) a status of the visitor (e.g., known, unknown, expected, or unexpected); (b) a detected identity of the visitor; and/or (c) whether a visitor is expected when the motion event is identified.

In some implementations, (4) identifying the plurality of appropriate actions available to the user includes ranking one or more actions based on the context information, and ordering the one or more actions based on the ranking. In some implementations, a number of identified actions to be presented to the user of the client device is based on an amount of screen space available in a quick action area of a user interface of the client device. In some implementations, the number of identified actions to be presented to the user of the client device is based on dimensions of the client device. In some implementations, the number of identified actions to be presented to the user of the client device is based on an orientation of the client device. In some implementations, identifying the plurality of appropriate actions available to a user includes selecting N appropriate actions from a superset of P appropriate actions, where N and P are integers and P is greater than N, and identifying the selected appropriate actions as the plurality of appropriate actions. In other words, the number of appropriate actions displayed to the user is a subset of a master list of appropriate actions.

In some implementations, the method further includes: (5) receiving a selection of an identified action from the user of the client device, and (6) causing the action to be performed. For example, a smart home user selects a quick action requesting that a visitor state why she is visiting. In this example, the user selection triggers audio output by a speaker near the entryway (e.g., a speaker on a smart doorbell device) relaying the request.

In some implementations, the method further includes: (7) obtaining additional context information based on a visitor response to the performed action; (8) based on the additional context information, identifying a subsequent plurality of appropriate actions available to the user of the client device for interacting with the visitor via the electronic greeting system; and (9) causing the identified subsequent actions to be presented to the user of the client device. In some implementations, the method further includes: (10) receiving a subsequent selection of an identified subsequent action from the user of the client device, (11) and causing the subsequent action to be performed. For example, the visitor from the prior example states that she is visiting because she had a study session schedule with Susan, one of the smart home occupants. In this example, the smart home may then send a new set of quick actions to the smart home user, including (a) an action to unlock the door, (b) an action to alert Susan of the visitor, (c) an action to request that the visitor wait for someone to answer the door, and (d) an action notifying the visitor that Susan is unavailable and the study session must be canceled.

In some implementations, the method further includes: (12) continuously obtaining context information; (13) based on the continuously obtained context information, continuously identifying successive pluralities of appropriate actions available to the user of the client device for interacting with the visitor via the electronic greeting system; and (14) continuously causing the identified successive pluralities of actions to be presented to the user of the client device. In some implementations, the method further includes (15) successively receiving one or more selections of the continuously identified successive pluralities of actions from the user of the client device, and (16) causing the one or more selected actions to be performed.

In another aspect, some implementations include an electronic greeting system configured to perform any of the methods described herein. In some implementations, the electronic greeting system includes means for performing any of the operations described herein. In some implementations, the electronic greeting system includes one or more cameras and a server system. In some implementations, the electronic greeting system includes a doorbell device having one or more microphones, one or more speakers, one or more cameras, and a user interface (e.g., a touch screen and/or an affordance for triggering the device).

Thus, systems are provided with more efficient and effective methods for monitoring and facilitating review of events and persons in video streams, thereby increasing the accuracy, effectiveness, efficiency, and user satisfaction with such systems. In addition, systems are provided with more effective methods for responding to or interacting with persons in video streams, thereby increasing the accuracy, effectiveness, efficiency, and user satisfaction with such systems. Such systems and methods may complement or replace conventional systems and methods for event and person monitoring, presentation, response, and interaction.

BRIEF DESCRIPTION OF THE DRAWINGS

For a better understanding of the various described implementations, reference should be made to the Description of Implementations below, in conjunction with the following drawings in which like reference numerals refer to corresponding parts throughout the figures.

FIGS. 10A-10L illustrate representative user interfaces for notifying a user of a client device that a visitor is approaching, and for facilitating an interaction with the visitor in accordance with some implementations.

Like reference numerals refer to corresponding parts throughout the several views of the drawings.

DETAILED DESCRIPTION

Figure 1:
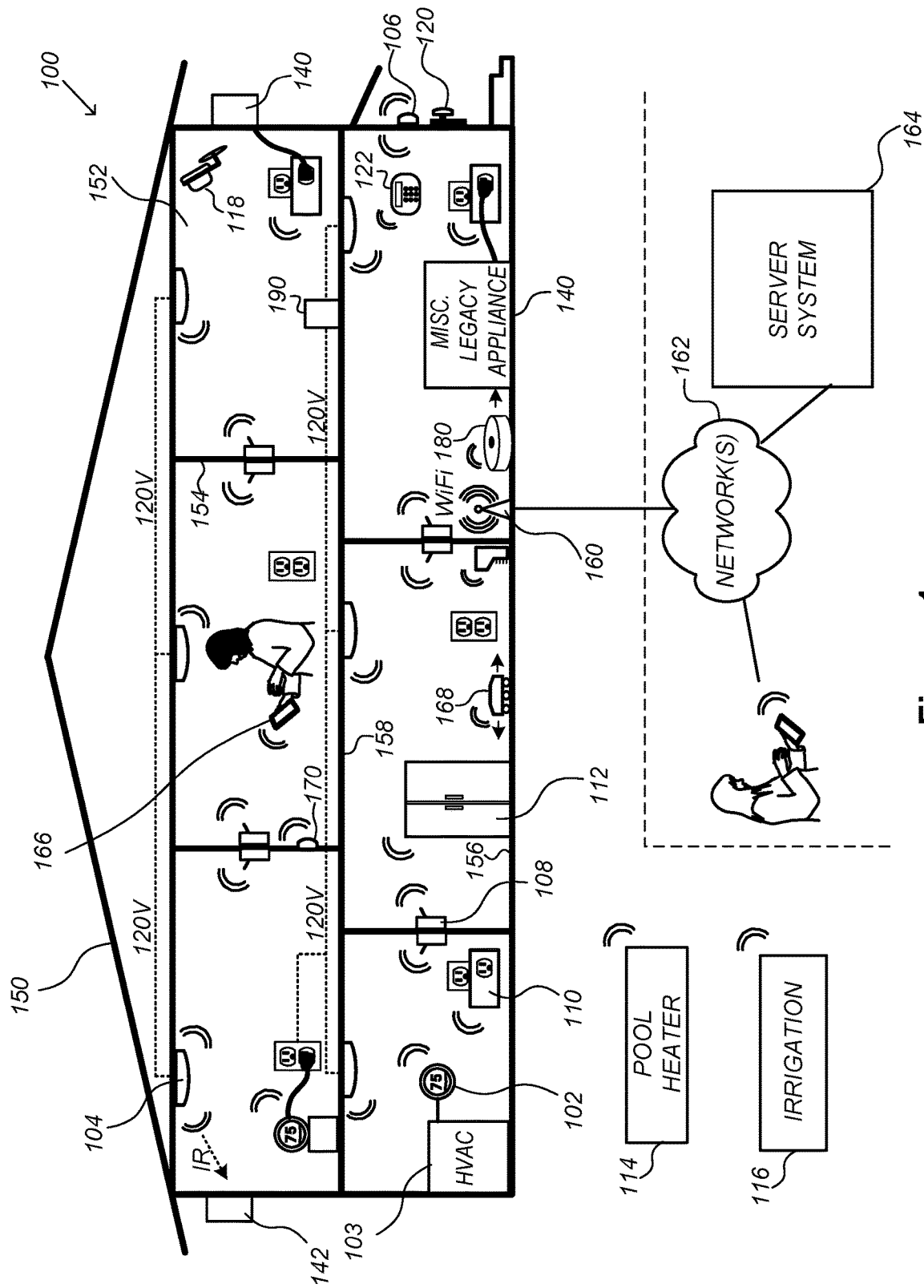
FIG. 1 is an example smart home environment in accordance with some implementations.

Due to the potentially large number of alerts and notifications associated with home monitoring systems, it is beneficial to employ some recognition/identification and categorization processes. For example, rather than notifying a user every time a person walks in front of a camera mounted at an entryway of the home, it is beneficial to be able to recognize whether the motion event is caused by a visitor approaching the entryway or by a mere passerby, and inform the user of the type of event that occurred and the persons/entities involved. This enables the user to more quickly and efficiently make a determination as to whether the event requires any action or further review by the user. In this way, the user can more quickly and easily distinguish important events (e.g., events requiring an immediate response or more detailed review) from trivial ones that do not require further review or response. Further, the user can see at a glance the nature of the event and request more details (e.g., a clip of the event) and/or generate a response (e.g., alert the authorities, or initiate a communication).

In addition, due to the many different scenarios in which a visitor may approach a user's home, it is beneficial to have a wide range of options available for responding to a visitor in such scenarios, such as alerting the authorities, initiating two-way communication with the visitor, adjusting security settings in the home, and the like. Moreover, it is beneficial to be able to recognize contextual information regarding the visitor and present an appropriate subset of the options that are relevant to the specific situation. For example, if a known visitor approaches the entryway, the system can provide a subset of actions that are appropriate for a known visitor (e.g., a greeting, and/or an option to unlock the door). On the other hand, if an unknown visitor approaches the entryway, the system can provide a different subset of actions that are appropriate for an unknown visitor (e.g., a warning, an option to lock the door, and/or an option to call the authorities).

Accordingly, some implementations include a network-connected electronic greeting system including a camera that recognizes contextual information related to detected visitors. In some implementations, when a visitor presses a doorbell (or knocks or makes a verbal announcement), the system sends an indication to the user's device (also sometimes referred to herein as a client device and a portable electronic device; e.g., a smartphone) that there was a visitor announcement (e.g., a doorbell button press or a knock), and the user's device displays an alert (or other type of notification). In some implementations, the alert includes a video clip (e.g., a gif) and/or a static image of the visitor. In some implementations, if the system senses a motion event involving an approaching visitor, and the visitor does not make an announcement (e.g., does not press the doorbell or knock on the door) within a threshold amount of time, the system sends an indication to the user's device that there is a visitor that has not yet made an announcement (sometimes referred to herein as a lingering visitor).

In some implementations, a user interface of the user device includes an option to ignore the alert, an option to initiate a voice or text-to-speech communication with the visitor, and an option to display a list of suggested actions (also sometimes referred to herein as quick actions). In some implementations, the option to display quick actions is available before and during a voice or text-to-speech communication session. In some implementations, selecting the option to display quick actions does not open a microphone on the user device, which enables the user to respond without transmitting live audio of the user. For example, if the user is in a meeting, or otherwise unable or unwilling to transmit live audio, the user is still able to respond via the quick actions.

In some implementations, a user interface of the user device includes an option to have the smart home system interact with the visitor (e.g., via a virtual assistant). Use of the virtual assistant to interact with the visitor is also sometimes referred to herein as a talkback interaction. In some implementations, the smart home system provides the user with a summary of the virtual assistant's interaction with the visitor.

In some implementations, the user may preprogram one or more of the quick actions or assistant responses. In some implementations, the user may preprogram a quick action or an assistant response by speaking into a speaker device of the smart home environment. In some implementations, the user may preprogram a quick action or an assistant response by using a client device, an electronic greeting system, a server system, or any other suitable computer system associated with the smart home environment.

In some implementations, at least a subset of the quick actions are communication-based, such as sending a voice or text-to-speech message, initiating a talkback interaction, and/or initiating a prerecorded greeting. A prerecorded greeting or warning message is optionally a recording of a person's voice (e.g., the user's voice) or an artificial voice (e.g., a virtual assistant's voice). In some implementations, at least a subset of the quick actions are action-oriented, such as increasing a security level of the smart home environment, locking or unlocking a door, turning on or off a light, calling the authorities, alerting a security company or other person associated with the smart home (e.g., a neighbor), capturing a snapshot or video clip of the visitor (e.g., and sending it to the authorities, or storing it on a user-accessible server system), and/or turning on or off an alarm. In some implementations, a list of presented quick actions includes at least one communication-based quick action and at least one action-oriented quick action. In some implementations, at least a subset of the quick actions are personalized for known visitors (e.g., sending a personalized greeting or instructions, taking a message, and/or asking for a passcode). In some implementations, at least a subset of the quick actions are specific to a type of building (e.g. a house, condominium, apartment building, and/or a workplace). In some implementations, at least a subset of the quick actions are specific to a smart home user's situation and/or temperament, such as whether the smart home user is home (e.g., alone) or away, or whether the user does not currently feel safe (e.g., has been receiving threats). For example, if the smart home user is currently feeling unsafe the system provides more security-oriented actions, whereas if the smart home user is feeling safe the system provides more greetings-based actions.

In some implementations, the electronic greeting system includes a do-not-disturb mode, during which alerts are limited. In some implementations, alerts are limited by muting (or decreasing the volume of) a doorbell sound effect inside the home, while still sending alerts or other notifications to a client device. In some implementations, independent of whether an internal doorbell sound is played, an external doorbell sound is played to give the visitor feedback that the doorbell has been pressed. In some implementations, the system provides visual feedback to the user (e.g., a spinning wheel or a preprogrammed message on a display mounted near, or integrated with, the doorbell). In some implementations, alerts are limited by silencing alerts sent to the client device. In some implementations, while in do-not-disturb mode, the electronic greeting system (e.g., through an assistant) asks the visitor if the visit is important. If so, the system sends a corresponding alert to the user and, optionally, ceases limiting alerts. If not, the system informs the visitor that the user is unavailable and asks the visitor to leave a message for the user. It is appreciated that the system will not inform a visitor that the user is busy or not at home if security-related contextual information makes it imprudent to do so. In some implementations, after determining that the user is busy, the electronic greeting system captures an image or video clip of the visitor for reporting to the user. In some implementations, if the visitor's face has not remained in the camera's field of view long enough to capture a desired image or video clip (e.g., an image or video clip showing am unobstructed frontal view of the visitor's face), the system requests that the visitor remain in front of the door for a moment (e.g., until the system has had sufficient time to capture an image or video clip). In some implementations, when the user engages the electronic greeting system after a visitor occurred, the system provides a report to the user regarding the visit.

In some implementations, the electronic greeting system is selectively coupled to the smart home environment via two or more communication channels (e.g., via WiFi and Bluetooth). For example, when the smart home WiFi is interrupted, the greeting system switches to a backup network, such as Bluetooth.

In some implementations, the electronic greeting system includes a camera mounted near or integrated with a doorbell device. Additionally or alternatively, the electronic greeting system includes a camera mounted at a higher position (e.g., 5 ft, 6 ft, or 8 ft high) in order to have a better view of the visitor's face.

In some implementations, the electronic greeting system detects knocking by sensing for a sequence of knocks. In some implementations, while detecting knocks, the system accommodates for different door materials and/or types (e.g., wood, metal, front door, back door). In some implementations, while detecting knocks, the system accommodates for ambient noise from the environment surrounding the entryway. In some implementations, the system only senses for knocking upon a determination that a visitor is approaching. In some implementations, upon detection of a knock, the system rings the doorbell, sends a corresponding notification to the client device, and/or captures an image or video clip of the visitor.

Turning now to the figures, FIG. 1 is an example smart home environment 100 in accordance with some implementations. The smart home environment 100 includes a structure 150 (e.g., a house, office building, garage, or mobile home) with various integrated devices. It will be appreciated that devices may also be integrated into a smart home environment 100 that does not include an entire structure 150, such as an apartment, condominium, or office space. Further, the smart home environment 100 may control and/or be coupled to devices outside of the actual structure 150. Indeed, several devices in the smart home environment 100 need not be physically within the structure 150. For example, a device controlling a pool heater 114 or irrigation system 116 may be located outside of the structure 150.

It is to be appreciated that "smart home environments" may refer to smart environments for homes such as a single-family house, but the scope of the present teachings is not so limited. The present teachings are also applicable, without limitation, to duplexes, townhomes, multi-unit apartment buildings, hotels, retail stores, office buildings, industrial buildings, and more generally any living space or work space.

It is also to be appreciated that while the terms user, customer, installer, homeowner, occupant, guest, tenant, landlord, repair person, and the like may be used to refer to the person or persons acting in the context of some particularly situations described herein, these references do not limit the scope of the present teachings with respect to the person or persons who are performing such actions. Thus, for example, the terms user, customer, purchaser, installer, subscriber, and homeowner may often refer to the same person in the case of a single-family residential dwelling, because the head of the household is often the person who makes the purchasing decision, buys the unit, and installs and configures the unit, and is also one of the users of the unit. However, in other scenarios, such as a landlord-tenant environment, the customer may be the landlord with respect to purchasing the unit, the installer may be a local apartment supervisor, a first user may be the tenant, and a second user may again be the landlord with respect to remote control functionality. Importantly, while the identity of the person performing the action may be germane to a particular advantage provided by one or more of the implementations, such identity should not be construed in the descriptions that follow as necessarily limiting the scope of the present teachings to those particular individuals having those particular identities.

The depicted structure 150 includes a plurality of rooms 152, separated at least partly from each other via walls 154. The walls 154 may include interior walls or exterior walls. Each room may further include a floor 156 and a ceiling 158. Devices may be mounted on, integrated with and/or supported by a wall 154, floor 156 or ceiling 158.

In some implementations, the integrated devices of the smart home environment 100 include intelligent, multi-sensing, network-connected devices that integrate seamlessly with each other in a smart home network (e.g., 202 FIG. 2A) and/or with a central server or a cloud-computing system to provide a variety of useful smart home functions. The smart home environment 100 may include one or more intelligent, multi-sensing, network-connected thermostats 102 (hereinafter referred to as "smart thermostats 102"), one or more intelligent, network-connected, multi-sensing hazard detection units 104 (hereinafter referred to as "smart hazard detectors 104"), one or more intelligent, multi-sensing, network-connected entryway interface devices 106 and 120 (hereinafter referred to as "smart doorbells 106" and "smart door locks 120"), and one or more intelligent, multi-sensing, network-connected alarm systems 122 (hereinafter referred to as "smart alarm systems 122").

In some implementations, the one or more smart thermostats 102 detect ambient climate characteristics (e.g., temperature and/or humidity) and control a HVAC system 103 accordingly. For example, a respective smart thermostat 102 includes an ambient temperature sensor.

The one or more smart hazard detectors 104 may include thermal radiation sensors directed at respective heat sources (e.g., a stove, oven, other appliances, a fireplace, etc.). For example, a smart hazard detector 104 in a kitchen 153 includes a thermal radiation sensor directed at a stove/oven 112. A thermal radiation sensor may determine the temperature of the respective heat source (or a portion thereof) at which it is directed and may provide corresponding blackbody radiation data as output.

The smart doorbell 106 and/or the smart door lock 120 may detect a person's approach to or departure from a location (e.g., an outer door), control doorbell/door locking functionality (e.g., receive user inputs from a portable electronic device 166 to actuate bolt of the smart door lock 120), announce a person's approach or departure via audio or visual means, and/or control settings on a security system (e.g., to activate or deactivate the security system when occupants go and come). In some implementations, the smart doorbell 106 includes some or all of the components and features of the camera 118. In some implementations, the smart doorbell 106 includes a camera 118. In some implementations, the smart doorbell 106 includes a camera 118 that is embedded in the doorbell 106. In some implementations, the smart doorbell 106 includes a camera that is mounted on or near the doorbell 106. In some implementations, the smart doorbell 106 includes a camera 118 that is not mounted in, on, or near the doorbell 106, but is instead mounted in proximity to the doorbell 106. In some implementations, the smart doorbell 106 includes two or more cameras 118 (e.g., one camera facing the entryway, and another camera facing approaching visitors). In some implementations, the smart doorbell 106 has a camera (also sometimes referred to herein as doorbell camera 106) which is separate from a video camera 118. For the purposes of this disclosure, video-related references to doorbell 106 refer to one or more cameras associated with doorbell 106.

The smart alarm system 122 may detect the presence of an individual within close proximity (e.g., using built-in IR sensors), sound an alarm (e.g., through a built-in speaker, or by sending commands to one or more external speakers), and send notifications to entities or users within/outside of the smart home network 100. In some implementations, the smart alarm system 122 also includes one or more input devices or sensors (e.g., keypad, biometric scanner, NFC transceiver, microphone) for verifying the identity of a user, and one or more output devices (e.g., display, speaker). In some implementations, the smart alarm system 122 may also be set to an "armed" mode, such that detection of a trigger condition or event causes the alarm to be sounded unless a disarming action is performed.

In some implementations, the smart home environment 100 includes one or more intelligent, multi-sensing, network-connected wall switches 108 (hereinafter referred to as "smart wall switches 108"), along with one or more intelligent, multi-sensing, network-connected wall plug interfaces 110 (hereinafter referred to as "smart wall plugs 110"). The smart wall switches 108 may detect ambient lighting conditions, detect room-occupancy states, and control a power and/or dim state of one or more lights. In some instances, smart wall switches 108 may also control a power state or speed of a fan, such as a ceiling fan. The smart wall plugs 110 may detect occupancy of a room or enclosure and control supply of power to one or more wall plugs (e.g., such that power is not supplied to the plug if nobody is at home).

In some implementations, the smart home environment 100 of FIG. 1 includes a plurality of intelligent, multi-sensing, network-connected appliances 112 (hereinafter referred to as "smart appliances 112"), such as refrigerators, stoves, ovens, televisions, washers, dryers, lights, stereos, intercom systems, garage-door openers, floor fans, ceiling fans, wall air conditioners, pool heaters, irrigation systems, security systems, space heaters, window AC units, motorized duct vents, and so forth. In some implementations, when plugged in, an appliance may announce itself to the smart home network, such as by indicating what type of appliance it is, and it may automatically integrate with the controls of the smart home. Such communication by the appliance to the smart home may be facilitated by either a wired or wireless communication protocol. The smart home may also include a variety of non-communicating legacy appliances 140, such as old conventional washer/dryers, refrigerators, and the like, which may be controlled by smart wall plugs 110. The smart home environment 100 may further include a variety of partially communicating legacy appliances 142, such as infrared ("IR") controlled wall air conditioners or other IR-controlled devices, which may be controlled by IR signals provided by the smart hazard detectors 104 or the smart wall switches 108.

In some implementations, the smart home environment 100 includes one or more network-connected cameras 118 that are configured to provide video monitoring and security in the smart home environment 100. The cameras 118 may be used to determine occupancy of the structure 150 and/or particular rooms 152 in the structure 150, and thus may act as occupancy sensors. For example, video captured by the cameras 118 may be processed to identify the presence of an occupant in the structure 150 (e.g., in a particular room 152). Specific individuals may be identified based, for example, on their appearance (e.g., height, face) and/or movement (e.g., their walk/gait). Cameras 118 may additionally include one or more sensors (e.g., IR sensors, motion detectors), input devices (e.g., microphone for capturing audio), and output devices (e.g., speaker for outputting audio). In some implementations, the cameras 118 are each configured to operate in a day mode and in a low-light mode (e.g., a night mode). In some implementations, the cameras 118 each include one or more IR illuminators for providing illumination while the camera is operating in the low-light mode. In some implementations, the cameras 118 include one or more outdoor cameras. In some implementations, the outdoor cameras include additional features and/or components such as weatherproofing and/or solar ray compensation.

In some implementations, the smart home environment 100 includes one or more network-connected doorbells 106 that are configured to provide video monitoring and security in a vicinity of an entryway of the smart home environment 100. The doorbells 106 are optionally used to determine the approach and/or presence of a visitor. Specific individuals are optionally identified based, for example, on their appearance (e.g., height, face) and/or movement (e.g., their walk/gait). A doorbell 106 optionally includes one or more sensors (e.g., IR sensors, motion detectors), input devices (e.g., microphone for capturing audio), and output devices (e.g., speaker for outputting audio). In some implementations, a doorbell 106 is configured to operate in a high-light mode (e.g., a day mode) and in a low-light mode (e.g., a night mode). In some implementations, a doorbell 106 includes one or more IR illuminators for providing illumination while the camera is operating in the low-light mode. In some implementations, a doorbell 106 includes one or more lights (e.g., one or more LEDs) for illuminating the doorbell in low-light conditions and/or giving visual feedback to a visitor. In some implementations, a doorbell 106 includes additional features and/or components such as weatherproofing and/or solar ray compensation. In some implementations, doorbell 106 is battery powered and runs in a low power or a high power mode. In some implementations, in the low power mode, doorbell 106 detects an approaching visitor using a low power sensors such as a PIR sensor which is always on or periodically on. In some implementations, after the visitor approach is detected, doorbell 106 switches to the high power mode to carry out further processing functions (described below).

In some implementations, the smart home environment 100 additionally or alternatively includes one or more other occupancy sensors (e.g., the smart doorbell 106, smart door locks 120, touch screens, IR sensors, microphones, ambient light sensors, motion detectors, smart nightlights 170, etc.). In some implementations, the smart home environment 100 includes radio-frequency identification (RFID) readers (e.g., in each room 152 or a portion thereof) that determine occupancy based on RFID tags located on or embedded in occupants. For example, RFID readers may be integrated into the smart hazard detectors 104.

In some implementations, the smart home environment 100 includes one or more devices outside of the physical home but within a proximate geographical range of the home. For example, the smart home environment 100 may include a pool heater monitor 114 that communicates a current pool temperature to other devices within the smart home environment 100 and/or receives commands for controlling the pool temperature. Similarly, the smart home environment 100 may include an irrigation monitor 116 that communicates information regarding irrigation systems within the smart home environment 100 and/or receives control information for controlling such irrigation systems.

By virtue of network connectivity, one or more of the smart home devices of FIG. 1 may further allow a user to interact with the device even if the user is not proximate to the device. For example, a user may communicate with a device using a computer (e.g., a desktop computer, laptop computer, or tablet) or other portable electronic device 166 (e.g., a mobile phone, such as a smart phone). A webpage or application may be configured to receive communications from the user and control the device based on the communications and/or to present information about the device's operation to the user. For example, the user may view a current set point temperature for a device (e.g., a stove) and adjust it using a computer. The user may be in the structure during this remote communication or outside the structure.

As discussed above, users may control smart devices in the smart home environment 100 using a network-connected computer or portable electronic device 166. In some examples, some or all of the occupants (e.g., individuals who live in the home) may register their device 166 with the smart home environment 100. Such registration may be made at a central server to authenticate the occupant and/or the device as being associated with the home and to give permission to the occupant to use the device to control the smart devices in the home. An occupant may use their registered device 166 to remotely control the smart devices of the home, such as when the occupant is at work or on vacation. The occupant may also use their registered device to control the smart devices when the occupant is actually located inside the home, such as when the occupant is sitting on a couch inside the home. It should be appreciated that instead of or in addition to registering devices 166, the smart home environment 100 may make inferences about which individuals live in the home and are therefore occupants and which devices 166 are associated with those individuals. As such, the smart home environment may "learn" who is an occupant and permit the devices 166 associated with those individuals to control the smart devices of the home.

In some implementations, in addition to containing processing and sensing capabilities, devices 102, 104, 106, 108, 110, 112, 114, 116, 118, 120, and/or 122 (collectively referred to as "the smart devices") are capable of data communications and information sharing with other smart devices, a central server or cloud-computing system, and/or other devices that are network-connected. Data communications may be carried out using any of a variety of custom or standard wireless protocols (e.g., IEEE 802.15.4, Wi-Fi, ZigBee, 6LoWPAN, Thread, Z-Wave, Bluetooth Smart, ISA100.5A, WirelessHART, MiWi, etc.) and/or any of a variety of custom or standard wired protocols (e.g., Ethernet, HomePlug, etc.), or any other suitable communication protocol, including communication protocols not yet developed as of the filing date of this document.

In some implementations, the smart devices serve as wireless or wired repeaters. In some implementations, a first one of the smart devices communicates with a second one of the smart devices via a wireless router. The smart devices may further communicate with each other via a connection (e.g., network interface 160) to a network, such as the Internet 162. Through the Internet 162, the smart devices may communicate with a server system 164 (also called a central server system and/or a cloud-computing system herein). The server system 164 may be associated with a manufacturer, support entity, or service provider associated with the smart device(s). In some implementations, a user is able to contact customer support using a smart device itself rather than needing to use other communication means, such as a telephone or Internet-connected computer. In some implementations, software updates are automatically sent from the server system 164 to smart devices (e.g., when available, when purchased, or at routine intervals).

In some implementations, the network interface 160 includes a conventional network device (e.g., a router), and the smart home environment 100 of FIG. 1 includes a hub device 180 that is communicatively coupled to the network(s) 162 directly or via the network interface 160. The hub device 180 is further communicatively coupled to one or more of the above intelligent, multi-sensing, network-connected devices (e.g., smart devices of the smart home environment 100). Each of these smart devices optionally communicates with the hub device 180 using one or more radio communication networks available at least in the smart home environment 100 (e.g., ZigBee, Z-Wave, Insteon, Bluetooth, Wi-Fi and other radio communication networks). In some implementations, the hub device 180 and devices coupled with/to the hub device can be controlled and/or interacted with via an application running on a smart phone, household controller, laptop, tablet computer, game console or similar electronic device. In some implementations, a user of such controller application can view status of the hub device or coupled smart devices, configure the hub device to interoperate with smart devices newly introduced to the home network, commission new smart devices, and adjust or view settings of connected smart devices, etc. In some implementations the hub device extends capabilities of low capability smart device to match capabilities of the highly capable smart devices of the same type, integrates functionality of multiple different device types—even across different communication protocols, and is configured to streamline adding of new devices and commissioning of the hub device. In some implementations, hub device 180 further comprises a local storage device for storing data related to, or output by, smart devices of smart home environment 100. In some implementations, the data includes one or more of: video data output by a camera device, metadata output by a smart device, settings information for a smart device, usage logs for a smart device, and the like.

In some implementations, smart home environment 100 includes a local storage device 190 for storing data related to, or output by, smart devices of smart home environment 100. In some implementations, the data includes one or more of: video data output by a camera device (e.g., a camera included with doorbell 106), metadata output by a smart device, settings information for a smart device, usage logs for a smart device, and the like. In some implementations, local storage device 190 is communicatively coupled to one or more smart devices via a smart home network (e.g., smart home network 202, FIG. 2A). In some implementations, local storage device 190 is selectively coupled to one or more smart devices via a wired and/or wireless communication network. In some implementations, local storage device 190 is used to store video data when external network conditions are poor. For example, local storage device 190 is used when an encoding bitrate of the camera included with doorbell 106 exceeds the available bandwidth of the external network (e.g., network(s) 162). In some implementations, local storage device 190 temporarily stores video data from one or more doorbells (e.g., doorbell 106) prior to transferring the video data to a server system (e.g., server system 164).

Figure 2A:
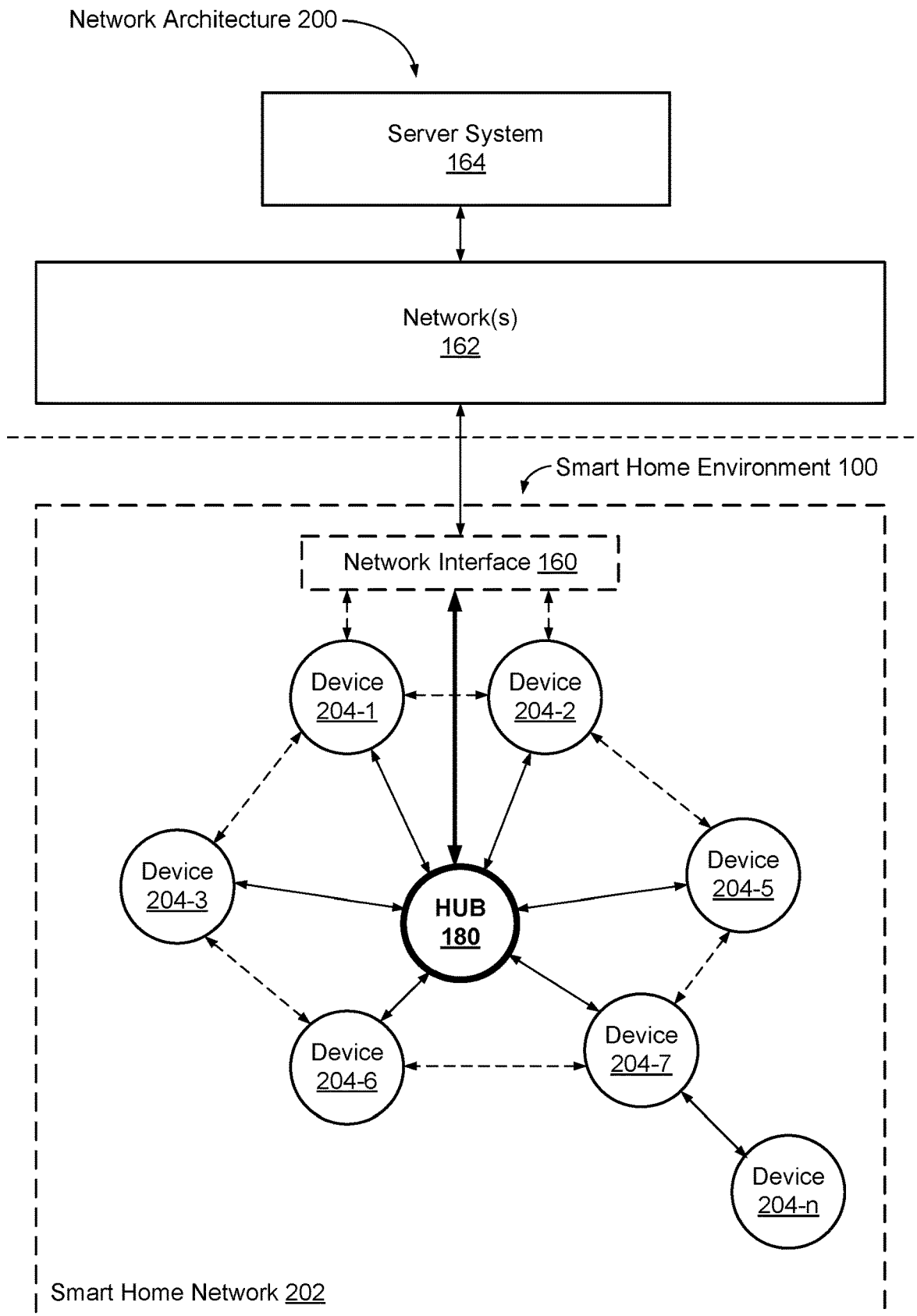
FIG. 2A is a block diagram illustrating a representative network architecture that includes a smart home network in accordance with some implementations.

FIG. 2A is a block diagram illustrating a representative network architecture 200 that includes a smart home network 202 in accordance with some implementations. In some implementations, the smart devices 204 in the smart home environment 100 (e.g., devices 102, 104, 106, 108, 110, 112, 114, 116, 118, 120, and/or 122) combine with the hub device 180 to create a mesh network in smart home network 202. In some implementations, one or more smart devices 204 in the smart home network 202 operate as a smart home controller. Additionally and/or alternatively, hub device 180 operates as the smart home controller. In some implementations, a smart home controller has more computing power than other smart devices. In some implementations, a smart home controller processes inputs (e.g., from smart devices 204, electronic device 166, and/or server system 164) and sends commands (e.g., to smart devices 204 in the smart home network 202) to control operation of the smart home environment 100. In some implementations, some of the smart devices 204 in the smart home network 202 (e.g., in the mesh network) are "spokesman" nodes (e.g., 204-1) and others are "low-powered" nodes (e.g., 204-9). Some of the smart devices in the smart home environment 100 are battery powered, while others have a regular and reliable power source, such as by connecting to wiring (e.g., to 120V line voltage wires) behind the walls 154 of the smart home environment. The smart devices that have a regular and reliable power source are referred to as "spokesman" nodes. These nodes are typically equipped with the capability of using a wireless protocol to facilitate bidirectional communication with a variety of other devices in the smart home environment 100, as well as with the server system 164. In some implementations, one or more "spokesman" nodes operate as a smart home controller. On the other hand, the devices that are battery powered are the "low-power" nodes. These nodes tend to be smaller than spokesman nodes and typically only communicate using wireless protocols that require very little power, such as Zigbee, ZWave, 6LoWPAN, Thread, Bluetooth, etc.

In some implementations, some low-power nodes are incapable of bidirectional communication. These low-power nodes send messages, but they are unable to "listen". Thus, other devices in the smart home environment 100, such as the spokesman nodes, cannot send information to these low-power nodes.

In some implementations, some low-power nodes are capable of only a limited bidirectional communication. For example, other devices are able to communicate with the low-power nodes only during a certain time period.

As described, in some implementations, the smart devices serve as low-power and spokesman nodes to create a mesh network in the smart home environment 100. In some implementations, individual low-power nodes in the smart home environment regularly send out messages regarding what they are sensing, and the other low-powered nodes in the smart home environment—in addition to sending out their own messages—forward the messages, thereby causing the messages to travel from node to node (i.e., device to device) throughout the smart home network 202. In some implementations, the spokesman nodes in the smart home network 202, which are able to communicate using a relatively high-power communication protocol, such as IEEE 802.11, are able to switch to a relatively low-power communication protocol, such as IEEE 802.15.4, to receive these messages, translate the messages to other communication protocols, and send the translated messages to other spokesman nodes and/or the server system 164 (using, e.g., the relatively high-power communication protocol). Thus, the low-powered nodes using low-power communication protocols are able to send and/or receive messages across the entire smart home network 202, as well as over the Internet 162 to the server system 164. In some implementations, the mesh network enables the server system 164 to regularly receive data from most or all of the smart devices in the home, make inferences based on the data, facilitate state synchronization across devices within and outside of the smart home network 202, and send commands to one or more of the smart devices to perform tasks in the smart home environment.

As described, the spokesman nodes and some of the low-powered nodes are capable of "listening." Accordingly, users, other devices, and/or the server system 164 may communicate control commands to the low-powered nodes. For example, a user may use the electronic device 166 (e.g., a smart phone) to send commands over the Internet to the server system 164, which then relays the commands to one or more spokesman nodes in the smart home network 202. The spokesman nodes may use a low-power protocol to communicate the commands to the low-power nodes throughout the smart home network 202, as well as to other spokesman nodes that did not receive the commands directly from the server system 164.

In some implementations, a smart nightlight 170 (FIG. 1), which is an example of a smart device 204, is a low-power node. In addition to housing a light source, the smart nightlight 170 houses an occupancy sensor, such as an ultrasonic or passive IR sensor, and an ambient light sensor, such as a photo resistor or a single-pixel sensor that measures light in the room. In some implementations, the smart nightlight 170 is configured to activate the light source when its ambient light sensor detects that the room is dark and when its occupancy sensor detects that someone is in the room. In other implementations, the smart nightlight 170 is simply configured to activate the light source when its ambient light sensor detects that the room is dark. Further, in some implementations, the smart nightlight 170 includes a low-power wireless communication chip (e.g., a ZigBee chip) that regularly sends out messages regarding the occupancy of the room and the amount of light in the room, including instantaneous messages coincident with the occupancy sensor detecting the presence of a person in the room. As mentioned above, these messages may be sent wirelessly (e.g., using the mesh network) from node to node (i.e., smart device to smart device) within the smart home network 202 as well as over the Internet 162 to the server system 164.

Other examples of low-power nodes include battery-operated versions of the smart hazard detectors 104. These smart hazard detectors 104 are often located in an area without access to constant and reliable power and may include any number and type of sensors, such as smoke/fire/heat sensors (e.g., thermal radiation sensors), carbon monoxide/dioxide sensors, occupancy/motion sensors, ambient light sensors, ambient temperature sensors, humidity sensors, and the like. Furthermore, smart hazard detectors 104 may send messages that correspond to each of the respective sensors to the other devices and/or the server system 164, such as by using the mesh network as described above.

Examples of spokesman nodes include smart doorbells 106, smart thermostats 102, smart wall switches 108, and smart wall plugs 110. These devices are often located near and connected to a reliable power source, and therefore may include more power-consuming components, such as one or more communication chips capable of bidirectional communication in a variety of protocols.

In some implementations, the smart home environment 100 includes service robots 168 (FIG. 1) that are configured to carry out, in an autonomous manner, any of a variety of household tasks.

As explained above with reference to FIG. 1, in some implementations, the smart home environment 100 of FIG. 1 includes a hub device 180 that is communicatively coupled to the network(s) 162 directly or via the network interface 160. The hub device 180 is further communicatively coupled to one or more of the smart devices using a radio communication network that is available at least in the smart home environment 100. Communication protocols used by the radio communication network include, but are not limited to, ZigBee, Z-Wave, Insteon, EuOcean, Thread, OSIAN, Bluetooth Low Energy and the like. In some implementations, the hub device 180 not only converts the data received from each smart device to meet the data format requirements of the network interface 160 or the network(s) 162, but also converts information received from the network interface 160 or the network(s) 162 to meet the data format requirements of the respective communication protocol associated with a targeted smart device. In some implementations, in addition to data format conversion, the hub device 180 further processes the data received from the smart devices or information received from the network interface 160 or the network(s) 162 preliminary. For example, the hub device 180 can integrate inputs from multiple sensors/connected devices (including sensors/devices of the same and/or different types), perform higher level processing on those inputs—e.g., to assess the overall environment and coordinate operation among the different sensors/devices—and/or provide instructions to the different devices based on the collection of inputs and programmed processing. It is also noted that in some implementations, the network interface 160 and the hub device 180 are integrated to one network device. Functionality described herein is representative of particular implementations of smart devices, control application(s) running on representative electronic device(s) (such as a smart phone), hub device(s) 180, and server(s) coupled to hub device(s) via the Internet or other Wide Area Network. All or a portion of this functionality and associated operations can be performed by any elements of the described system—for example, all or a portion of the functionality described herein as being performed by an implementation of the hub device can be performed, in different system implementations, in whole or in part on the server, one or more connected smart devices and/or the control application, or different combinations thereof.

Figure 2B:
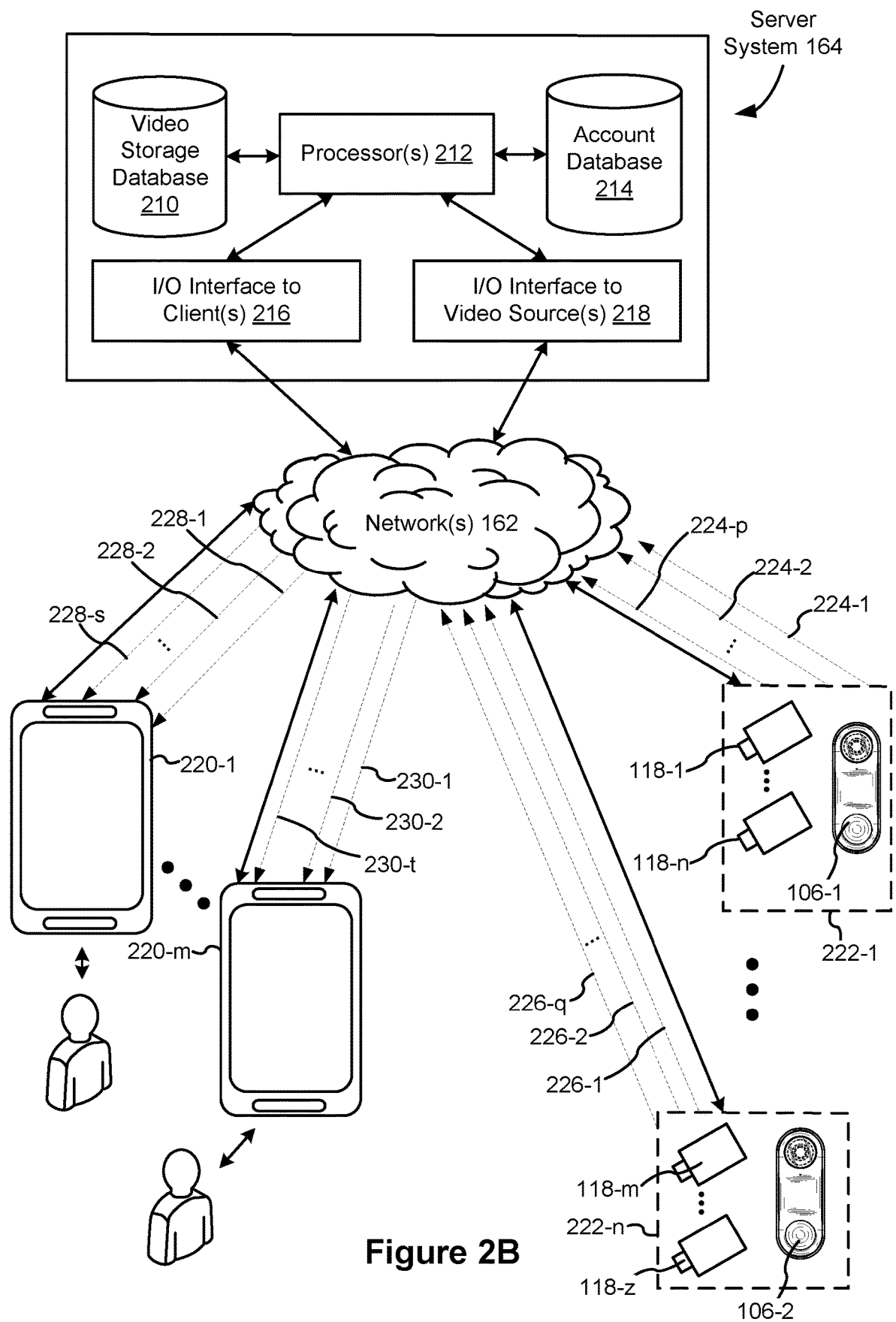
FIG. 2B is a representative operating environment in which a server system interacts with client devices and smart devices in accordance with some implementations.

FIG. 2B illustrates a representative operating environment in which a server system 164 provides data processing for monitoring and facilitating review of events (e.g., motion, audio, security, etc.) in video streams captured by video cameras 118 or doorbell cameras 106. As shown in FIG. 2B, the server system 164 receives video data from video sources 222 (including cameras 118 or doorbell cameras 106) located at various physical locations (e.g., inside or in proximity to homes, restaurants, stores, streets, parking lots, and/or the smart home environments 100 of FIG. 1). Each video source 222 may be bound to one or more reviewer accounts, and the server system 164 provides video monitoring data for the video source 222 to client devices 220 associated with the reviewer accounts. For example, the portable electronic device 166 is an example of the client device 220. In some implementations, the server system 164 is a video processing server that provides video processing services to the video sources and client devices 220.

In some implementations, each of the video sources 222 includes one or more video cameras 118 or doorbell cameras 106 that capture video and send the captured video to the server system 164 substantially in real-time. In some implementations, each of the video sources 222 includes one or more doorbell cameras 106 that capture video and send the captured video to the server system 164 in real-time (e.g., within 1 second, 10 seconds, 30 seconds, or 1 minute). In some implementations, each of the doorbells 106 include a video camera that captures video and sends the captured video to the server system 164 in real-time. In some implementations, a video source 222 includes a controller device (not shown) that serves as an intermediary between the one or more doorbells 106 and the server system 164. The controller device receives the video data from the one or more doorbells 106, optionally performs some preliminary processing on the video data, and sends the video data and/or the results of the preliminary processing to the server system 164 on behalf of the one or more doorbells 106 (e.g., in real-time). In some implementations, each camera has its own on-board processing capabilities to perform some preliminary processing on the captured video data before sending the video data (e.g., along with metadata obtained through the preliminary processing) to the controller device and/or the server system 164.

Figure 6:
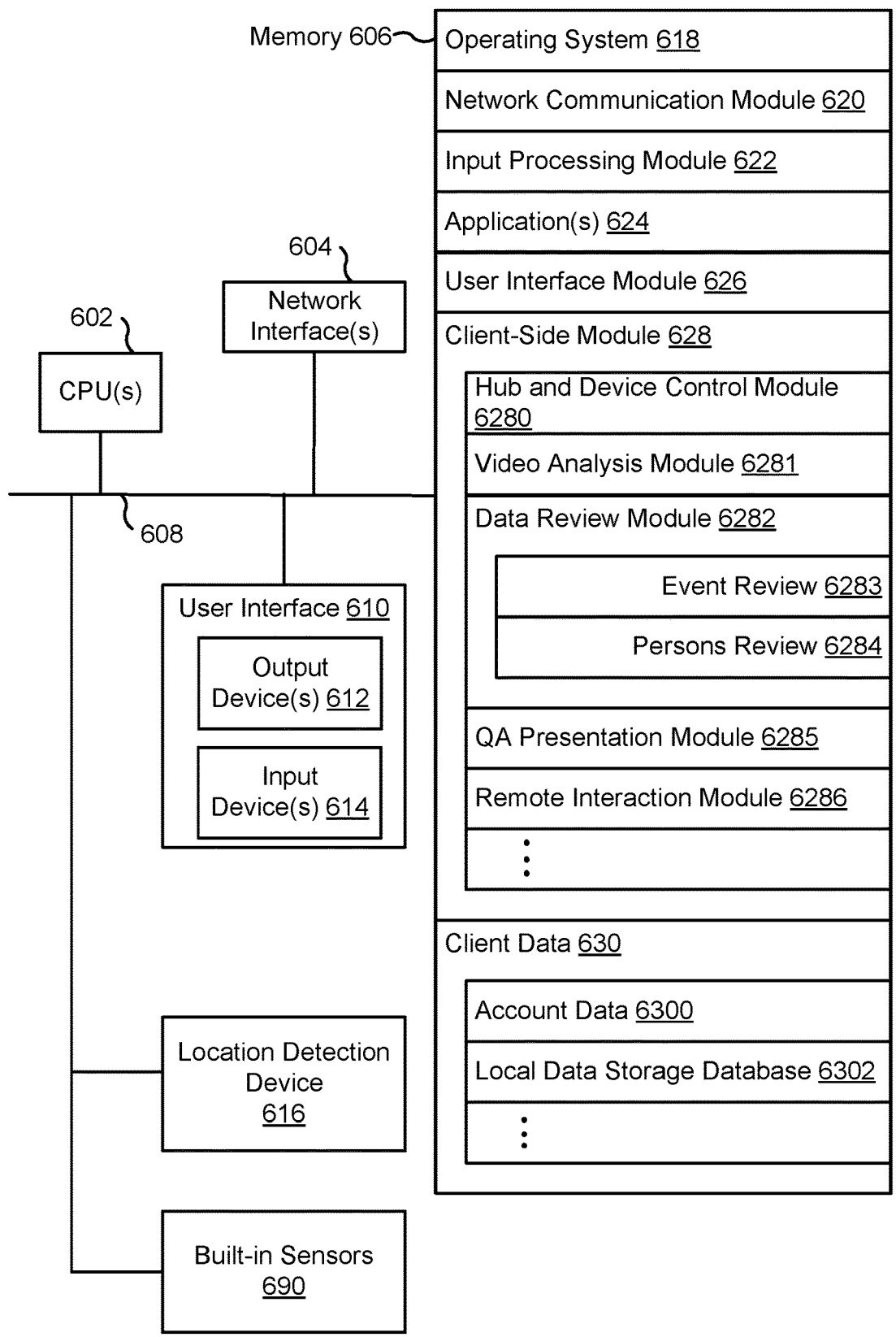
FIG. 6 is a block diagram illustrating a representative client device in accordance with some implementations.

In accordance with some implementations, a client device 220 includes a client-side module, such as client-side module 628 in FIG. 6. In some implementations, the client-side module communicates with a server-side module executed on the server system 164 through the one or more networks 162. The client-side module provides client-side functionality for the event monitoring and review processing and communications with the server-side module. The server-side module provides server-side functionality for event monitoring and review processing for any number of client-side modules each residing on a respective client device 220. In some implementations, the server-side module also provides server-side functionality for video processing and camera control for any number of the video sources 222, including any number of control devices, cameras 118, and doorbells 106.

In some implementations, the server system 164 includes one or more processors 212, a video storage database 210, an account database 214, an I/O interface to one or more client devices 216, and an I/O interface to one or more video sources 218. The I/O interface to one or more clients 216 facilitates the client-facing input and output processing. The account database 214 stores a plurality of profiles for reviewer accounts registered with the video processing server, where a respective user profile includes account credentials for a respective reviewer account, and one or more video sources linked to the respective reviewer account. The I/O interface to one or more video sources 218 facilitates communications with one or more video sources 222 (e.g., groups of one or more doorbells 106, cameras 118, and associated controller devices). The video storage database 210 stores raw video data received from the video sources 222, as well as various types of metadata, such as motion events, event categories, event category models, event filters, and event masks, for use in data processing for event monitoring and review for each reviewer account.

Examples of a representative client device 220 include a handheld computer, a wearable computing device, a personal digital assistant (PDA), a tablet computer, a laptop computer, a desktop computer, a cellular telephone, a smart phone, an enhanced general packet radio service (EGPRS) mobile phone, a media player, a navigation device, a game console, a television, a remote control, a point-of-sale (POS) terminal, a vehicle-mounted computer, an ebook reader, or a combination of any two or more of these data processing devices or other data processing devices.

Examples of the one or more networks 162 include local area networks (LAN) and wide area networks (WAN) such as the Internet. The one or more networks 162 are implemented using any known network protocol, including various wired or wireless protocols, such as Ethernet, Universal Serial Bus (USB), FIREWIRE, Long Term Evolution (LTE), Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

In some implementations, the server system 164 is implemented on one or more standalone data processing apparatuses or a distributed network of computers. In some implementations, the server system 164 also employs various virtual devices and/or services of third party service providers (e.g., third-party cloud service providers) to provide the underlying computing resources and/or infrastructure resources of the server system 164. In some implementations, the server system 164 includes, but is not limited to, a server computer, a handheld computer, a tablet computer, a laptop computer, a desktop computer, or a combination of any two or more of these data processing devices or other data processing devices.

The server-client environment shown in FIG. 2B includes both a client-side portion (e.g., the client-side module) and a server-side portion (e.g., the server-side module). The division of functionality between the client and server portions of operating environment can vary in different implementations. Similarly, the division of functionality between a video source 222 and the server system 164 can vary in different implementations. For example, in some implementations, the client-side module is a thin-client that provides only user-facing input and output processing functions, and delegates all other data processing functionality to a backend server (e.g., the server system 164). Similarly, in some implementations, a respective one of the video sources 222 is a simple video capturing device that continuously captures and streams video data to the server system 164 with limited or no local preliminary processing on the video data. Although many aspects of the present technology are described from the perspective of the server system 164, the corresponding actions performed by a client device 220 and/or the video sources 222 would be apparent to one of skill in the art. Similarly, some aspects of the present technology may be described from the perspective of a client device or a video source, and the corresponding actions performed by the video server would be apparent to one of skill in the art. Furthermore, some aspects of the present technology may be performed by the server system 164, a client device 220, and a video source 222 cooperatively.

In some implementations, a video source 222 (e.g., a camera 118 or doorbell 106 having an image sensor) transmits one or more streams of video data to the server system 164. In some implementations, the one or more streams include multiple streams, of respective resolutions and/or frame rates, of the raw video captured by the image sensor. In some implementations, the multiple streams include a "primary" stream (e.g., 226-1) with a certain resolution and frame rate, corresponding to the raw video captured by the image sensor, and one or more additional streams (e.g., 226-2 through 226-*q*). An additional stream is optionally the same video stream as the "primary" stream but at a different resolution and/or frame rate, or a stream that captures a portion of the "primary" stream (e.g., cropped to include a portion of the field of view or pixels of the primary stream) at the same or different resolution and/or frame rate as the "primary" stream.

In some implementations, one or more of the streams 226 is sent from the video source 222 directly to a client device 220 (e.g., without being routed to, or processed by, the server system 164). In some implementations, one or more of the streams is stored at the doorbell 106 (e.g., in memory 406, FIG. 4) and/or a local storage device (e.g., a dedicated recording device), such as a digital video recorder (DVR). For example, in accordance with some implementations, the doorbell 106 stores the most recent 24 hours of video footage recorded by the camera. In some implementations, portions of the one or more streams are stored at the doorbell 106 and/or the local storage device (e.g., portions corresponding to particular events or times of interest).

In some implementations, the server system 164 transmits one or more streams of video data to a client device 220 to facilitate event monitoring by a user. In some implementations, the one or more streams may include multiple streams, of respective resolutions and/or frame rates, of the same video feed. In some implementations, the multiple streams include a "primary" stream with a certain resolution and frame rate, corresponding to the video feed, and one or more additional streams. An additional stream may be the same video stream as the "primary" stream but at a different resolution and/or frame rate, or a stream that shows a portion of the "primary" stream (e.g., cropped to include portion of the field of view or pixels of the primary stream) at the same or different resolution and/or frame rate as the "primary" stream, as described in greater detail in U.S. patent application Ser. No. 15/594,518.

Figure 3A:
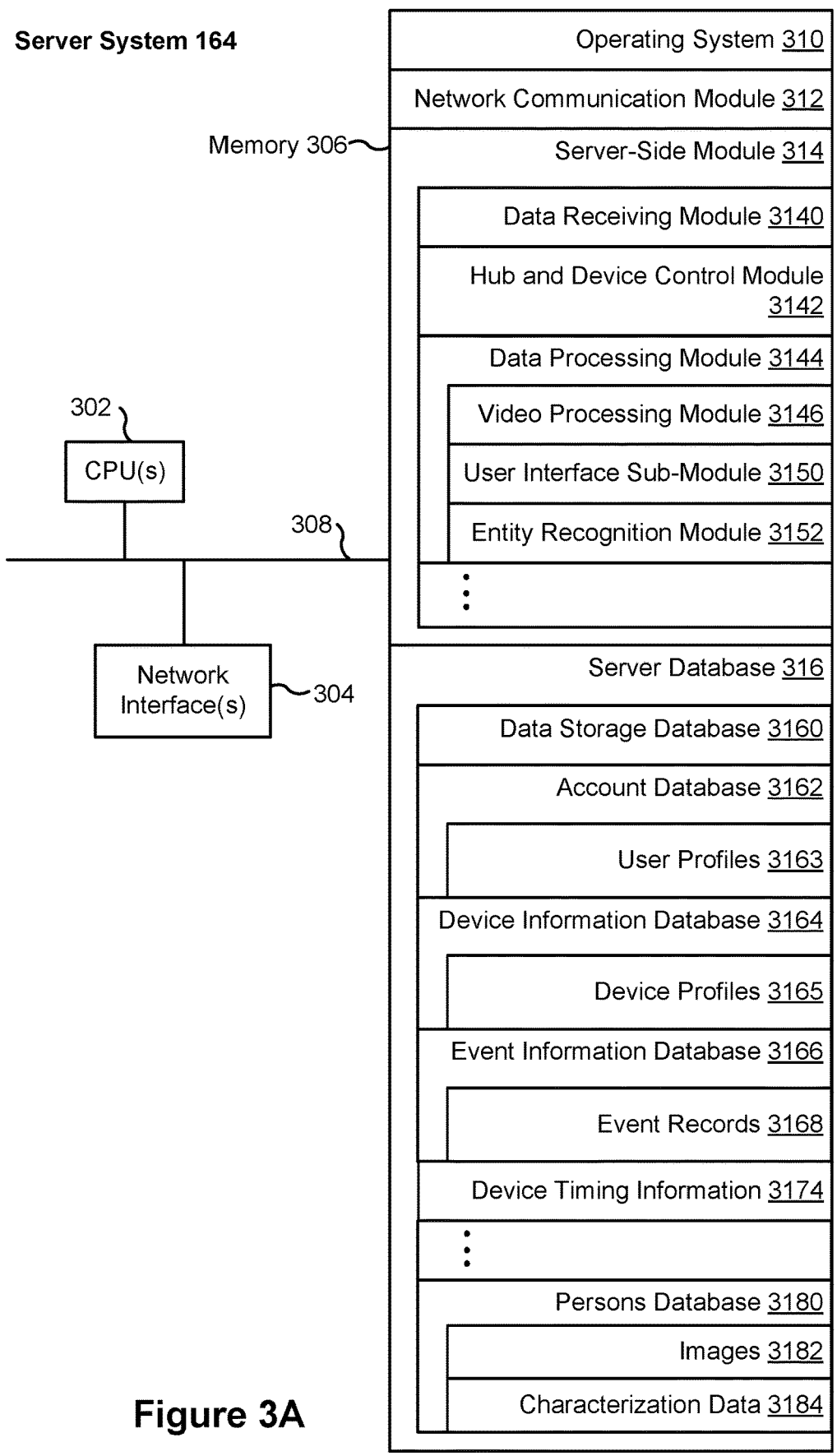
FIG. 3A is a block diagram illustrating a representative server system in accordance with some implementations.

FIG. 3A is a block diagram illustrating the server system 164 in accordance with some implementations. The server system 164 typically includes one or more processing units (CPUs) 302, one or more network interfaces 304 (e.g., including an I/O interface to one or more client devices and an I/O interface to one or more electronic devices), memory 306, and one or more communication buses 308 for interconnecting these components (sometimes called a chipset). The memory 306 includes high-speed random access memory, such as DRAM, SRAM, DDR SRAM, or other random access solid state memory devices; and, optionally, includes non-volatile memory, such as one or more magnetic disk storage devices, one or more optical disk storage devices, one or more flash memory devices, or one or more other non-volatile solid state storage devices. The memory 306, optionally, includes one or more storage devices remotely located from one or more processing units 302. The memory 306, or alternatively the non-volatile memory within memory 306, includes a non-transitory computer readable storage medium. In some implementations, the memory 306, or the non-transitory computer readable storage medium of the memory 306, stores the following programs, modules, and data structures, or a subset or superset thereof:

an operating system 310 including procedures for handling various basic system services and for performing hardware dependent tasks;

a network communication module 312 for connecting the server system 164 to other systems and devices (e.g., client devices, electronic devices, and systems connected to one or more networks 162) via one or more network interfaces 304 (wired or wireless);

a server-side module 314, which provides server-side functionalities for device control, data processing, and data review, including, but not limited to:

a data receiving module 3140 for receiving data from electronic devices (e.g., video data from a doorbell 106, FIG. 1), and preparing the received data for further processing and storage in the data storage database 3160;

a hub and device control module 3142 for generating and sending server-initiated control commands to modify operation modes of electronic devices (e.g., devices of a smart home environment 100), and/or receiving (e.g., from client devices 220) and forwarding user-initiated control commands to modify operation modes of the electronic devices;

a data processing module 3144 for processing the data provided by the electronic devices, and/or preparing and sending processed data to a device for review (e.g., client devices 220 for review by a user), including, but not limited to:
- a video processor sub-module 3146 for processing (e.g., categorizing and/or recognizing) detected entities and/or event candidates within a received video stream (e.g., a video stream from doorbell 106); and
- a user interface sub-module 3150 for communicating with a user (e.g., sending alerts, timeline events, etc. and receiving user edits and zone definitions and the like); and a server database 316, including but not limited to:
- a data storage database 3160 for storing data associated with each electronic device (e.g., each doorbell) of each user account, as well as data processing models, processed data results, and other relevant metadata (e.g., names of data results, location of electronic device, creation time, duration, settings of the electronic device, etc.) associated with the data, where (optionally) all or a portion of the data and/or processing associated with the hub device 180 or smart devices are stored securely;
- an account database 3162 for storing account information for user accounts, including user account information such as user profiles 3163, information and settings for linked hub devices and electronic devices (e.g., hub device identifications), hub device specific secrets, relevant user and hardware characteristics (e.g., service tier, device model, storage capacity, processing capabilities, etc.), user interface settings, data review preferences, etc., where the information for associated electronic devices includes, but is not limited to, one or more device identifiers (e.g., MAC address and UUID), device specific secrets, and displayed titles;
- a device information database 3164 for storing device information related to one or more devices such as device profiles 3165, e.g., device identifiers and hub device specific secrets, independently of whether the corresponding hub devices have been associated with any user account;
- an event information database 3166 for storing event information such as context information 31686, e.g., contextual data describing circumstances surrounding an approaching visitor; and
- a persons database 3180 for storing information regarding detected and/or recognized persons, such as images (e.g., cropped headshots) 3182 of detected persons and feature characterization data 3184 for the persons.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise rearranged in various implementations. In some implementations, the memory 306, optionally, stores a subset of the modules and data structures identified above. Furthermore, the memory 306, optionally, stores additional modules and data structures not described above.

Figure 3B:
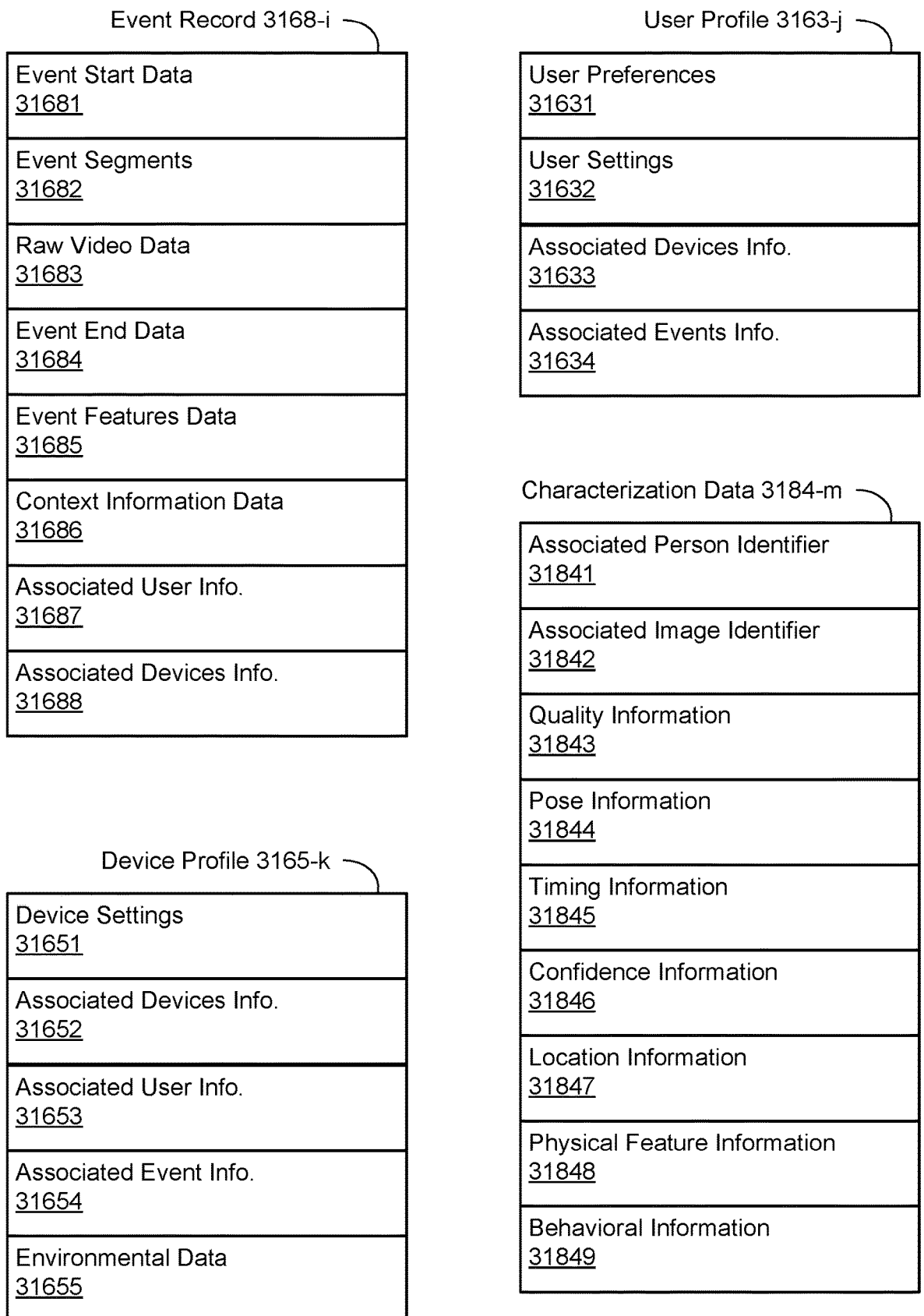
FIG. 3B illustrates various data structures used in some implementations.

FIG. 3B illustrates various data structures used by some implementations, including an event record 3168-*i*, a user profile 3163-*j*, a device profile 3165-*k*, and characterization data 3184-*m*. The event record 3168-*i* corresponds to an event 'i' and data for the event 'i'. In some implementations, the event 'i' includes one or more of: a motion event, a hazard event, an audio event, and a security event. In some instances, the data for a motion event 'i' includes event start data 31681 indicating when and/or how the event started, event segments data 31682, raw video data 31683, event end data 31684 indicating when and/or how the event ended, event features data 31685, context information data 31686, associated user information 31687, and associated devices information 31688. In some instances, the event record 3168-*i* includes only a subset of the above data. In some instances, the event record 3168-*i* includes additional event data not shown such as data regarding event/motion masks.

The event start data 31681 includes date and time information such as a timestamp and optionally includes additional information such as information regarding the amount of motion present, a motion start location, amount of audio present, characteristics of the audio, and the like. Similarly, the event end data 31684 includes date and time information such as a timestamp and optionally includes additional information such as information regarding the amount of motion present, a motion start location, amount of audio present, characteristics of the audio, and the like.

The event segments 31682 includes information regarding segmentation of the motion event 'i'. In some instances, event segments are stored separately from the raw video data 31683. In some instances, the event segments are stored at a lower display resolution than the raw video data. For example, the event segments are optionally stored at 480p or 780p and the raw video data is stored at 1080i or 1080p. Storing the event segments at a lower display resolution enables the system to devote less time and resources to retrieving and processing the event segments. In some instances, the event segments are not stored separately and the segmentation information includes references to the raw video data 31683 as well as date and time information for reproducing the event segments. In some implementations, the event segments include one or more audio segments (e.g., corresponding to video segments).

The event features data 31685 includes information regarding event features such as event categorizations/classifications, object masks, motion masks, identified/recognized/tracked motion objects (also sometimes called blobs), information regarding features of the motion objects (e.g., object color, object dimensions, velocity, size changes, etc.), information regarding activity in zones of interest, and the like.

The context information data 31686 includes context information regarding the event such as information regarding the visitor (e.g., behavior, clothing, or size characteristics), information regarding approach timing (e.g., time of day, level of brightness), information regarding visitor announcements (e.g., doorbell press, knocking, and associated timing thereof), information regarding scheduling (e.g., proximity in time to a prescheduled event, or proximity in time to a prescheduled status of the smart home environment), information regarding the status or location of one or more users, and the like.

The associated user information 31687 includes information regarding users associated with the event such as users identified in the event, users receiving notification of the event, and the like. In some instances, the associated user information 31687 includes a link, pointer, or reference to a user profile 3163 for to the user. The associated devices information 31688 includes information regarding the device or devices involved in the event (e.g., a doorbell 106 that recorded the event). In some instances, the associated devices information 31688 includes a link, pointer, or reference to a device profile 3165 for the device.

The user profile 3163-*j* corresponds to a user 'j' associated with the smart home network (e.g., smart home network 202) such as a user of a hub device 204, a user identified by a hub device 204, a user who receives notifications from a hub device 204 or from the server system 164, and the like. In some instances, the user profile 3163-*j* includes user preferences 31631, user settings 31632, associated devices information 31633, and associated events information 31634. In some instances, the user profile 3163-*j* includes only a subset of the above data. In some instances, the user profile 3163-*j* includes additional user information not shown, such as information regarding other users associated with the user 'j'.

The user preferences 31631 include explicit user preferences input by the user as well as implicit and/or inferred user preferences determined by the system (e.g., server system 164 and/or client device 220). In some instances, the inferred user preferences are based on historical user activity and/or historical activity of other users. The user settings 31632 include information regarding settings set by the user 'j' such as notification settings, device settings, and the like. In some instances, the user settings 31632 include device settings for devices associated with the user 'j'.

The associated devices information 31633 includes information regarding devices associated with the user 'j' such as devices within the user's smart home environment 100 and/or client devices 220. In some instances, associated devices information 31633 includes a link, pointer, or reference to a corresponding device profile 3165. Associated events information 31634 includes information regarding events associated with user 'j' such as events in which user 'j' was identified, events for which user i was notified, events corresponding to a smart home environment 100 of user 'j', and the like. In some instances, the associated events information 31634 includes a link, pointer, or reference to a corresponding event record 3168.

The device profile 3165-*k* corresponds to a device 'k' associated with a smart home network (e.g., smart home network 202) such as a hub device 204, a doorbell 106, a client device 220, and the like. In some instances, the device profile 3165-*k* includes device settings 31651, associated devices information 31652, associated user information 31653, associated event information 31654, and environmental data 31655. In some instances, the device profile 3165-*k* includes only a subset of the above data. In some instances, the device profile 3165-*k* includes additional device information not shown such as information regarding whether the device 'k' is currently active.

The device settings 31651 include information regarding the current settings of device 'k' such as positioning information, mode of operation information, and the like. In some instances, the device settings 31651 are user-specific and are set by respective users of the device 'k'. The associated devices information 31652 includes information regarding other devices associated with device 'k' such as other devices linked to device i and/or other devices in the same smart home network as device 'k'. In some instances, the associated devices information 31652 includes a link, pointer, or reference to a respective device profile 3165 corresponding to the associated device.

The associated user information 31653 includes information regarding users associated with the device such as users receiving notifications from the device, users registered with the device, users associated with the smart home network of the device, and the like. In some instances, the associated user information 31653 includes a link, pointer, or reference to a user profile 3163 corresponding to the associated user.

The associated event information 31654 includes information regarding events associated with the device 'k' such as historical events involving the device 'k'. In some instances, the associated event information 31654 includes a link, pointer, or reference to an event record 3168 corresponding to the associated event.

The environmental data 31655 includes information regarding the environment of device 'k' such as information regarding whether the device is outdoors or indoors, information regarding the light level of the environment, information regarding the amount of activity expected in the environment (e.g., information regarding whether the device is in a private residence versus a busy commercial property), information regarding environmental objects (e.g., depth mapping information for a camera), and the like.

The characterization data 3184-*m* corresponds to a person 'm' detected by within the smart home environment 100. In some implementations, characterization data for persons designated as strangers is deleted. In some implementations, characterization data is deleted for persons who do not give consent to having their personally identifiable information stored. As shown in FIG. 3B, in accordance with some implementations, the characterization data 3184 includes an associated person identifier 31841, an associated image identifier 31842, quality information 31843, pose information 31844, timing information 31845, confidence information 31846, location information 31847, physical feature information 31848, and behavioral information 31849. In some implementations, the characterization data 3184 includes additional data not shown. In some implementations, the characterization data 3184 includes only a subset of the data shown.

The associated person identifier 31841 includes a label or other identifier for the person represented by the characterization data. In some implementations, the label is applied by a user upon review of the corresponding image. In some implementations, the identifier 31841 is assigned by the system in accordance with a determination that the characterization data 3184 matches, or is similar to, other characterization data associated with the identifier.

The associated image identifier 31842 identifies one or more images from which the characterization data 3184 was generated. In some implementations, there is a one-to-one mapping between the characterization data and the images, while in some other implementations, there is a many-to-one or one-to-many mapping. In some implementations, the associated image identifier 31842 includes a pointer or logical storage address for the one or more images.

The quality information 31843 includes a quality factor for the characterization data 3184. In some implementations, the quality factor is based on one or more of: a blurriness of the image, a resolution of the image, an amount of the person that is visible in the image, how many features of the person are visible in the image, and a distance between the person and the camera that captured the image.

The pose information 31844 identifies a pose of the detected person. In some implementations, the pose information 31844 includes information regarding an angle between the camera that captured the image and the detected person. In some implementations, the pose information 31844 includes information regarding a portion of the person's face that is visible in the image.

The timing information 31845 includes information regarding when the image was captured by the camera. In some implementations, the timing information 31845 indicates the time of day, the day, the month, the year, etc. that the image was captured. In some implementations, the characterization data 3184 includes operating information for the camera indicating the mode of operation and settings of the camera (e.g., indicating whether the camera was in a low-light mode when the image was captured). In some implementations, the timing information 31845 is used in conjunction with a device profile 3165 for the camera to determine operating information for the camera at the time the image was captured.

The confidence information 31846 indicates a confidence that the associated person identifier 31841 is accurate. In some implementations, the confidence information 31846 is based on a similarity between the characterization data 3184 and other characterization data for the associated person. In some implementations, the confidence information 31846 includes a confidence score for the characterization data 3184. In some implementations, in accordance with a determination that the confidence score is below a predetermined threshold, the association to the person is reevaluated and/or the characterization data 3184 and associated image is flagged as potentially having an incorrect associated person identifier 31841. In some implementations, flagged characterization data 3184 is presented to a user for confirmation or reclassification.

The location information 31847 includes information regarding a location for the image and/or the detected person. In some implementations, the location information 31847 indicates a location for the camera that captured the image. In some implementations, the location information 31847 identifies the camera that captured the image. In some implementations, the location information 31847 indicates a room or portion of the smart home environment that was captured in the image. In some implementations, the location information 31847 indicates a GPS or coordinates-based location for the image.

The physical feature information 31848 includes information regarding the physical features of the detected person. In some implementations, the physical feature information 31848 includes characterization of the person's physical features (e.g., nose, ears, eyes, and hair). In some implementations, the physical feature information 31848 includes information regarding the person's speech, gait, and/or posture. In some implementations, the physical feature information 31848 includes information regarding the person's dimensions, such as the distance between the person's eyes or ears, or the length of the person's arms or legs. In some implementations, the physical feature information 31848 includes information regarding of the person's age, gender, and/or ethnicity. In some implementations, the physical feature information 31848 includes information regarding the person's clothing and/or accessories (e.g., whether the person is wearing a hat, glass, gloves, and/or rings).

The behavioral information 31849 includes information regarding the behavior of the detected person. In some implementations, the behavioral information 31849 includes information regarding the detected person's mood and/or mannerisms.

Figure 4:
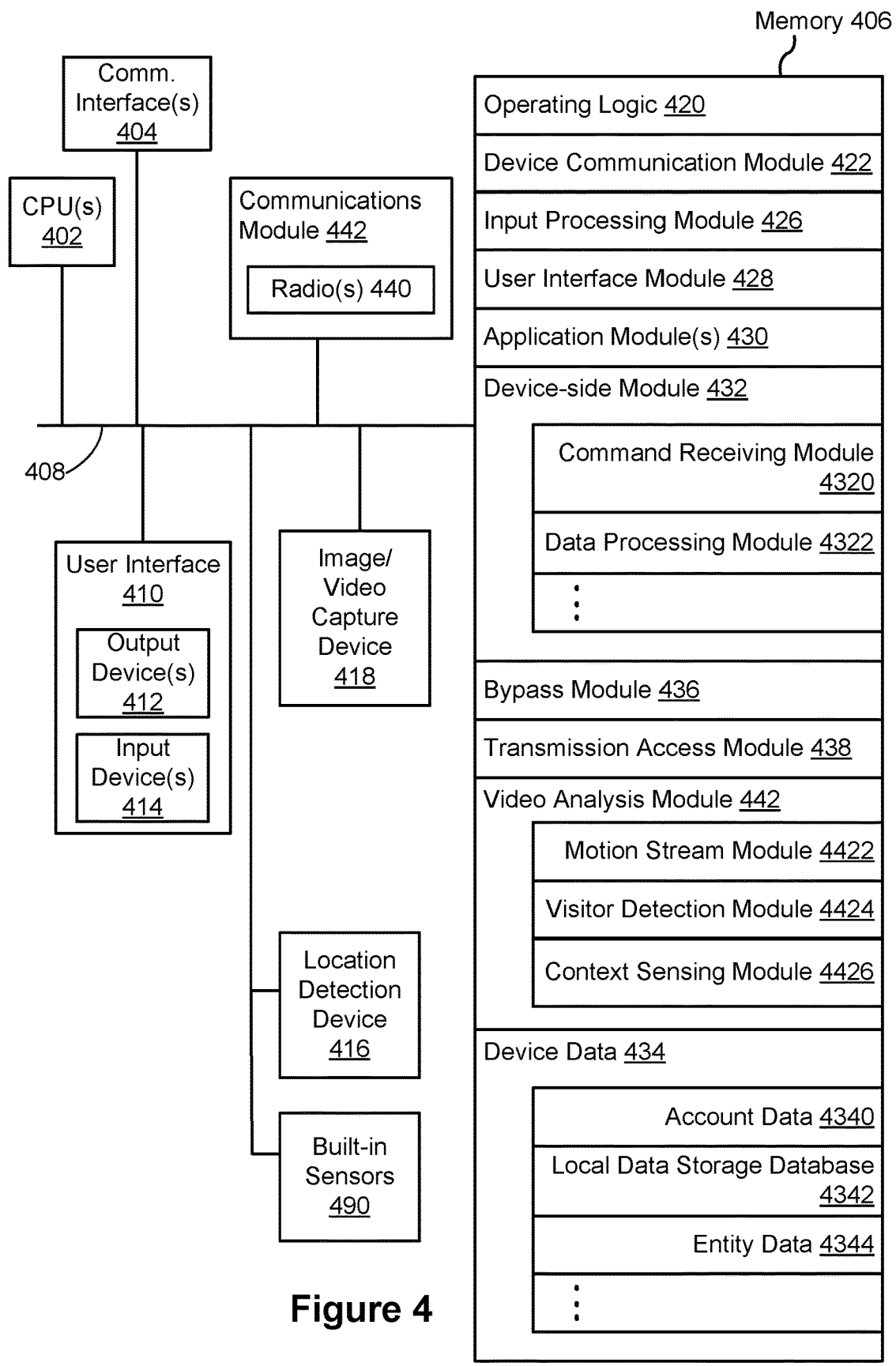
FIG. 4 is a block diagram illustrating a representative smart device in accordance with some implementations.

FIG. 4 is a block diagram illustrating a representative smart device 204 in accordance with some implementations. In some implementations, the smart device 204 (e.g., any devices of a smart home environment 100, FIG. 1) includes one or more processing units (e.g., CPUs, ASICs, FPGAs, microprocessors, and the like) 402, one or more communication interfaces 404, memory 406, communications module 442 with radios 440, and one or more communication buses 408 for interconnecting these components (sometimes called a chipset). In some implementations, the user interface 410 includes one or more output devices 412 that enable presentation of media content, including one or more speakers and/or one or more visual displays. In some implementations, the user interface 410 also includes one or more input devices 414, including user interface components that facilitate user input such as a keyboard, a mouse, a voice-command input unit or microphone, a touch screen display, a touch-sensitive input pad, a gesture capturing camera, or other input buttons or controls. In some implementations, an input device 414 for a doorbell 106 is a tactile or touch-sensitive doorbell button. Furthermore, some smart devices 204 use a microphone and voice recognition or a camera and gesture recognition to supplement or replace the keyboard. In some implementations, the smart device 204 includes one or more image/video capture devices 418 (e.g., cameras, video cameras, scanners, photo sensor units).

The built-in sensors 490 include, for example, one or more thermal radiation sensors, ambient temperature sensors, humidity sensors, IR sensors, proximity sensors, range sensors, occupancy sensors (e.g., using RFID sensors), ambient light sensors, motion detectors, accelerometers, and/or gyroscopes.

The radios 440 enable one or more radio communication networks in the smart home environments, and allow a smart device 204 to communicate with other devices. In some implementations, the radios 440 are capable of data communications using any of a variety of custom or standard wireless protocols (e.g., IEEE 802.15.4, Wi-Fi, ZigBee, 6LoWPAN, Thread, Z-Wave, Bluetooth Smart, ISA100.5A, WirelessHART, MiWi, etc.) custom or standard wired protocols (e.g., Ethernet, HomePlug, etc.), and/or any other suitable communication protocol, including communication protocols not yet developed as of the filing date of this document.

The communication interfaces 404 include, for example, hardware capable of data communications using any of a variety of custom or standard wireless protocols (e.g., IEEE 802.15.4, Wi-Fi, ZigBee, 6LoWPAN, Thread, Z-Wave, Bluetooth Smart, ISA100.5A, WirelessHART, MiWi, etc.) and/or any of a variety of custom or standard wired protocols (e.g., Ethernet, HomePlug, etc.), or any other suitable communication protocol, including communication protocols not yet developed as of the filing date of this document.

The memory 406 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. The memory 406, or alternatively the non-volatile memory within the memory 406, includes a non-transitory computer readable storage medium. In some implementations, the memory 406, or the non-transitory computer readable storage medium of the memory 406, stores the following programs, modules, and data structures, or a subset or superset thereof:

operating logic 420 including procedures for handling various basic system services and for performing hardware dependent tasks;

a device communication module 422 for connecting to and communicating with other network devices (e.g., network interface 160, such as a router that provides Internet connectivity, networked storage devices, network routing devices, server system 164, etc.) connected to one or more networks 162 via one or more communication interfaces 404 (wired or wireless);

an input processing module 426 for detecting one or more user inputs or interactions from the one or more input devices 414 and interpreting the detected inputs or interactions;

a user interface module 428 for providing and displaying a user interface in which settings, captured data, and/or other data for one or more devices (e.g., the smart device 204, and/or other devices in smart home environment 100) can be configured and/or viewed;

one or more applications 430 for execution by the smart device (e.g., games, social network applications, smart home applications, and/or other web or non-web based applications) for controlling devices (e.g., executing commands, sending commands, and/or configuring settings of the smart device 204 and/or other client/electronic devices), and for reviewing data captured by devices (e.g., device status and settings, captured data, or other information regarding the smart device 204 and/or other client/electronic devices);

a device-side module 432, which provides device-side functionalities for device control, data processing and data review, including but not limited to:
  a command receiving module 4320 for receiving, forwarding, and/or executing instructions and control commands (e.g., from a client device 220, from a server system 164, from user inputs detected on the user interface 410, etc.) for operating the smart device 204; and
  a data processing module 4322 for processing data captured or received by one or more inputs (e.g., input devices 414, image/video capture devices 418, location detection device 416), sensors (e.g., built-in sensors 490), interfaces (e.g., communication interfaces 404, radios 440), and/or other components of the smart device 204, and for preparing and sending processed data to a device for review (e.g., client devices 220 for review by a user);

a bypass module 436 for detecting whether radio(s) 440 are transmitting signals via respective antennas coupled to the radio(s) 440 and to accordingly couple radio(s) 440 to their respective antennas either via a bypass line or an amplifier (e.g., a low noise amplifier);

a transmission access module 438 for granting or denying transmission access to one or more radio(s) 440 (e.g., based on detected control signals and transmission requests);

a video analysis module 442 for analyzing captured video data, e.g., to detect and/or recognize approaching visitors and context information, including but not limited to:
  a motion stream module 4422 for detecting motion events in the video data;
  a visitor detection module 4424 for detecting an approaching visitor from the motion events (e.g., for distinguishing motion corresponding to a person approaching an entryway from other types of motion); and
  a context sensing module 4426 for sensing context data regarding the approaching visitor, e.g., based on behavioral characteristics and timing; and device data 434 storing data associated with devices (e.g., the smart device 204), including, but is not limited to:
  account data 4340 storing information related to user accounts loaded on the smart device 204, wherein such information includes cached login credentials, smart device identifiers (e.g., MAC addresses and UUIDs), user interface settings, display preferences, authentication tokens and tags, password keys, etc.;
  local data storage database 4342 for selectively storing raw or processed data associated with the smart device 204 (e.g., video surveillance footage captured by a doorbell 106); and
  entity data 4344 storing information related to detected persons and other entities, such as characterization information (e.g., characterization information 3184) and associated images.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise rearranged in various implementations. In some implementations, the memory 406, optionally, stores a subset of the modules and data structures identified above. Furthermore, the memory 406, optionally, stores additional modules and data structures not described above.

Figure 5:
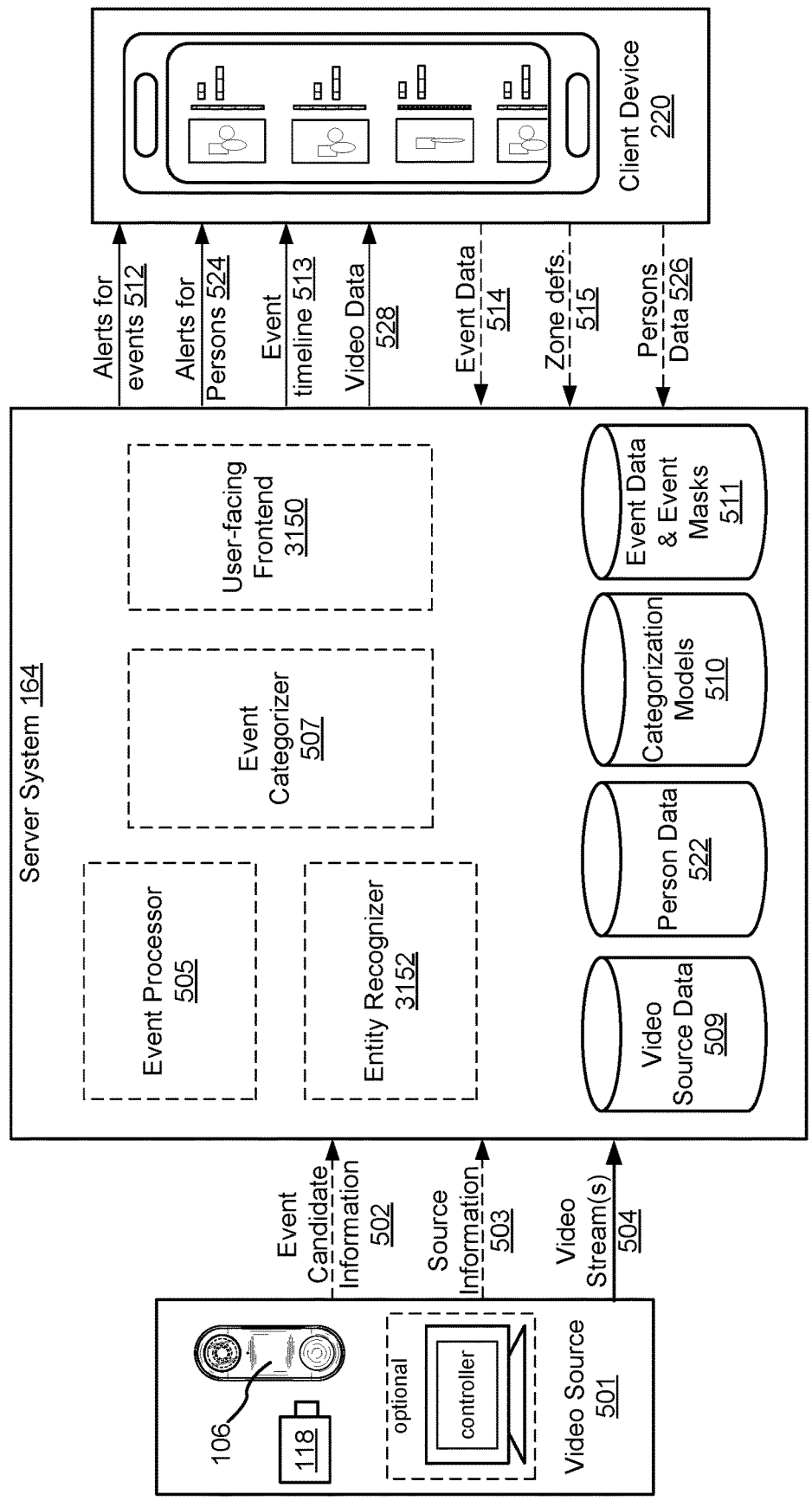
FIG. 5 illustrates representative system architecture for video analysis and categorization in accordance with some implementations.

FIG. 5 illustrates a representative system architecture 500. In some implementations, the server system 164 includes functional modules for an event processor 505, an event categorizer 507, an entity recognizer 3152, and a user-facing frontend 3150. The event processor 505 obtains the event candidates (e.g., by processing the video stream(s) 504 or by receiving event start information from the video source 501, or by detecting a user press on a doorbell button of a doorbell camera). In some implementations, the event candidates comprise motion event candidates. In some implementations, the event candidates include a user press on a doorbell button of a doorbell camera. In some implementations, the event candidates include audio, electromagnetic, olfactory, and/or visual aspects. In some implementations, the event candidates include motion events, approach detections, and announcement detections. The event categorizer 507 categorizes the event candidates into different event categories (e.g., based on data from the event processor and/or the entity recognizer). The user-facing frontend 3150 generates event alerts and notifications, and facilitates review of the detected entities and events by a reviewer through a review interface on a client device 220. The user-facing frontend 3150 also receives user edits on the event and entity categories, user preferences for alerts and event filters, zone definitions for zones of interest, and the like. The event categorizer optionally revises event categorization models and results based on the user edits received by the user-facing frontend. The entity recognizer optionally revises entity classifications and/or labels based on the user edits received by the user-facing frontend. The server system 164 also includes a video source data database 509, person data 522, event categorization models database 510, and event data and event masks database 511. In some implementations, the person data 522 includes a persons database. In some implementations, each of these databases is part of the server database 316 (e.g., part of data storage database 3160).

The server system 164 receives one or more video stream(s) 504 from the video source 501 (e.g., a video source 222 from FIG. 2B) and optionally receives event candidate information 502, such as preliminary characterization information for detected entities and events (e.g., entity and event metadata from processing performed at the doorbell 106), and source information 503 such as device settings for a doorbell 106 (e.g., a device profile 3165 for doorbell 106). In some implementations, the event processor 505 communicates with the video source 501, e.g., to request additional images such as high definition images or metadata for the video stream(s) 504. The server system sends alerts for events 512, alerts for detected persons 524, event timeline information 513, and/or video data 528 (e.g., video clips corresponding to the detected persons and/or events) to the client device 220. In some implementations, the alerts 512 distinguish visitor approach events from other types of motion events. In some implementations, the alerts 512 distinguish motion events captured at a doorbell 106 from motion events captured by other smart devices (e.g., cameras 118). The server system 164 optionally receives user information from the client device 220, such as event information 514 (e.g., edits to event categories), and zone definitions 515, and persons data 526 (e.g., classification of detected persons).

A data processing pipeline processes video information (e.g., a live video feed) received from a video source 501 (e.g., including a doorbell 106 and an optional controller device) and/or audio information received from one or more smart devices in real-time (e.g., within 10 seconds, 30 seconds, or 2 minutes) to identify and categorize events occurring in the smart home environment, and sends real-time event alerts (e.g., within 10 seconds, 20 seconds, or 30 seconds) and a refreshed event timeline (e.g., within 30 seconds, 1 minute, or 3 minutes) to a client device 220 associated with a reviewer account for the smart home environment. The data processing pipeline also processes stored information (such as stored video feeds from a video source 501) to reevaluate and/or re-categorize events as necessary, such as when new information is obtained regarding the event and/or when new information is obtained regarding event categories (e.g., a new activity zone is obtained from the user).

After video and/or audio data is captured at a smart device, the data is processed to determine if any potential event candidates or persons are present. In some implementations, the data is initially processed at the smart device (e.g., video source 501, camera 118, or doorbell 106). Thus, in some implementations, the smart device sends event candidate information, such as event start information, to the server system 164. In some implementations, the data is processed at the server system 164 for event start detection. In some implementations, the video and/or audio data is stored on server system 164 (e.g., in video and source data database 509). In some implementations, the video stream is stored on a server distinct from server system 164. In some implementations, after a motion start is detected, the relevant portion of the video stream is retrieved from storage (e.g., from video and source data database 509).

In some implementations, the event identification process includes segmenting the video stream into multiple segments then categorizing the event candidate within each segment. In some implementations, categorizing the event candidate includes an aggregation of background factors, entity detection and identification, motion vector generation for each motion entity, entity features, and scene features to generate motion features for the event candidate. In some implementations, the event identification process further includes categorizing each segment, generating or updating an event log based on categorization of a segment, generating an alert for the event based on categorization of a segment, categorizing the complete event, updating the event log based on the complete event, and generating an alert for the event based on the complete event. In some implementations, a categorization is based on a determination that the event occurred within a particular zone of interest. In some implementations, a categorization is based on a determination that the event candidate involves one or more zones of interest. In some implementations, a categorization is based on audio data and/or audio event characterization.

The event analysis and categorization process may be performed by the smart device (e.g., the video source 501) and the server system 164 cooperatively, and the division of the tasks may vary in different implementations, for different equipment capability configurations, and/or for different network and server load situations. After the server system 164 categorizes the event candidate, the result of the event detection and categorization may be sent to a reviewer associated with the smart home environment.

In some implementations, the server system 164 stores raw or compressed video data (e.g., in a video and source data database 509), event categorization models (e.g., in an event categorization model database 510), and event masks and other event metadata (e.g., in an event data and event mask database 511) for each of the video sources 501. In some implementations, the video data is stored at one or more display resolutions such as 480p, 780p, 1080i, 1080p, and the like.

In some implementations, the video source 501 (e.g., the doorbell 106) transmits a live video feed to the remote server system 164 via one or more networks (e.g., the network(s) 162). In some implementations, the transmission of the video data is continuous as the video data is captured by the doorbell 106. In some implementations, the transmission of video data is irrespective of the content of the video data, and the video data is uploaded from the video source 501 to the server system 164 for storage irrespective of whether any motion event has been captured in the video data. In some implementations, the video data may be stored at a local storage device of the video source 501 by default, and only video portions corresponding to motion event candidates detected in the video stream are uploaded to the server system 164 (e.g., in real-time).

In some implementations, the video source 501 dynamically determines at what display resolution the video stream is to be uploaded to the server system 164. In some implementations, the video source 501 dynamically determines which parts of the video stream are to be uploaded to the server system 164. For example, in some implementations, depending on the current server load and network conditions, the video source 501 optionally prioritizes the uploading of video portions corresponding to newly detected motion event candidates ahead of other portions of the video stream that do not contain any motion event candidates; or the video source 501 uploads the video portions corresponding to newly detected motion event candidates at higher display resolutions than the other portions of the video stream. This upload prioritization helps to ensure that important motion events are detected and alerted to the reviewer in real-time, even when the network conditions and server load are less than optimal. In some implementations, the video source 501 implements two parallel upload connections, one for uploading the continuous video stream captured by the doorbell 106, and the other for uploading video portions corresponding to detected motion event candidates. At any given time, the video source 501 determines whether the uploading of the continuous video stream needs to be suspended temporarily to ensure that sufficient bandwidth is given to the uploading of the video segments corresponding to newly detected motion event candidates.

In some implementations, the video stream uploaded for cloud storage is at a lower quality (e.g., lower resolution, lower frame rate, higher compression, etc.) than the video segments uploaded for motion event processing.

As shown in FIG. 5, the video source 501 includes a doorbell 106 (which includes an image sensor), and an optional controller device. In some implementations, the doorbell 106 includes sufficient on-board processing power to perform all necessary local video processing tasks (e.g., cuepoint detection for motion event candidates, video uploading prioritization, network connection management, etc.), and the doorbell 106 communicates with the server system 164 directly, without any controller device acting as an intermediary. In some implementations, the doorbell 106 captures the video data and sends the video data to the controller device for the necessary local video processing tasks. The controller device optionally performs the local processing tasks for multiple cameras. For example, there may be multiple cameras in one smart home environment (e.g., the smart home environment 100, FIG. 1), and a single controller device receives the video data from each camera and processes the video data to detect motion event candidates in the video stream from each camera. The controller device is responsible for allocating sufficient outgoing network bandwidth to transmitting video segments containing motion event candidates from each camera to the server before using the remaining bandwidth to transmit the video stream from each camera to the server system 164. In some implementations, the continuous video stream is sent and stored at one server facility while the video segments containing motion event candidates are send to and processed at a different server facility.

In some implementations, the smart device sends additional source information 503 to the server system 164. This additional source information 503 may include information regarding a device state (e.g., IR mode, AE mode, DTPZ settings, etc.) and/or information regarding the environment in which the device is located (e.g., indoors, outdoors, night-time, day-time, etc.). In some implementations, the source information 503 is used by the server system 164 to perform event detection, entity recognition, and/or to categorize event candidates. In some implementations, the additional source information 503 includes one or more preliminary results from video processing performed by the doorbell 106 (e.g., categorizations, object/entity recognitions, motion masks, etc.).

In some implementations, the video portion after an event start incident is detected is divided into multiple segments. In some implementations, the segmentation continues until event end information (sometimes also called an "end-of-event signal") is obtained. In some implementations, the segmentation occurs within the server system 164 (e.g., by the event processor 505). In some implementations, the segmentation comprises generating overlapping segments. For example, a 10-second segment is generated every second, such that a new segment overlaps the prior segment by 9 seconds.

In some implementations, each of the multiple segments is of the same or similar duration (e.g., each segment has a 10-12 second duration). In some implementations, the first segment has a shorter duration than the subsequent segments. Keeping the first segment short allows for real time initial categorization and alerts based on processing the first segment. The initial categorization may then be revised based on processing of subsequent segments. In some implementations, a new segment is generated if the motion entity enters a new zone of interest.

In some implementations, after the event processor module obtains the video portion corresponding to an event candidate, the event processor 505 obtains background factors and performs motion entity detection identification, motion vector generation for each motion entity, and feature identification. Once the event processor 505 completes these tasks, the event categorizer 507 aggregates all of the information and generates a categorization for the motion event candidate. In some implementations, the event processor 505 and the event categorizer 507 are components of the video processing module 3144. In some implementations, false positive suppression is optionally performed to reject some motion event candidates before the motion event candidates are submitted for event categorization. In some implementations, determining whether a motion event candidate is a false positive includes determining whether the motion event candidate occurred in a particular zone. In some implementations, determining whether a motion event candidate is a false positive includes analyzing an importance score for the motion event candidate. The importance score for a motion event candidate is optionally based on zones of interest involved with the motion event candidate, background features, motion vectors, scene features, entity features, motion features, motion tracks, and the like.

In some implementations, the video source 501 has sufficient processing capabilities to perform, and does perform, entity detection, person recognition, background estimation, motion entity identification, the motion vector generation, and/or the feature identification.

FIG. 6 is a block diagram illustrating a representative client device 220 associated with a user account in accordance with some implementations. The client device 220, typically, includes one or more processing units (CPUs) 602, one or more network interfaces 604, memory 606, and one or more communication buses 608 for interconnecting these components (sometimes called a chipset). Optionally, the client device also includes a user interface 610 and one or more built-in sensors 690 (e.g., accelerometer and gyroscope). The user interface 610 includes one or more output devices 612 that enable presentation of media content, including one or more speakers and/or one or more visual displays. The user interface 610 also includes one or more input devices 614, including user interface components that facilitate user input such as a keyboard, a mouse, a voice-command input unit or microphone, a touch screen display, a touch-sensitive input pad, a gesture capturing camera, or other input buttons or controls. Furthermore, some the client devices use a microphone and voice recognition or a camera and gesture recognition to supplement or replace the keyboard. In some implementations, the client device includes one or more cameras, scanners, or photo sensor units for capturing images (not shown). Optionally, the client device includes a location detection device 616, such as a GPS (global positioning satellite) or other geo-location receiver, for determining the location of the client device.

The memory 606 includes high-speed random access memory, such as DRAM, SRAM, DDR SRAM, or other random access solid state memory devices; and, optionally, includes non-volatile memory, such as one or more magnetic disk storage devices, one or more optical disk storage devices, one or more flash memory devices, or one or more other non-volatile solid state storage devices. The memory 606, optionally, includes one or more storage devices remotely located from one or more processing units 602. The memory 606, or alternatively the non-volatile memory within the memory 606, includes a non-transitory computer readable storage medium. In some implementations, the memory 606, or the non-transitory computer readable storage medium of the memory 606, stores the following programs, modules, and data structures, or a subset or superset thereof:

an operating system 618 including procedures for handling various basic system services and for performing hardware dependent tasks;

a network communication module 620 for connecting the client device 220 to other systems and devices (e.g., client devices, electronic devices, and systems connected to one or more networks 162) via one or more network interfaces 604 (wired or wireless);

an input processing module 622 for detecting one or more user inputs or interactions from one of the one or more input devices 614 and interpreting the detected input or interaction;

one or more applications 624 for execution by the client device (e.g., games, social network applications, smart home applications, and/or other web or non-web based applications) for controlling devices (e.g., sending commands, configuring settings, etc. to hub devices and/or other client or electronic devices) and for reviewing data captured by the devices (e.g., device status and settings, captured data, or other information regarding the hub device or other connected devices);

a user interface module 626 for providing and displaying a user interface in which settings, captured data, and/or other data for one or more devices (e.g., smart devices 204 in smart home environment 100) can be configured and/or viewed;

a client-side module 628, which provides client-side functionalities for device control, data processing and data review, including but not limited to:

a hub device and device control module 6280 for generating control commands for modifying an operating mode of the hub device or the electronic devices in accordance with user inputs;

a video analysis module 6281 for analyzing captured video data, e.g., to detect and/or recognize persons, objects, animals, and events, such as described previously with respect to video analysis module 442;

a data review module 6282 for providing user interfaces for reviewing data processed by the server system 164, including but not limited to:

an event review submodule 6283 for reviewing events (e.g., motion and/or audio events), and optionally enabling user edits and/or updates to the events; and a persons review submodule 6284 for reviewing data and/or images regarding detected persons and other entities, and optionally enabling user edits and/or updates to the persons data;

a quick action (QA) presentation module 6285 for providing a subset of quick actions identified by the server system 164; and a remote interaction module 6286 for interacting with a remote person (e.g., a visitor to the smart home environment 100), e.g., via a doorbell 106 and/or the server system 164; and client data 630 storing data associated with the user account and electronic devices, including, but not limited to:

account data 6300 storing information related to both user accounts loaded on the client device and electronic devices (e.g., of the video sources 501) associated with the user accounts, wherein such information includes cached login credentials, hub device identifiers (e.g., MAC addresses and UUIDs), electronic device identifiers (e.g., MAC addresses and UUIDs), user interface settings, display preferences, authentication tokens and tags, password keys, etc.; and a local data storage database 6302 for selectively storing raw or processed data associated with electronic devices (e.g., of the video sources 501, such as a doorbell 106), optionally including entity data such as the entity data 4344 described previously.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise rearranged in various implementations. In some implementations, the memory 606, optionally, stores a subset of the modules and data structures identified above. Furthermore, the memory 606, optionally, stores additional modules and data structures not described above.

Figure 7A:
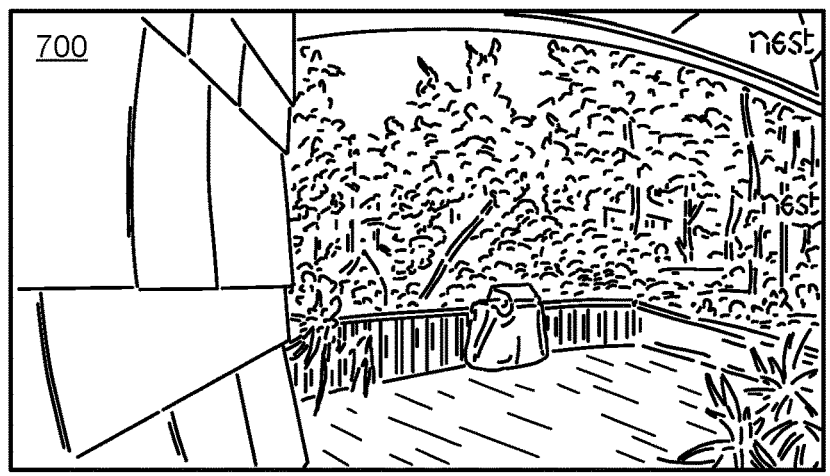
FIGS. 7A-7C illustrate a representative person detection and recognition process in accordance with some implementations.
Figure 7B:
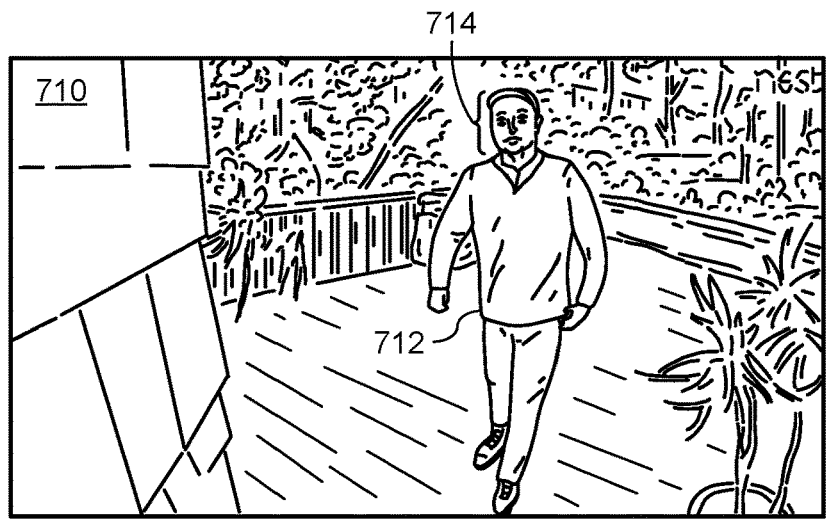
Figure 7C:
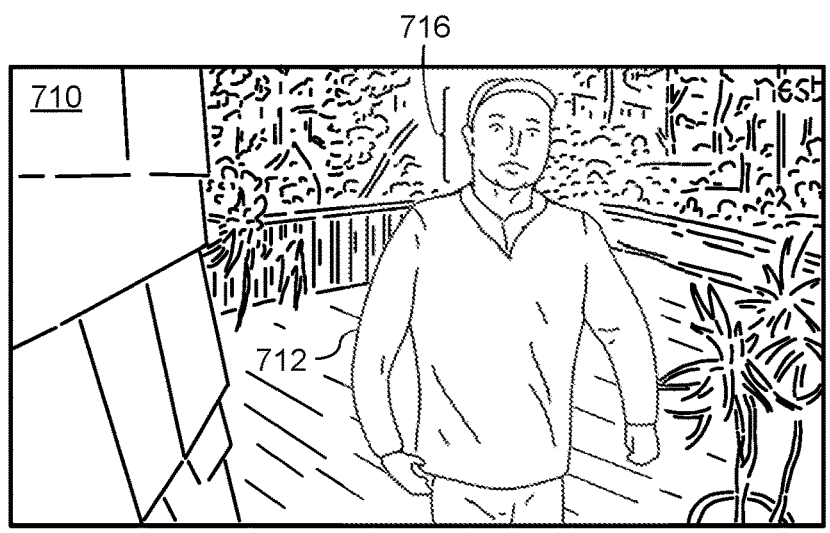

FIGS. 7A-7C illustrate a representative person detection and recognition process in accordance with some implementations. FIG. 7A shows an image 700 corresponding to a field of view of a first camera associated with a doorbell 106 of an electronic greeting system. In some implementations, the electronic greeting system comprises one or more devices of the smart home environment 100 and/or the server system 164. As shown in FIG. 7A, no potential visitors are present in image 700. FIG. 7B shows an image 710 corresponding to a field of view of a second camera associated with doorbell 106. In some implementations, upon initial detection of a person 712 (discussed in more detail below), doorbell 106 automatically switches to the second camera as it has a field of view more conducive to visitor detection. In some implementations, however, doorbell 106 includes only one camera, and image 700 remains after the initial detection of a person. In some implementations, upon detection of a motion event (i.e., person 712 enters the field of view of the camera), the system (e.g., the electronic greeting system, including but not limited to a processor of doorbell 106) analyzes the motion event to determine whether the person 712 is a visitor (e.g., whether the person 712 is approaching the doorbell 106). For example, as the person 712 moves in the field of view, the system measures the height (or another dimension) of the person's face (or other body characteristics, such as the person's torso, shoulder width, and the like). The face height 714 in FIG. 7B increases to a larger face height 716 in FIG. 7C. In this example, based on whether the face height increase satisfies one or more face height increase criterion, the system determines that the person 712 is approaching the entryway, and thereby classifies the person 712 as a visitor. In some implementations, analyzing the motion event additionally or alternatively includes analyzing data from a motion sensor to determine whether the motion data satisfies motion criteria, and/or analyzing data from a proximity sensor (e.g., a PIR sensor) to determine whether the proximity data satisfies proximity criteria. For example, a PIR sensor detects a heat signature, and a processor associated with the electronic greeting system analyzes the heat signature to determine whether the heat signature exceeds a predetermined threshold. In accordance with a detection that the heat signature exceeds the threshold, a person 712 associated with the heat signature is classified as a visitor. As another example, an audio sensor detects an audio signal, and a processor associated with the electronic greeting system analyzes the audio signal to detect an audio event indicative of an approaching person, such as footsteps. In accordance with a detection that an amplitude or decibel level of the audio event (e.g., the volume of the detected footsteps) passes a predetermined threshold, a person 712 associated with the audio event is classified as a visitor. In some implementations, a processor associated with the electronic greeting system determines a direction of movement and/or a distance of a detected person based on a signal from a direction and/or distance sensor, such as a radar sensor. In some implementations, a processor associated with the electronic greeting system uses a combination of any of the aforementioned examples to detect an approaching person and classify the person as a visitor.

Figure 8A:
FIGS. 8A-8B illustrate representative visitor status classification operations in accordance with some implementations.
Figure 8B:

FIGS. 8A-B illustrate representative visitor status classification operations in accordance with some implementations. FIG. 8A shows a visitor 820 in an image 810 (e.g., corresponding to a doorbell 106's field of view at a first time), and FIG. 8B shows a visitor 830 in an image 822 (e.g., corresponding to a doorbell 106's field of view at a second time). In some implementations, the electronic greeting system determines whether the visitors are known to the system (e.g., based on a facial recognition operation). In some implementations, the electronic greeting system (e.g., a processor of doorbell 106) performs a face cropping operation and performs the facial recognition operation on the cropped faces 822 and 832. For example, a processor associated with the electronic greeting system crops an image 822 of person 820's face out of image 810 and sends the cropped image 822 to a server for facial recognition processing. In some implementations, if multiple faces are detected, a processor associated with the electronic greeting system separately crops each face and sends each face to a server for facial recognition processing. Alternatively, the processor crops an area out of image 810 that includes each detected face and sends the cropped area to the server for facial recognition processing. Alternatively, the processor sends the entire frame 810 to the server for facial recognition processing. In some implementations, the camera itself performs the facial recognition processing. In some implementations, the electronic greeting system sends the images 810, 822 and/or the images 822, 832 to a user of the smart home environment 100 (e.g., as part of a notification or alert). In some implementations, the electronic greeting system analyzes the images 810, 822 to determine context information for the visitors 820, 830.

FIGS. 9A-D are flow diagrams illustrating methods of detecting and and/or responding to a visitor to a smart home environment in accordance with some implementations. In some implementations, the methods are performed by: (1) one or more smart devices 204 (e.g., a doorbell 106); (2) the server system 164; (3) a client device 220; or (4) a combination thereof. In some instances and implementations, the various operations of the methods described herein are interchangeable, and respective operations of the methods are performed by any of the aforementioned devices, systems, or combination of devices and/or systems. For example, the obtaining of a motion stream (904) is optionally performed by doorbell(s) 106 or server system 164. In some implementations, video and/or data streams are sent from a doorbell 106 to a client device 220 over a network (e.g., WLAN) that does not include server system 164. In some implementations, the methods are governed by instructions that are stored in one or more non-transitory computer-readable storage mediums, and that are executed by one or more processors, such as the CPU(s) 302 of server system 164 and/or the CPU(s) 402 of smart device 204 (e.g., a doorbell 106). For convenience, the method operations will be described below as being performed by particular component or device, but should not be construed as limiting the performance of the operation to the particular device in all implementations.

Figure 9A:
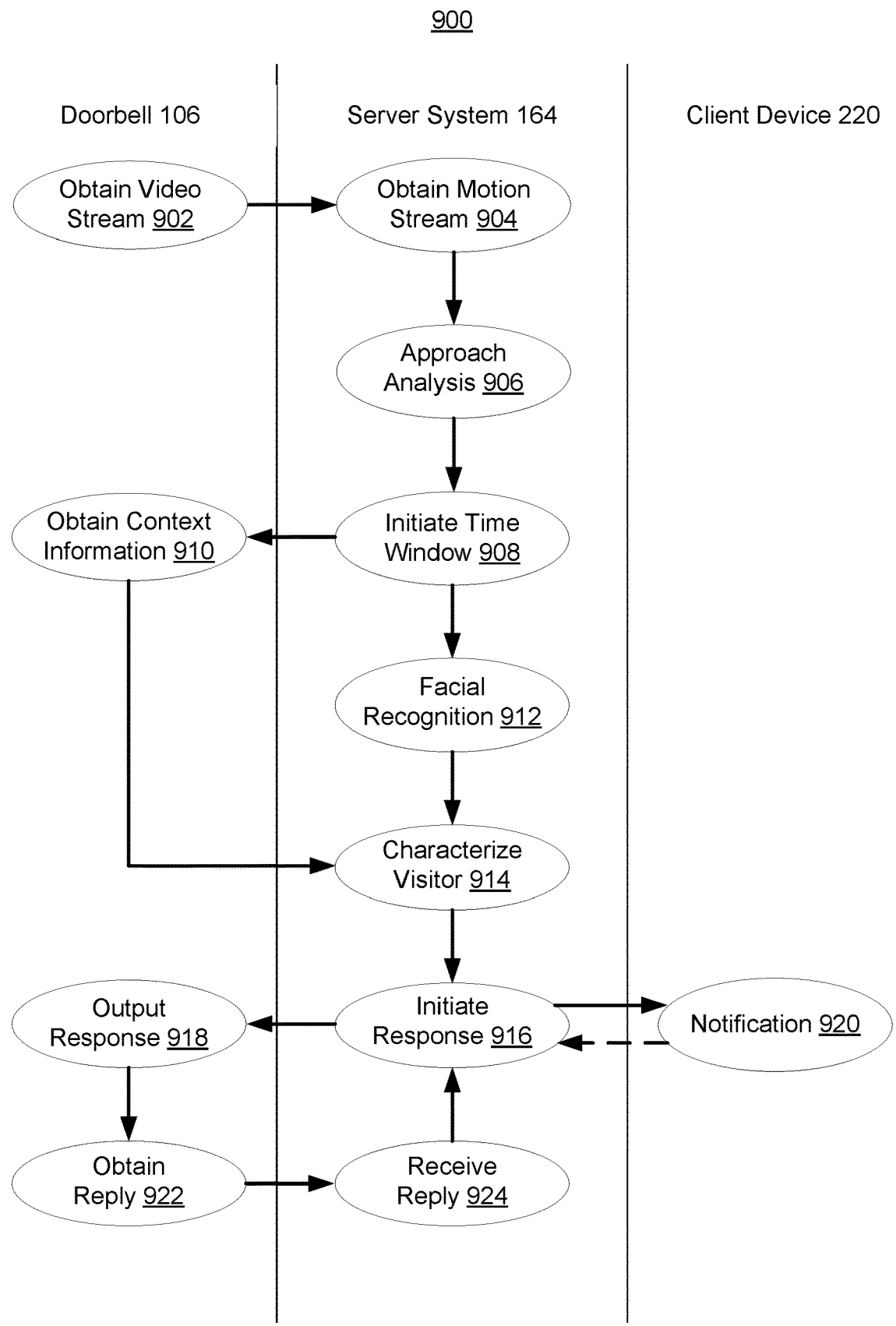
FIGS. 9A-9D are flow diagrams illustrating methods of detecting and responding to visitors in accordance with some implementations.

FIG. 9A illustrates a method 900 of detecting and responding to a visitor to a smart home environment in accordance with some implementations. The doorbell 106 obtains a video stream (902) from a camera associated with or included in the doorbell 106. The server system 164 derives a motion stream (904) from the video stream of the camera. In some implementations, the motion stream comprises data or metadata derived from the video stream of the camera which is analyzed to detect information regarding an amount of motion in a field of view of the camera. In some implementations, the motion stream and the video stream are both streamed from the camera to the server system 164 for analysis. Alternatively, only the video stream is streamed to the server system 164 for deriving a motion stream and analyzing the motion stream. In some implementations, the video stream and/or the motion stream are streamed to the server system 164 only when an amount of motion satisfying a threshold is detected. In some implementations, the motion stream comprises the video stream with metadata comprising motion data. In some implementations, the motion stream is a separate data stream (e.g., not including video data from the video stream) comprising motion data corresponding to the video stream. In some implementations, deriving the motion stream from a video stream of the camera includes comparing an amount of detected motion in a field of view of the camera to a threshold. For example, if an amount of detected motion is greater than a predetermined threshold, data associated with the detected motion is included in the motion stream for further analysis; otherwise, data associated with the detected motion is not included in the motion stream. Setting a predetermined motion threshold enables the system to disregard some trivial movements such as leaves blowing in the breeze.

The server system 164 analyzes (906) the motion stream to determine if a visitor is approaching the entryway. In some implementations, server system 164 analyzes the motion stream by tracking a dimension of a characteristic of the visitor (e.g., the visitor's path, the visitor's proximity to the entryway, a dimension of the visitor's face, a dimension of the visitor's body, and/or any other physical characteristic of the visitor, such as a height or shape of any part of the body, including the body as a whole) over time. For example, if a height or width of the visitor grows over time, or if a dimension of the visitor's face increases over time, the visitor is determined to be approaching the entryway. Additionally or alternatively, if the dimension of the characteristic of the visitor exceeds a threshold, the visitor is determined to be approaching the entryway. For example, if a detected person enters from outside of the field of view of the camera, but is determined to be in close proximity (e.g., within 3 ft, 5 ft, or 10 ft) to the entryway the detected person is deemed to be a visitor. In some implementations, a detected person is deemed to be a visitor in accordance with a determination that the detected person is closer to the entryway than to a public space (e.g., a public sidewalk).

In some implementations, in addition to or as an alternative to analyzing a motion stream, the server system 164 determines if a visitor is approaching the entryway by detecting a presence of a person (sometimes referred to herein as "presence information"). Several example implementations for detecting presence information are described below.

For example, determining that a visitor is approaching the entryway includes obtaining and analyzing presence information indicative of an approaching visitor or a visitor in proximity to the entryway. In some implementations, part or all of the presence information is derived from motion data of one or more motion sensors of the smart home environment, including, for example, a passive infrared (PIR) sensor, an ultrasonic sensor, a microwave sensor, and/or a tomographic sensor. In some implementations, part or all of the presence information is derived from video data of one or more cameras having a field of view corresponding to the entryway. For example, presence information is derived by determining that an amount of motion detected by a camera or other type of motion sensor meets one or more motion criteria, such as an amount of motion exceeding a threshold. As a further example, presence information is derived by analyzing a plurality of image frames to determine whether a difference in position of an object (e.g., measured in pixels) in the plurality of image frames exceeds a threshold. In some implementations, part or all of the presence information is derived from an audio signal obtained from an audio sensor. For example, an audio signal capturing an audio event (such as a footstep, a verbal announcement, a doorbell sound, or a door knock) is indicative of a visitor's presence.

As another example, determining that a visitor is approaching the entryway includes comparing a dimension of a characteristic of the visitor over time. In some implementations, determining that the visitor is approaching includes tracking one or more dimensions of the visitor over time. For example, determining that a visitor is approaching the entryway includes obtaining a first measurement of a dimension of a characteristic of the visitor (such as an initial height measurement of the visitor's head), obtaining a subsequent measurement of the dimension of the characteristic of the visitor (such as a second height measurement of the visitor's head at a predetermined amount of time after the initial height measurement), and determining whether a difference between the first measurement and the subsequent measurement exceeds a threshold. For example, if the visitor's head height increases between the first and second measurements, the visitor is likely approaching; otherwise, if the visitor's head height does not increase, the visitor is likely not approaching or is standing still.

As another example, determining that a visitor is approaching the entryway comprises determining that the visitor is within a threshold distance to the entryway. For example, if a person is detected within a predetermined distance from the entryway, the person is determined to be an approaching visitor. For example, once the visitor is within 15 feet, 10 feet, or 5 feet of the entryway, the observation window is initiated and context information is obtained. In some implementations, initiating the observation window in response to the determination that the visitor is approaching the entryway includes initiating the observation window in response to the determination that the visitor is on a track to the entryway (e.g., has entered a walkway, hallway, or perimeter gate leading to the entryway).

As another example, determining that a visitor is approaching the entryway includes deriving a motion stream. In some implementations, the motion stream is derived from a video stream of the camera. In some implementations, the motion stream is derived from the video stream by detecting information regarding an amount of motion in a field of view of the camera, or by comparing an amount of detected motion in a field of view of the camera to a threshold. In some implementations, the motion stream includes a motion mask for a motion event detected in the video stream.

Upon a determination that a visitor is approaching the entryway, the server system 164 initiates an observation window (908). In some implementations, a length of the observation window is predefined to correspond to a reasonable amount of time for the visitor to complete the approach to the entryway, or to reach a threshold distance to the entryway. For example, a visitor approaching an entryway located at the end of a long walkway is given more time to reach the entryway (or a threshold distance from the entryway) than a visitor approaching an entryway located at the end of a shorter walkway. In some implementations, the method additionally or alternatively includes initiating the observation window in response to a determination that the visitor is within a threshold distance to the entryway, where the threshold is predetermined based on a layout of the entryway. In some implementations, the electronic greeting system analyzes the layout of the entryway and automatically sets a threshold based on an amount of time it takes for an initially detected person to reach a component of the entryway, such as a door or a gate. Additionally or alternatively, a user manually sets the predetermined threshold using an interface of the electronic greeting system. In some implementations, the observation window is initiated when the visitor is close enough to the entryway to enable an interaction with the electronic greeting system (e.g., a doorbell press or verbal communication). In some implementations, the visitor is determined to have reached the threshold distance to the entryway based on data from a range sensor, such as a passive infrared ("PIR") sensor or radar.

Upon initiating the observation window, the doorbell 106 obtains context information (910). In some implementations, the doorbell 106 is constantly obtaining context information, while in other implementations, the doorbell begins obtaining context information upon initiation of the observation window. In some implementations, context information is based on a detected announcement event (e.g., a doorbell press, a door knock, a keypad entry, or a verbal announcement); a facial recognition analysis; one or more behavior characteristics of the visitor; one or more clothing characteristics of the visitor; a time during which the visitor approaches the entryway (e.g., a time of day or day of the week); a verbal announcement of the visitor; proximity in time to a prescheduled event; proximity in time to a prescheduled status of the smart home environment; a status or location of the user; and/or a timing of the detected visitor action compared to a timing of the identification of the motion event involving the visitor approaching the entryway. More details regarding the obtaining of context information are provided below.

Upon initiating the observation window, the server system 164 performs a facial recognition operation (912) based on one or more frames of the motion stream sent to the server by doorbell 106, and determines, based on an outcome of the facial recognition operation, whether the visitor is known to the electronic greeting system (e.g., illustrated in FIG. 8A) or unknown to the electronic greeting system (e.g., illustrated in FIG. 8B).

The server system 164 characterizes the visitor (914) according to a result of the facial recognition (912) and the context information (910). For example, the visitor is characterized as one or more of known, unknown, expected, unexpected, suspicious, and the like. In some implementations, the characterizations are weighted in accordance with the context information and the facial recognition. In some implementations, the server system further characterizes the visitor based on whether the visitor announced the visit (e.g., rang the doorbell or knocked on the door) within a closing of the observation window. In some implementations, the observation window closes at the earlier of: (1) a visitor announcement (e.g., a doorbell press or knocking event); and (2) a predetermined time threshold (e.g., the visitor has lingered for more than the predetermined time threshold without making an announcement). In some implementations, the predetermined time threshold is dynamic, and depends on the context information (e.g., longer observation windows when the context information suggests a higher level of safety or concern, and shorter observation windows when the context information suggests a lower level of safety or concern). In some implementations, the context information includes a determination of whether the visitor made an announcement (e.g., rang the doorbell or knocked on the door) before the observation window expired.

The server system initiates a response (916) in accordance with the visitor characterization (914). In some implementations, the server system initiates a response (916) in accordance with only the context information (910), or only the facial recognition result (912). In some implementations, the server system initiates a response (916) in accordance with the context information (910) and the facial recognition result (912), but without any further characterization (914). Examples of responses are illustrated in FIGS. 10-14 and discussed below.

The doorbell 106 outputs the response (918) to the visitor (e.g., broadcasts a voice message, prompts the visitor to reply, and the like). In some implementations, another smart device 204 implements the response (e.g., smart door lock 120 unlocks the door to let the visitor in). The doorbell 106 obtains a reply (922) and sends the reply to the server 164 (e.g., a verbal or text message left by the visitor). The server 164 receives the reply (924), and initiates a subsequent response (916) (e.g., stores the reply for later retrieval by the user, or initiates a notification). In some implementations, the server responds (916) to the characterization of the visitor (914) and/or the reply (924) by sending a notification (920) to the client device 220. Upon receipt of the notification, a user may instruct the server 164 to initiate a subsequent response (916).

Figure 9B:
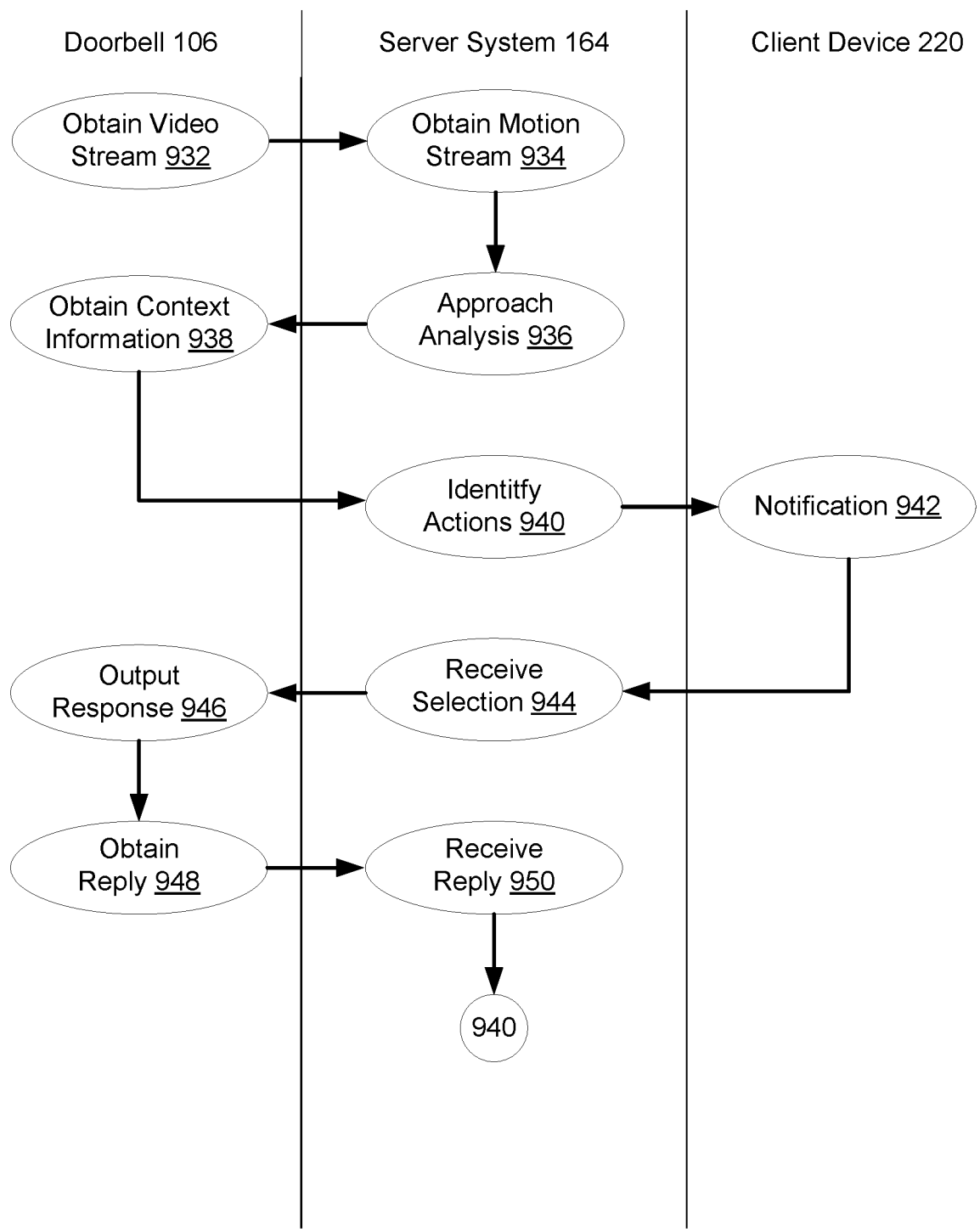

FIG. 9B illustrates a method 930 of detecting and responding to a visitor to a smart home environment by presenting a user with appropriate responses in accordance with some implementations.

The doorbell 106 obtains a video stream (932) from a camera associated with or included in the doorbell 106. The server system 164 derives a motion stream (934) from the video stream of the camera (e.g., as discussed previously with respect to operation 904). In some implementations, deriving the motion stream from a video stream of the camera includes detecting information regarding an amount of motion in a field of view of the camera. In some implementations, deriving the motion stream from a video stream of the camera includes comparing an amount of detected motion in a field of view of the camera to a threshold. For example, if an amount of detected motion is greater than a predetermined threshold, data associated with the detected motion is included in the motion stream for further analysis; otherwise, data associated with the detected motion is not included in the motion stream.

The server system 164 analyzes (936) the motion stream to determine if a visitor is approaching the entryway (e.g., as discussed previously with respect to operation 906). In some implementations, server system 164 analyzes the motion stream by comparing a dimension of a characteristic of the visitor (e.g., the visitor's path, the visitor's proximity to the entryway, a dimension of the visitor's face, a dimension of the visitor's body, and/or any other physical characteristic of the visitor, such as a height or shape of any part of the body, including the body as a whole) over time. For example, if a height or width of the visitor grows over time, or if a dimension of the visitor's face increases over time, the visitor is determined to be approaching the entryway. Additionally or alternatively, if the dimension of the characteristic of the visitor exceeds a threshold, the visitor is determined to be approaching the entryway.

Upon detecting an approaching visitor, the doorbell 106 obtains (938) context information (e.g., as discussed previously with respect to operation 910). In some implementations, the doorbell 106 is constantly obtaining context information, while in other implementations, the doorbell begins obtaining context information upon detection of an approaching visitor. In some implementations, context information is based on a detected announcement event (e.g., a doorbell press, a door knock, a keypad entry, or a verbal announcement); a facial recognition analysis; one or more behavior characteristics of the visitor; one or more clothing characteristics of the visitor; a time of day during which the visitor approaches the entryway; a verbal announcement of the visitor; proximity in time to a prescheduled event; proximity in time to a prescheduled status of the smart home environment; a status or location of the user; and/or a timing of the detected visitor action compared to a timing of the identification of the motion event involving the visitor approaching the entryway. More details regarding the obtaining of context information are provided below.

Based on the context information, the server system identifies a plurality of appropriate actions (940) available to a user of the client device for interacting with the visitor via the electronic greeting system. An action is defined as "appropriate" if it is determined to be an action likely to be selected by the user based on the context information. An appropriate action is therefore relevant, applicable, useful, pertinent, and/or suitable for responding to the visitor depending on the context information. In some implementations, a collection of actions is stored in a database (e.g., database 316, FIG. 3A), and ranked in terms of the applicability, relevance, and/or usefulness of each action to a present situation involving a specific visitor and specific context information. In some implementations, the ranked actions are then ordered based on the ranking. In these implementations, an action is defined as "appropriate" if it at or near the top of the ranking (e.g., one of the top 3, 5, or 10 actions in the ranking). In some implementations, the higher an action is ranked, the more appropriate the action is considered to be. In some implementations, an action is defined as "appropriate" if its rank is above a predetermined threshold (e.g., the ten highest ranked actions), with a subset of appropriate actions (e.g., three actions) being presented to the user. In other implementations, the threshold is determined based on a number of actions that can be presented to the user in a single user interface of the client device (e.g., if the user interface can only display three actions at once, then the three highest ranked actions are determined to be "appropriate"), and all of the appropriate actions are simultaneously presented to the user in the same user interface. In some implementations, a number of actions to be presented to the user is based on an amount of display space available in a quick action area of a user interface of the client device. Examples of appropriate actions are provided below.

Upon identifying a plurality of appropriate actions available to the user of a client device for interacting with the visitor via the electronic greeting system, the server system 164 presents a notification (942) of the identified appropriate actions to the user at the client device 220. Examples of notifications are illustrated in FIG. 10.

The server system 164 receives a selection (944) of an identified action from the user of the client device 220, and implements the action by outputting a response (946) at the doorbell 106. The doorbell 106 records a reply (948) and sends the reply to the server 164 (e.g., a message left by the visitor). The server 164 receives the reply (950), identifies updated actions (940), and presents the updated actions to the user (942) at the client device 220. In some implementations, the server system 164 identifies one or more appropriate devices for the identified action and sends the identified action to the appropriate device(s). For example, the server system 165 determines that the appropriate device for an unlock action is a smart door lock and sends the unlock action to the smart door lock. As another example, the server system 165 determines that the appropriate devices for an alert action include a floodlight device in the smart home environment, a remote security device (e.g., a computer at a local police station), and the doorbell 106 (e.g., to issue a warning to the visitor) and sends the alert action to those devices.

Figure 9C:
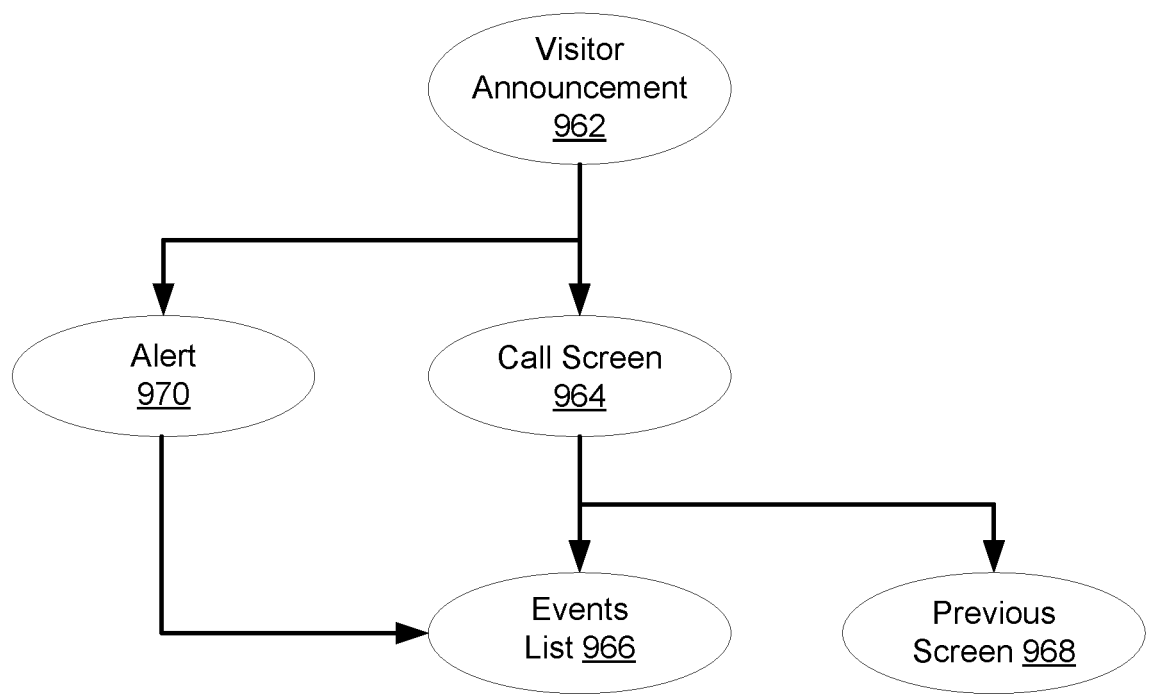

FIG. 9C is an operational flow diagram 960 illustrating a representative method for interacting with a visitor in accordance with some implementations. Upon detecting a visitor announcement (962) (e.g., a doorbell press or a knock), in accordance with a determination that a user of the client 220 device is currently operating an application of the electronic greeting system on the client device 220, the interface advances to a call screen (964) (e.g., FIGS. 10C, 13A). However, in accordance with a determination that a user of the client device 220 is not currently operating an application of the electronic greeting system on the client device 220, an alert (970) is presented to the user (e.g., FIGS. 11A, 11B). After finishing an interaction with the alert, the interface advances to an events list (966), showing a list of past visitor events (e.g., FIG. 10F). After finishing an interaction on the call screen (e.g., by pressing a "Dismiss" affordance), the interface advances to the events list (966), or if the user was interacting with a different screen of the electronic greeting system application, the interface advances to the previous screen (968).

Figure 9D:
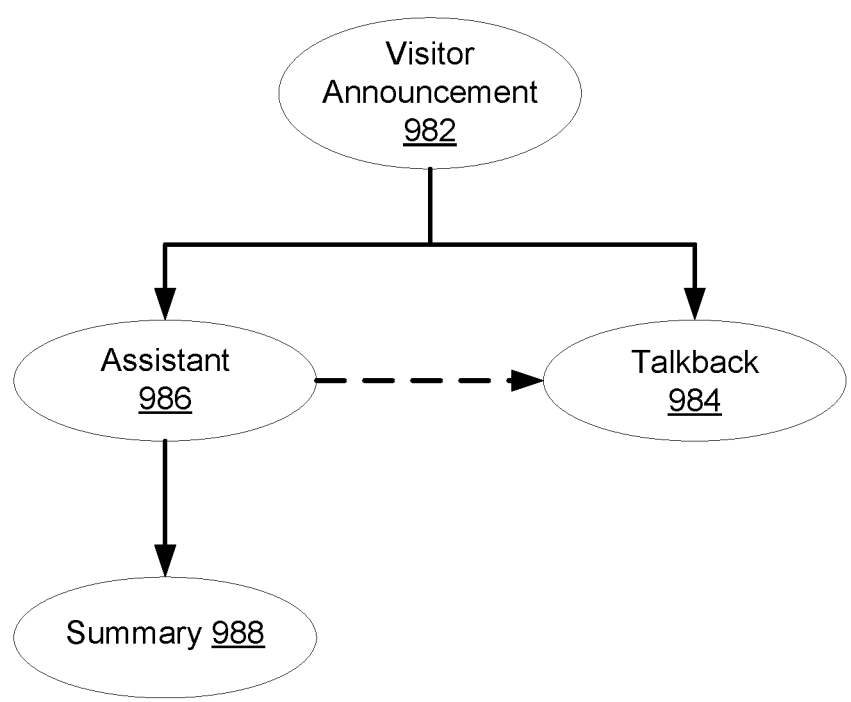

FIG. 9D is an operational flow diagram 980 illustrating a representative method for interacting with a visitor in accordance with some implementations. Upon detecting a visitor announcement (982) (e.g., a doorbell press or a knock) or a lingering visitor, the interface provides a talkback option (984) (e.g., FIG. 13A "Talkback" affordance, and an assistant option (986) (e.g., FIG. 13A "Assistant" affordance). Upon selection of the talkback option (984), the interface provides a talkback screen for sending a voice communication (e.g., FIG. 13B) and/or a text-to-speech communication (e.g., FIG. 13C). In some implementations, the greeting system provides smart suggestions for responding to a message during a text-to-speech communication. Upon selection of the assistant option (986), the interface advances to provide an assistant screen (e.g., FIG. 13D). While in the assistant screen, the user can optionally respond by selecting the "Talkback" affordance, which then causes the interface to advance to a talkback screen (e.g., 13B or 13C). In some implementations, at the end of an assistant session (e.g., an end of an interaction between the visitor and the virtual assistant), the user is provided with a summary (988) of the interaction (e.g., FIG. 14). In some implementations, the talkback interface is equivalent to the talk interface (selected through the call screen). If the user does not answer after a predefined threshold amount of time, or has set the client device to a do-not-disturb mode, the virtual assistant responds to the visitor based on certain context information (explained in more detail below) or based on customized user preferences. In some implementations, while the virtual assistant is interacting with the visitor, the user has an option to take over the interaction via a voice call or a text-to-speech call in a talkback interaction (984), as discussed above. In some implementations, after the interaction ends, user is provided with a summary (988) of the interaction (e.g., FIG. 14).

Figures 10A, 10B, 10C:
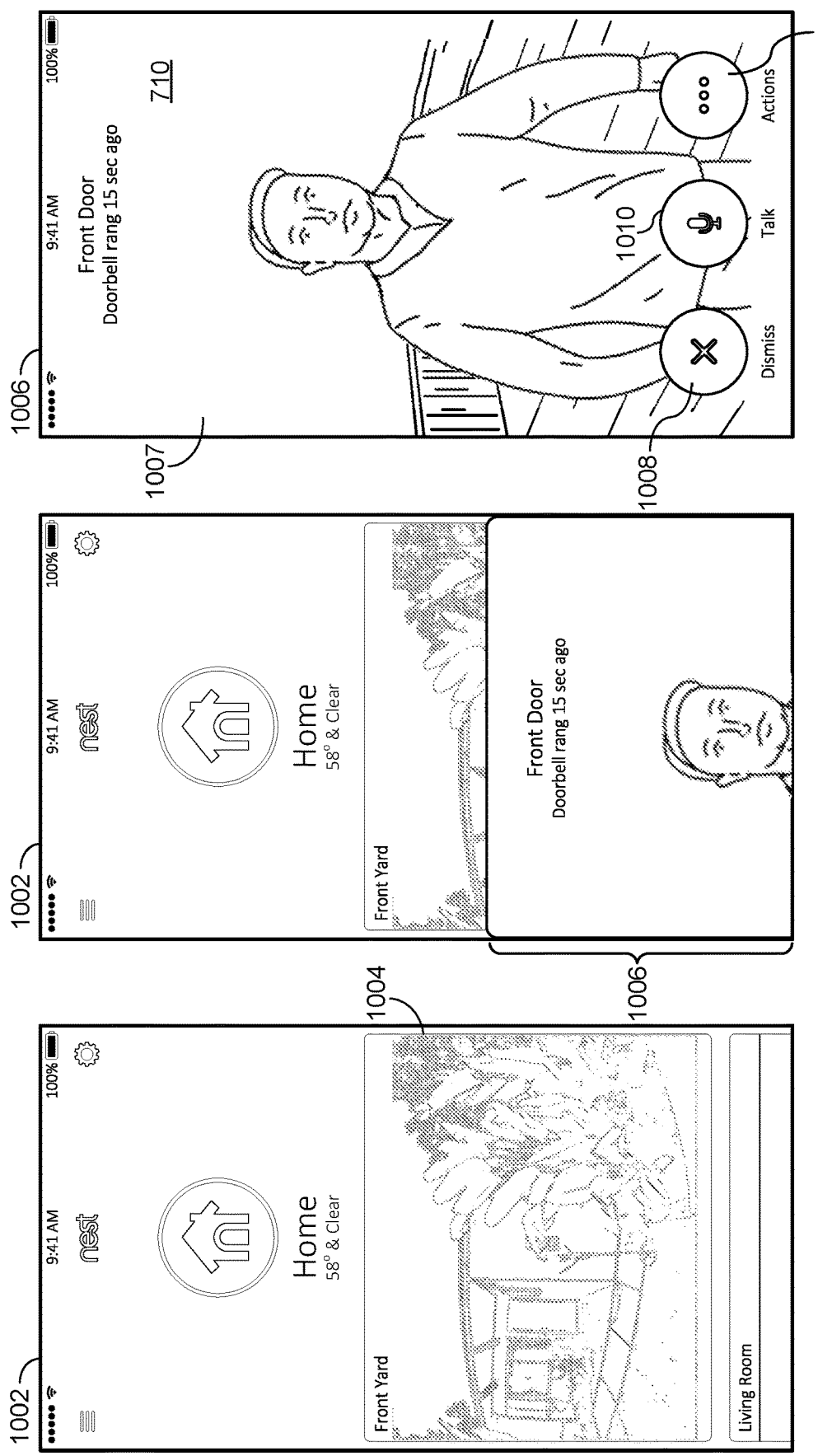
Figure 10F:
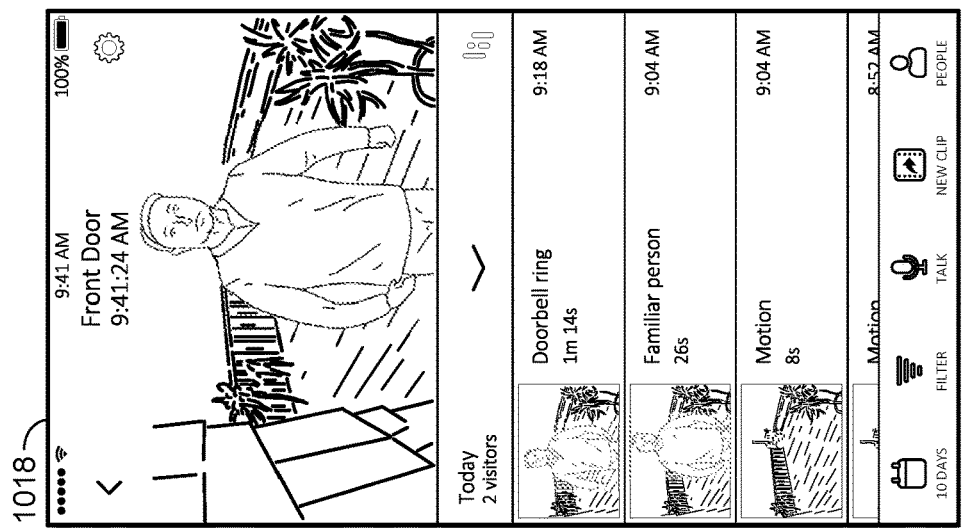
Figure 10E:
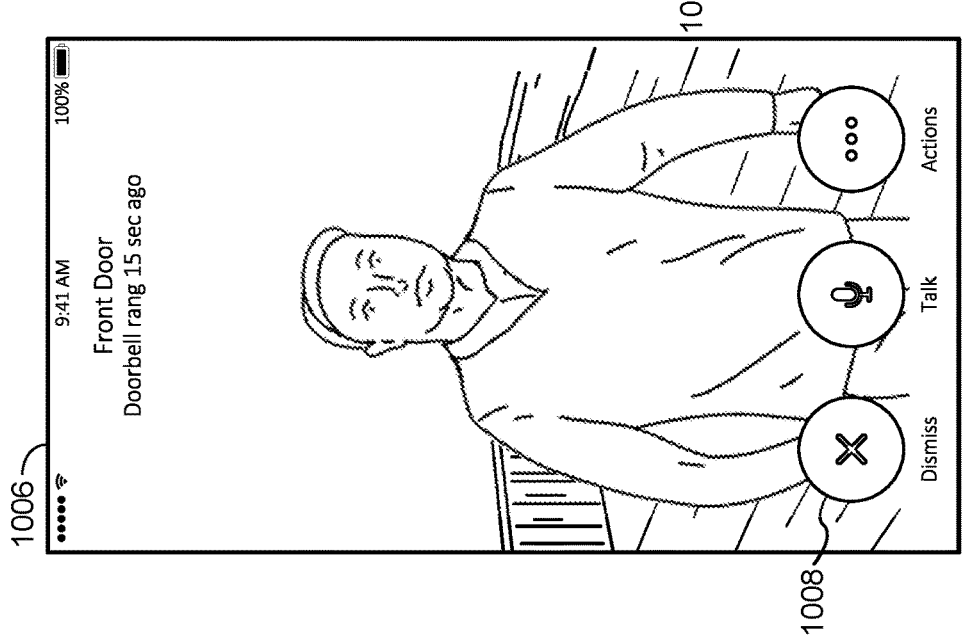

FIGS. 10A-F illustrate representative user interfaces for notifying a user of a client device that a visitor is approaching, and for facilitating an interaction with the visitor. In some implementations, the user interface is presented at a client device 220 (e.g., utilizing user interface module 626 and/or persons review module 6284). FIG. 10A illustrates a home screen 1002 for the electronic greeting system application, including an image of the camera's field of view 1004 (e.g., a first camera pointed towards the entryway). In some implementations, the image of the scene is part of a video clip (e.g., in gif format) showing activity of the detected visitor. In some implementations, the video clip is composed of a plurality of frames from the camera (e.g., every 10th, 30th, or 100th frame) corresponding to an event involving the detected person.

Upon detecting a visitor approaching the entryway, a visitor announcement (e.g., pressing a doorbell or knocking on the door), or a visitor lingering at the entryway for a threshold amount of time without making any announcement, or any other motion event involving a visitor, the interface advances to call screen 1006 (FIG. 10C). In some implementations, call screen 1006 slides in from an edge of the screen (e.g., the bottom, as in FIG. 10B). In some implementations, call screen 1006 includes a more detailed image provided from a different camera (e.g., a camera embedded the doorbell 106) that is better situated for capturing images or video of a front profile of the visitor. In some implementations, the image of the scene is part of a video clip (e.g., in gif format) showing activity of the detected visitor. In some implementations, the video clip is composed of a plurality of frames from the camera (e.g., every 10th, 30th, or 100th frame) corresponding to an event involving the detected person. In some implementations, the camera views are automatically switched in accordance with a detection of a motion event (e.g., the motion event camera feed switches to the visitor detail camera feed upon detection of an approaching visitor).

In some implementations, call screen 1006 includes a label for the specific entryway at which the visitor is present (e.g., "Front Door"), a notification regarding relevant information about the visitor (e.g., "Doorbell rang 15 s ago," or "Lingering for the last 30 s"), an "Dismiss" affordance 1008 (sometimes labeled as "Ignore"), a "Talk" affordance 1010, and an "Actions" affordance 1012.

Figure 10D:

Upon selection of Talk 1010, the interface advances to talk screen 1014 (FIG. 10D). In some implementations, Dismiss 1008 and Action 1012 disappear (or are otherwise indicated as unselectable) while Talk 1010 is replaced with a "Done" affordance 1016, indicating that the user interface is in a talk mode (e.g., the client device records a verbal message from the user and sends it to the visitor). In some implementations, upon selection of Done 1016, the interface exits talk mode (e.g., the call ends, or the voice recording stops) and returns to the call screen 1006 (FIG. 10E), advances to an events list screen 1018, or exits the smart home application. In some implementations, upon selection of Dismiss 1008, the user exits the call screen 1006, and the interface advances to the events list screen 1018 (FIG. 10F), or exits the smart home application. In accordance with some implementations, the events list screen 1018 includes a list of events 1020, including reports of past interactions.

Figure 10I:
Figure 10H:
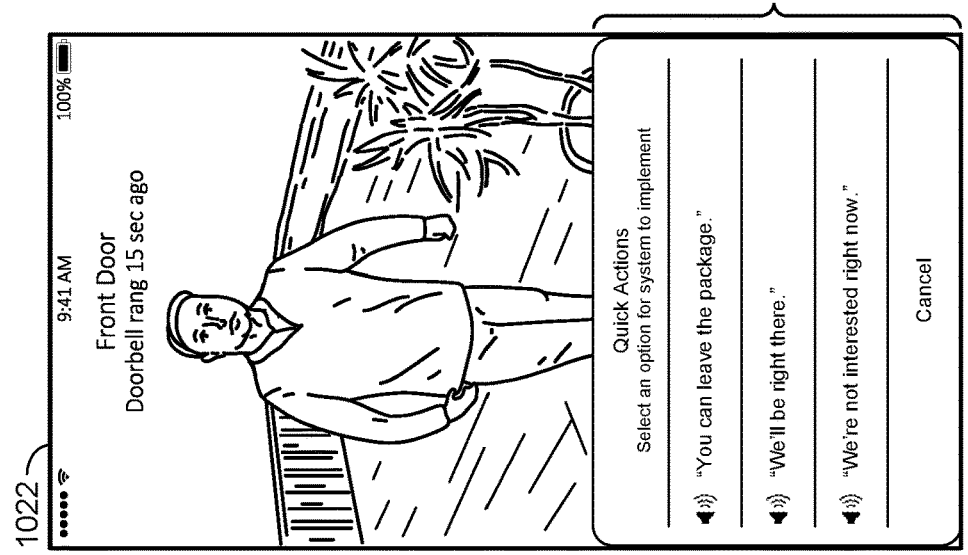

FIGS. 10G-L illustrate representative user interfaces for facilitating an interaction between the user and the visitor by providing quick actions to the user. In the call screen 1006, in response to selection of Actions 1012 (FIG. 10G), a list of appropriate quick actions 1024 appears in a quick actions selection screen 1022 (FIG. 10H). In accordance with some implementations, selecting the quick action ("We'll be right there.") removes the quick actions 1024 display and the interface returns to call screen 1006 while the communication ("We'll be right there.") 1026 is delivered to the visitor (FIG. 10I), e.g., via a speaker at a doorbell device 106.

In some implementations, the displayed quick actions 1024 include communication-based actions only, action-based actions only, or at least one communication-based action and at least one action-based action. FIG. 10J is an example quick actions selection screen 1022a for an unknown or unexpected visitor 1030. In accordance with some implementations, the actions 1032, 1034, and 1036 correspond with contextual information regarding the visitor 1030 (e.g., are deemed appropriate based on the contextual information) and are all communication-based. FIG. 10K is an example quick actions selection screen 1022b for a known and/or expected visitor 1034. The communication-based actions 1042 and 1044, as well as the action-based action 1046 correspond with contextual information regarding the visitor 1040. FIG. 10L is an example quick actions selection screen 1022c for an unknown and potentially unsafe visitor 1050. The communication-based action 1052, as well as action-based actions 1054 and 1056, correspond with contextual information regarding the visitor 1050. Upon selection of a quick action, the electronic greeting system carries out the task corresponding to the selected quick action. In some implementations, upon selection of the quick action, the user device interface returns to the call screen 1006 (FIG. 10I).

Figure 10G:
Figure 11A:
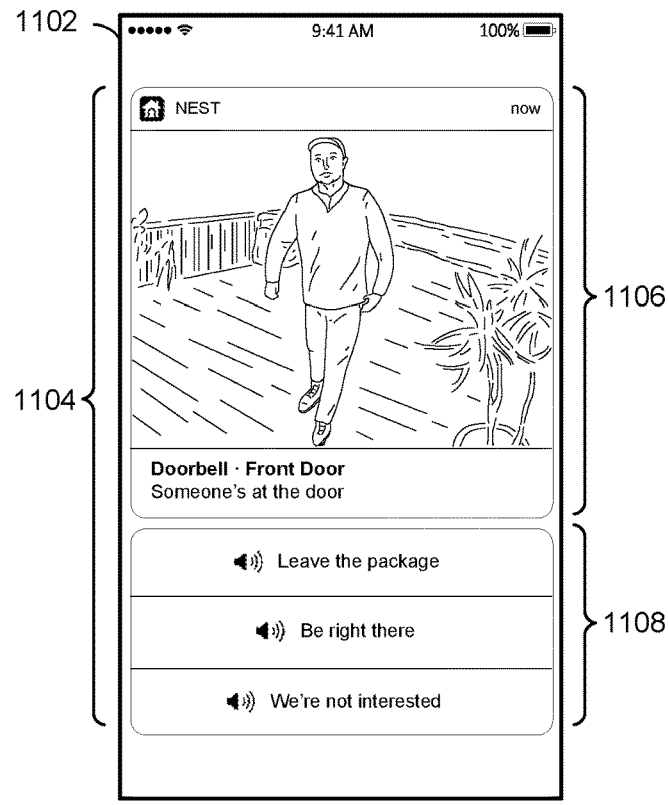
FIGS. 11A-11B illustrate representative user interfaces for displaying a notification with quick actions in accordance with some implementations.
Figure 11B:
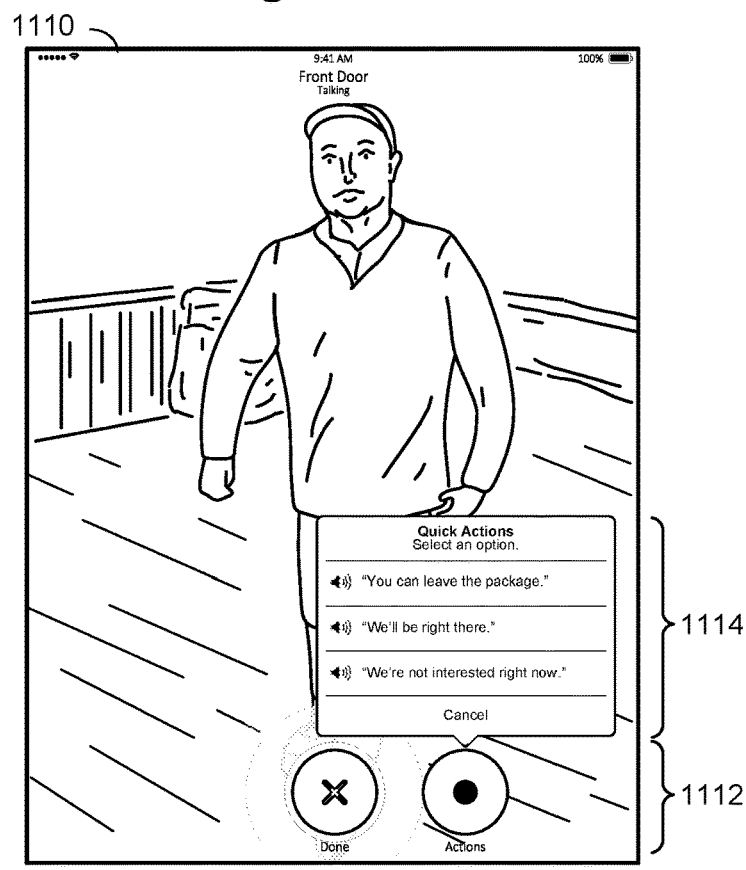

FIGS. 11A and 11B illustrate representative user interfaces for displaying a notification with quick actions in accordance with some implementations. In FIG. 11A, user interface 1102 includes a notification 1104 which includes a first section 1106 including an image of the visitor or an image of the entryway, and relevant information about the entryway (e.g., "Front Door") and the motion event (e.g., "Someone's at the door."). The interface further includes a second section 1108 including a list of appropriate quick actions. In some implementations, the quick actions are automatically displayed in the initial notification. In other implementations, the initial notification includes an Actions affordance (e.g., as shown in FIG. 10G), the selection of which opens the list of quick actions. In some implementations, the first and second sections 1106 and 1108 form a single notification section. In FIG. 11B, the user interface 1110 includes affordances 1112 (similar to those in FIG. 10C), and a list of quick actions 1114. For client devices with relatively large screens (e.g., FIG. 11B), the quick actions optionally take up a smaller portion of the screen. In some implementations, the image takes up the entire background of the interface, with the quick actions being displayed in a foreground layer.

Figure 12A:
FIGS. 12A-12D illustrate representative user interfaces for displaying notifications in accordance with some implementations.
Figure 12B:
Figure 12C:
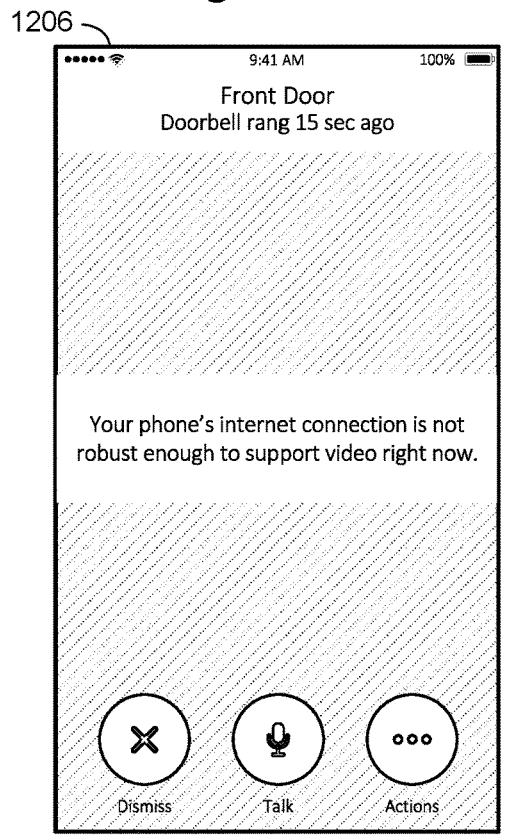
Figure 12D:
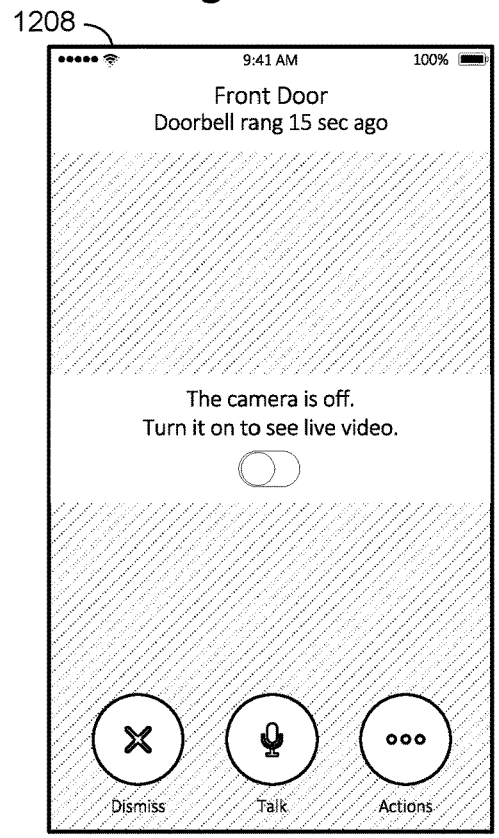

FIGS. 12A-D illustrate representative user interfaces for displaying notifications in accordance with some implementations. FIG. 12A depicts an interface 1202 for when a family member answers the call while the user is in the call screen 1006 (FIG. 10C). In this case, the talk and actions affordances disappear, are faded, or are otherwise identified as being unselectable in accordance with some implementations. In some implementations, the interface shows information relevant to the call (e.g., through subtitles) between the visitor and the family member. In some implementations, one or both of the talk and actions affordances remain selectable, allowing for multiple people to join the call at the same time and/or quick actions to be taken while another person is on the call. FIG. 12B depicts an interface 1204 for when two people answer a call simultaneously. In some implementations, an error message is displayed notifying the user that the call could not be completed. However, in some implementations, when two people answer a call simultaneously, both people are connected to the call. FIG. 12C depicts an interface 1206 for when there is not enough bandwidth to support both audio and video data. In some implementations, the video may be dropped in favor of supporting a lower bandwidth audio- and/or text-based interaction. In some implementations, a message is displayed in the user interface notifying the user of the bandwidth limitations. FIG. 12D depicts an interface 1208 for when the camera associated with the entryway (e.g., a camera of a doorbell 106) is off. In some implementations, the image cannot be displayed, and a message is displayed in the user interface notifying the user. In some implementations, a switch (or any other control-based affordance) is displayed in the user interface allowing the user to turn the camera on.

Figure 13A:
FIGS. 13A-13D illustrate representative user interfaces for interacting with a visitor by way of a conversation in accordance with some implementations.
Figure 13B:
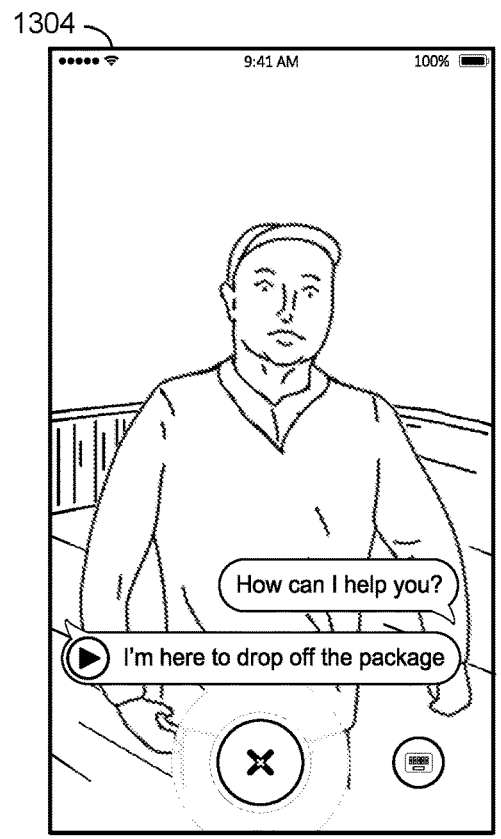
Figure 13C:
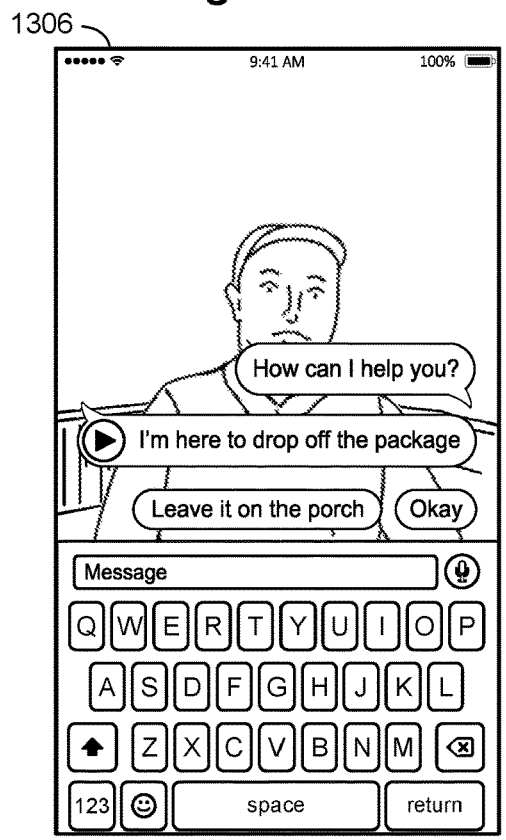
Figure 13D:

FIGS. 13A-D illustrate representative user interfaces for interacting with a visitor by way of a conversation in accordance with some implementations. FIG. 13A includes an interface screen 1302 that includes a Talkback affordance for initiating a talkback conversation, an Assistant affordance for initiating an Assistant-led conversation, and an Ignore affordance for ignoring the call. In some implementations, the interface includes a crop of the visitor's face. FIG. 13B includes an interface screen 1304, which depicts an Assistant call including a live transcription of an interaction between the Assistant (e.g., "How can I help you?") and the visitor (e.g., "I'm here to drop off the package"). In some implementations, the visitor's message is an audio message, and the interface includes a play button by the message which controls playback of the audio recording. FIG. 13C illustrates an interface 1306 for responding to a message in a text-to-speech conversation with suggested replies (e.g., "Leave it on the porch" and "Okay"). FIG. 13D includes a live transcription of the interaction that started in FIG. 13C, with the user having selected the "Leave it on the porch" suggestion.

Figure 14:
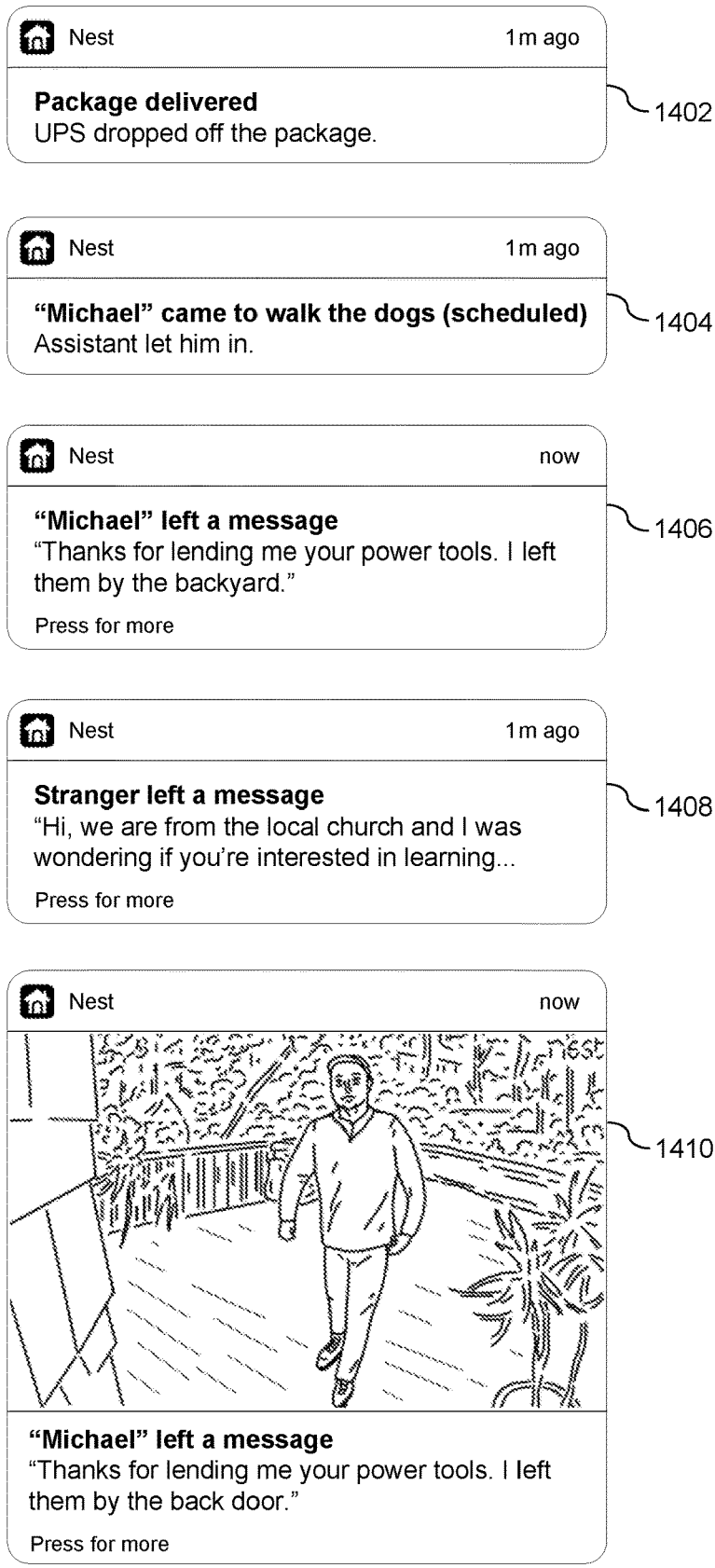
FIG. 14 illustrates representative summary notifications including interaction summaries (e.g., FIG. 9D, summary 988) in accordance with some implementations.

FIG. 14 illustrates representative summary notifications including interaction summaries (e.g., FIG. 9D, summary 988) in accordance with some implementations. In some implementations, summaries 1402-1408 include information identifying the visitor (e.g., "UPS," "Michael," and "Stranger"), as well as content information (e.g., a portion of the visitor's announcement message) and/or activity information (e.g., "left a message," "package delivered", and "assistant let him in"). In some implementations, summary 1410 additionally includes a video clip of the visitor.

In light of the principles described above with reference to the figures, we now turn to certain implementations.

Some implementations include a method of identifying and responding to a visitor to a smart home environment. In some implementations, the method includes: (1) obtaining a motion stream from a camera of the smart home environment, the camera having a field of view of an entryway of the smart home environment; (2) determining based on an analysis of the motion stream that a visitor is approaching the entryway; (3) performing a facial recognition operation based on one or more frames of the motion stream and determining based on an outcome of the facial recognition operation whether the person is known to the smart home environment; (4) initiating an observation window in response to the determination that a visitor is approaching; (5) during the observation window, obtaining and associating context information from one or more sensors of the smart home environment; and (6) at the end of the observation window, initiating a response to the visitor approaching the entry way based on the context information and the outcome of the facial recognition operation.

In some implementations, a "visitor" includes any of a resident of the smart home environment, a non-resident of the smart home environment, a known person (e.g., a person recognized by the electronic greeting system), and an unknown person (e.g., a person not recognized by the electronic greeting system) in a vicinity of an entryway of the smart home environment.

In some implementations, obtaining the motion stream from a camera includes detecting information regarding an amount of motion in a field of view of the camera. In some implementations, deriving the motion stream from a video stream of the camera includes comparing an amount of detected motion in a field of view of the camera to a threshold. For example, if an amount of detected motion is greater than a predetermined threshold, data associated with the detected motion is included in the motion stream for further analysis; otherwise, data associated with the detected motion is not included in the motion stream.

In some implementations, determining if a visitor is approaching the entryway includes comparing a dimension of a characteristic of the visitor (e.g., the visitor's path, the visitor's proximity to the entryway, a dimension of the visitor's face, a dimension of the visitor's body, and/or any other physical characteristic of the visitor, such as a height or shape of any part of the body, including the body as a whole) over time. For example, if a height or width of the visitor grows over time, or if a dimension of the visitor's face increases over time, the visitor is determined to be approaching the entryway. Additionally or alternatively, if the dimension of the characteristic of the visitor exceeds a threshold, the visitor is determined to be approaching the entryway.

In some implementations, the method further includes capturing from the motion stream a crop of a face of the visitor when a dimension of the face exceeds a threshold proportion of a frame of the motion stream, or when a dimension of the face exceeds a threshold.

In some implementations, determining that a visitor is approaching the entryway includes detecting the visitor entering an activity area in proximity to the entryway. In some implementations, dimensions and location of an activity area depend on the geography of the entryway and proximity of the entryway to public spaces. In some implementations, a location of an activity area depends on the location of a delivered package. For example, when a package is delivered in a vicinity to the entryway, the electronic greeting system instantiates an activity area around the package, including a predetermined buffer area surrounding the package. When a visitor is determined to have entered the predetermined buffer area, the electronic greeting system determines that the visitor is approaching the entryway. In some implementations, the determination that the visitor has entered the activity area is made in addition or in the alternative to any determination that the visitor is approaching the entryway. For example, if the visitor is determined to be approaching the entryway but does not enter the activity area surrounding a package, only the approach determination is made. Further, if the visitor enters the activity area surrounding a package but is not determined to be approaching the entryway (e.g., if a package has been delivered relatively far from the entryway), only the activity area breach determination is made. In some implementations, an activity area is defined from the location of any sensitive object in proximity to the entryway (e.g., flowers, lawn ornaments, or any other objects which the user may desire to protect from vandalism or theft).

In some implementations, upon a determination that a visitor is approaching the entryway, the method additionally includes automatically switching from the camera that was used to obtain the motion stream to a camera that is better situated to capture images of the visitor's face, such as a doorbell camera. In some implementations however, only one camera is used for both obtaining the motion stream and capturing the visitor's face.

In some implementations, a length of the observation window is predefined to correspond to a reasonable amount of time for the visitor to complete the approach to the entryway, or to reach a threshold distance to the entryway. For example, a visitor approaching an entryway located at the end of a long walkway is given more time to reach the entryway (or a threshold distance from the entryway) than a visitor approaching an entryway located at the end of a shorter walkway.

In some implementations, the method additionally or alternatively includes initiating the observation window in response to a determination that the visitor is within a threshold distance to the entryway, where the threshold is predetermined based on a layout of the entryway. In some implementations, the observation window is initiated when the visitor is close enough to the entryway to enable an interaction with the electronic greeting system (e.g., a doorbell press or verbal communication). In some implementations, the visitor is determined to have reached the threshold distance to the entryway based on a range sensor, such as a passive infrared ("PIR") sensor, or radar.

In some implementations, context information is based on a detected announcement event (e.g., a doorbell press, a door knock, a keypad entry, or a verbal announcement); a facial recognition analysis; one or more behavior characteristics of the visitor; one or more clothing characteristics of the visitor; a time of day during which the visitor approaches the entryway; a verbal announcement of the visitor; proximity in time to a prescheduled event; proximity in time to a prescheduled status of the smart home environment; a status or location of the user; and/or a timing of the detected visitor action compared to a timing of the identification of the motion event involving the visitor approaching the entryway.

In some implementations, context information includes a detected announcement event. Example announcement events include a doorbell press, a door knock, a keypad entry, a remote control operation, or any other kind of active interaction between the visitor and the electronic greeting system. In some implementations, context information includes a lack of detected announcement events (e.g., a visitor lingers by the entryway without pressing the doorbell) for more than a predetermined threshold of time. In some implementations, the announcement is part of a pre-assigned pattern of events associated with a known visitor (e.g., a personalized knock or doorbell ring pattern). In some implementations, the announcement is a pre-assigned verbal announcement associated with a known visitor. For these implementations, an audio sensor (e.g., a microphone) detects an audio signal and the processor performs an audio recognition analysis to determine whether the verbal announcement matches any known announcements stored in memory. In some implementations, the audio recognition analysis determines whether the visitor's voice matches a known voice stored in memory. In some implementations, the audio recognition analysis determines whether the visitor's words match a known pattern of words stored in memory (e.g., "It's Matt," "I'm here for the barbeque," or "The password is Bosco.").

In some implementations, context information includes identity data based on a facial recognition analysis. In some implementations, face images are stored in a database. In some implementations, the user adds new face images to the database by registering automatically cropped images of new faces from new or previously unregistered visitors to the smart home environment. In other implementations, the user adds new face images by registering potential visitors independently of whether they are in a vicinity of the entryway. For example, at a time or location not involving a visit, the user may capture an image of a potential visitor's face so that when the potential visitor visits the smart home environment at a future time, the smart home environment will recognize the potential user and provide appropriate context information based on the facial recognition. In some implementations, in addition or in the alternative to identity data (e.g., "Matt is at the front door."), context information includes a classification of the visitor (e.g., "A known visitor is at the front door," or "An unknown visitor is at the front door.") based on whether the visitor's face is recognized. For example, if the visitor's face is recognized, the context information includes a "known" status, and if the visitor's face is not recognized, the context information includes an "unknown" status for the visitor. Additionally or alternatively, the identity data or classification data includes further description of the visitor based on a result of the facial recognition analysis (e.g., "The pool cleaner is at the front door.").

In some implementations, context information includes one or more behavior characteristics of the visitor. For example, a behavior characteristics includes holding an object (e.g., a package, a clipboard, or any other object that suggests or identifies a reason for the visitor's presence). As a further example, a behavior characteristic includes lingering in an activity area (e.g., an area defined by a threshold distance from the entry way or from an object such as a delivered package) for a time period greater than a predetermined threshold.

In some implementations, context information includes one or more clothing characteristics of the visitor. For example, a clothing characteristic includes a uniform (e.g., worn by a delivery person). Further examples include clothing categories, such as business clothing, casual clothing, and suspicious clothing (e.g., an article of clothing covering the face, dark clothing during night hours or in dark lighting conditions, and gang-related clothing).

In some implementations, context information includes a time of day during which the visitor approaches the entryway. For example, a level of suspicion may be lower during the day and higher at night. In some implementations, "day" and "night" are differentiated by predetermined times. In other implementations, "day" and "night" are differentiated by sensing an amount of light in the field of view of the entry way. Sensing an amount of light in the field of view is accomplished by, for example, using a light sensor in proximity to the entry way, or by analyzing a brightness level in the one or more frames of the motion stream. In some implementations, visibility-based context information is weighted based on intermediate amounts of brightness (e.g., during dusk and dawn, or during cloudy days).

In some implementations, context information includes audio data, such as a verbal announcement (examples of which are described above). Further examples include background noise from sources other than the visitor (e.g., a barking dog, a police siren, or any other sound that may provide context for the visit).

In some implementations, context information includes a proximity in time to a prescheduled event. For example a dog walker may be scheduled to arrive at a prearranged time to pick up the dog. A delivery person may be scheduled to deliver a package at an expected time. A service person (or any other known person) may be scheduled to arrive during an expected time or timespan (e.g., every Tuesday between 2-4 pm to clean the pool, the first Saturday of each month to service the lawn, or a one-time visit arranged in advance for any other purpose).

In some implementations, context information includes a proximity in time to a prescheduled status of the smart home environment. For example, the smart home environment may be prescheduled to be unoccupied (i.e., the occupants are away), between certain hours (e.g., between 9:00 am and 6:00 pm). As a further example, the smart home environment may be in a do-not-disturb mode (e.g., while a baby is sleeping, or during quiet hours during which the occupants wish to be left alone).

In some implementations, context information includes a status or location of the user. Example user statuses include a do-not-disturb status, an away status, and/or an at-home status. In some implementations, a location sensor of the client device provides user location information to the electronic greeting system. In other implementations, the user manually notifies the electronic greeting system of the user's location and/or status.

In some implementations, context information includes any combination of the above examples. In some implementations, individual subsets of context information are weighted, and the context information is a weighted combination of the individual subsets of context information. For example, brightness information or time-of-day information may be weighted more heavily than identity information (e.g., if the pool cleaner approaches the entryway in the middle of the night, the time-of-day information is more relevant in determining contextual information for the approaching visitor, and is therefore more heavily weighted).

In some implementations, the observation window ends at the earlier of: (1) a visitor announcement (e.g., a doorbell press or knocking event); and (2) a predetermined time threshold (e.g., the visitor has lingered for more than the predetermined time threshold without making an announcement). In some implementations, the predetermined time threshold is dynamic, and it depends on the context information (e.g., longer observation windows when the context information suggests a higher level of safety or concern, and shorter observation windows when the context information suggests a lower level of safety or concern).

Some implementations include a method of interacting with a visitor to a smart home environment via an electronic greeting system of the smart home environment. In some implementations, the method includes: (1) obtaining motion data from a sensor of the smart home environment; (2) identifying, based on analysis of the motion data, a motion event involving a visitor; (3) obtaining context information from the smart home environment for the motion event; (4) based on the context information, identifying a plurality of appropriate actions available to a user of a client device for interacting with the visitor via the electronic greeting system; and (5) causing the identified actions to be presented to the user of the client device.

In some implementations, obtaining motion data includes analyzing a plurality of image frames to determine whether motion between two or more frames of the plurality of frames satisfies motion criteria. In some implementations, pixel motion is compared between subsequent frames. In other implementations, image differencing is performed between a current frame and a reference image.

In some implementations, obtaining motion data includes analyzing infrared data from an infrared sensor (e.g., a PIR sensor) to determine whether a difference in infrared data satisfies motion criteria. In some implementations, obtaining motion data includes analyzing data from a motion sensor to determine whether the motion data satisfies motion criteria.

In some implementations, identifying the motion event includes detecting the visitor entering an activity area (defined above) in proximity to the entryway, detecting a face of the visitor and/or detecting at least one of a height, shape, and movement characteristic of the visitor, as described above.

In some implementations, identifying the motion event includes any of the determinations described above relating to a visitor approaching the entryway or entering an activity area. In other words, when the electronic greeting system determines that a visitor is approaching the entryway or entering an activity area, a motion event is triggered.

In some implementations, obtaining context information from the smart home environment for the motion event includes obtaining any of the context information described above. In other words, when a motion event is identified or triggered, any of the context information described above is obtained by the electronic greeting system.

Based on the context information, the electronic greeting system identifies a plurality of appropriate actions available to a user of the client device for interacting with the visitor via the electronic greeting system. An action is defined as "appropriate" if it is relevant, applicable, useful, pertinent, and/or suitable for responding to the visitor depending on the context information. In some implementations, a collection of actions is stored in a database and ranked in terms of their applicability, relevance, and/or usefulness to a present situation involving a specific visitor and specific context information. The ranked actions are then ordered based on the ranking. In these implementations, an action is defined as "appropriate" if it is ranked relatively higher than another action. In some implementations, the higher an action is ranked, the more appropriate the action is considered to be. In some implementations, an action is defined as "appropriate" if its rank is above a predetermined threshold (e.g., the ten highest ranked actions), with a subset of appropriate actions (e.g., three actions) being presented to the user. In other implementations, the threshold is determined based on a number of actions that can be presented to the user in a single user interface of the client device (e.g., if the user interface can only display three actions at once, then the three highest ranked actions are determined to be "appropriate"), and all of the appropriate actions are simultaneously presented to the user in the same user interface. In some implementations, a number of actions to be presented to the user is based on an amount of space available in a quick action area of a user interface of the client device.

In some implementations, appropriate actions include one or more communication-based actions. In some implementations, the electronic greeting system speaks to the visitor using a synthesized voice. In other implementations, the electronic greeting system outputs a pre-recorded message to the visitor, recorded in advance by the user. Examples of communication-based actions include communicating a message to the visitor regarding a status of the user (e.g., "Matt is busy," or "Matt will be right there"); communicating a message to the visitor directing the visitor to perform an action (e.g., "Please leave the package," "Come back later," or "Come in and take the dog"); communicating a customized message to an expected or unexpected visitor, such as a response to a salesperson (e.g., "Sorry, we are not interested"), a greeting (e.g., "Welcome, please join us in the backyard"), or a prompt (e.g., "Should I contact the Homeowner?" or "What is the password?"); and communicating a message to the visitor directing the visitor to leave a message for the user. In some implementations, if a visitor leaves a message for the user, the electronic greeting system sends the message to the user's device. If the user is monitoring the client device, the user can watch and/or listen to the message as the message is being received. Otherwise, the message is recorded, by the client device or by the electronic greeting system, for future retrieval by the user. In some implementations, the electronic greeting system identifies the user to the visitor by referring to the user's name, or by using a generic placeholder (e.g., "Homeowner"), depending on the obtained context information. For example, if the visitor is known, the electronic greeting system uses the user's name, but if the visitor is unknown, the electronic greeting system refers to the user by a generic placeholder. In some implementations, the electronic greeting system refers to the user by name (e.g., if the user is known). In some implementations, the electronic greeting system refers to the user by other descriptive attributes (e.g., "Hello, person in the red hoody") depending on the context information (e.g., if the user is away, a package is left by the entryway, and an unknown visitor enters an activity area around the packer, the system communicates to the visitor that the visitor is recognized).

In some implementations, customized messages are pre-programmed, allowing the user to select them from a list. In other implementations, a customized message is communicated through the client device in real time. For example, the user composes a customized message at the client device by directly entering a text message or by using a speech-to-text application of the client device. The user-composed message is then converted to an audio message by a text-to-speech application at the electronic greeting system, and the audio message is communicated to the visitor through a speaker located near the entryway. In some implementations, the visitor's response is recorded and converted to a text message by a speech-to-text application at the electronic greeting system or at the client device, and the text message is presented to the user through a user interface of the client device. In some implementations, the visitor's message is transmitted in an audio format to the client device, and presented to the user as an audio message. In some implementations, if the visitor speaks in a language that the user does not understand, or vice versa, the messages are translated by a translation application at the electronic greeting system or at the client device.

In some implementations, in addition or in the alternative to an audio communication, the electronic greeting system presents a visual communication to the visitor, such as an video message recorded by the user at the client device, a preprogrammed video message, or a visual representation of the user's text messages. In some implementations, the visual communication is presented to the visitor on a display mounted near the entryway.

In some implementations, appropriate actions include one or more action-based actions. Examples of action-based actions include adjusting a security level of the smart home environment (e.g., locking or unlocking a door, adjusting the brightness level of one or more lights in the entryway or one or more lights in other areas of the smart home environment by dimming them or turning them on or off, adjusting an alarm sensitivity level); alerting law enforcement personnel (e.g., calling 911); alerting a preselected contact of the user (e.g., a trusted neighbor or a neighborhood watch contact); capturing image or video data of the visitor and recording it, sending it to the authorities, or sending it to the preselected contact of the user; or turning on an alarm of the smart home environment.

In some implementations, appropriate actions include one or more person-specific actions. Examples of person-specific actions include actions that are based on a detected identity of the visitor (e.g., detected based on facial recognition, a personalized doorbell push-button pattern, a personalized keypad passcode, or other examples discussed above); whether the visitor is classified as known or unknown (e.g., "Come around to the back" vs. "Please wait for assistance"); whether the visitor is expected or unexpected (e.g., "Come in and take the dog" vs. "You appear to be early for the dog walking appointment"); or what the visitor is doing (e.g., present in an activity area without announcing, entering an activity area when there is a package, or lingering near the entryway for longer than a threshold). In some implementations, a visitor who is classified as having an unknown identity can still be classified as being an expected visitor based on other factors, such as a uniform (e.g., denoting a pool cleaning or dog walking service) or an object carried by or accompanying the visitor (e.g., pool cleaning equipment or a dog leash).

In some implementations, appropriate actions include one or more location-specific actions. Examples of location-specific actions include actions that depend on a location of the entryway, such as a first subset of actions for a front door (e.g., communication-based greetings) versus a second subset of actions for a back door or an internal door (e.g., action-based security functions, such as sounding an alarm).

In some implementations, appropriate actions include one or more building-specific actions. Examples of building-specific actions include actions that are based on whether the smart home environment is a residential house, condo, or apartment (e.g., having home and away hours and various residential-based actions), or a workplace (e.g., having open and closed hours and various workplace-based actions). Further examples of building-specific actions include actions that are based on a relative safety level of the neighborhood or geographic area in which the smart home environment is located (e.g., communication-based greetings for safe areas vs. action-based security functions for unsafe areas).

In some implementations, appropriate actions include one or more user disposition-specific actions. Examples of user disposition-specific actions include actions for users who feel unsafe (e.g., a user who is home alone in an unsafe neighborhood may wish to have quicker access to action-based security functions), and actions for users who merely wish to monitor visitors (e.g., a user who is at work and merely wishes to monitor home deliveries may wish to have quicker access to communication-based greetings).

As discussed above, the electronic greeting system identifies a plurality of appropriate actions available to the user of a client device for interacting with the visitor via the electronic greeting system. In some implementations, the identification is based on an ordered ranking of actions based on the context information. In some implementations, the identification is further based on customized user preferences for different situations (e.g., a user may decide to always have the alarm action quickly available when home alone, as discussed above). The electronic greeting system proceeds to cause the identified actions to be presented to the user of the client device. In some implementations, a number of actions to be presented to the user is based on an amount of space available in a quick action area of a user interface of the client device. In some implementations, a amount of space taken up by the quick action area of the user interface is proportional to the size of the user interface. For example, for client devices that have relatively large screens, the quick action area of the user interface is more spacious, thereby allowing for more actions to be presented to the user, compared to client devices that have relatively smaller screens. In some implementations, a size of the quick action area of the user interface (and, therefore, the number of actions that can be simultaneously presented to the user) is customizable by the user.

The electronic greeting system is further configured to receive a selection of an identified action from the user of the client device, and cause the action to be performed. In some implementations, the system can accept a request by the user to display subsequent pluralities of appropriate actions if the user has not found a desired action. In some implementations, the system learns from past user selections of appropriate actions and adjusts future rankings of actions with similar context information accordingly. In some implementations, the system if further configured to receive a selection of an identified action from the user of the client device during a contemporaneous one-way or two-way audio communication session facilitated by the client device between the user and the visitor. In other words, for instances in which the user is having a audio conversation with the visitor and wishes to select an appropriate action during the conversation, the system allows the user to select an action (e.g., unlock the door, or take a picture) without having to leave the audio conversation.

In some implementations, the electronic greeting system is further configured to present an updated subset of actions to the user in accordance with new context information observed after an initial subset of actions has been presented to the user. For example, an initial subset of actions may include a communication-based actions (e.g., a greeting) and an action-based security action (e.g., sound an alarm). If the user sends a greeting and the visitor responds with identifying information (e.g., by showing credentials, looking more directly into the camera, or entering a passcode into a keypad), the electronic greeting system may present an updated subset of actions which are purely communication-based (e.g., a plurality of replies to the visitor's response). On the other hand, if the visitor fails to respond to a greeting, the electronic greeting system may present an updated subset of actions which are purely action-based (e.g., sounding an alarm or calling the authorities).

Although some of various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations were chosen in order to best explain the principles underlying the claims and their practical applications, to thereby enable others skilled in the art to best use the implementations with various modifications as are suited to the particular uses contemplated.

What is claimed is:

1. A method comprising:
   receiving, by a remote server system and from a video doorbell located at an entryway, an indication that a visitor activated the video doorbell;
   causing, by the remote server system, the video doorbell to output an audio greeting;
   receiving, by the remote server system and from the video doorbell, audio data that includes a voice response to the greeting from the visitor;
   determining, by the remote server and based on the voice response, a suggested audio response from a plurality of suggested audio responses; and
   causing, by the remote server system, the video doorbell to output the suggested audio response.

2. The method of claim 1, wherein the voice response is a first voice response, the method further comprising:
   after causing the video doorbell to output the suggested audio response, receiving, by the remote server system, a second voice response from the visitor; and
   storing, by the remote server system, the second voice response as an audio message.

3. The method of claim 2, further comprising:
   converting, by the remote server system, the audio message to text using speech-to-text; and
   sending, by the remote server system and to a device associated with a user associated with the video doorbell, the text of the audio message.

4. The method of claim 1,
   wherein the voice response includes an indication that the visitor is dropping off a package, and
   wherein the suggested audio response includes an indication of a location to leave the package.

5. The method of claim further comprising: receiving, by the remote server system and from the video doorbell, video data captured by the video doorbell;
   determining, by the remote server system and. based on the video data, that the visitor is approaching an entryway at which the video doorbell is located.

6. The method of claims, further comprising: responsive to determining that the visitor is approaching, causing the video doorbell, to initiate an observation window; during the observation window: continuously receiving, by the remote server system and from the video doorbell, additional video data; and determining, by the remote server system and using facial recognition, whether the visitor is a known visitor based On the additional video data.

7. The method of claim 6, further comprising:
   responsive to determining that the visitor is a known visitor, determining whether a pre-assigned verbal announcement is associated with the known visitor; and
   responsive to determining that the pre-assigned verbal announcement is associated with the known visitor, determining that the pre-assigned verbal announcement is the audio greeting.

8. The method of claim 6, wherein determining the suggested audio response is further based on whether the visitor is the known visitor.

9. The method of claim 5, further comprising:
   responsive to determining that the visitor is approaching the entryway, determining, by the remote server system, context information associated with the visitor, wherein the context information includes one or more of a facial recognition analysis result of the visitor, one or more behavioral characteristics of the visitor, one or more physical characteristics of the visitor, one or more clothing or accessory characteristics of the visitor, a time of day during which the visitor approaches the entryway, a day of the week during which the visitor approaches the entryway, proximity of a time at which the visitor approaches the entryway to a time of a prescheduled event, proximity of a time at which the visitor approaches the entryway to a time of a pre-scheduled status, a known or an unknown status of a user associated with the video doorbell, an expected or an unexpected status of the user,
   wherein determining the suggested audio response from the plurality of suggested audio responses is further based on the context information, wherein the plurality of suggested audio responses includes one or more of a status of the user, a request for the visitor to perform an action, a request for the visitor to leave a message, a preprogrammed customized communication, and an audio version of a user-composed text message.

10. A computing system comprising:
    one or more processors;
    a memory that stores instructions, wherein the instructions, when executed by the one or more processors, cause the one or more processors to:
    receive, from a video doorbell, an indication that a visitor activated the video doorbell;
    cause the video doorbell to output an audio greeting;
    receive, from the video doorbell, audio data that includes a voice response to the greeting from the visitor;
    determine, based on the voice response, a suggested audio response from a plurality of suggested audio responses; and
    cause the video doorbell to output the suggested audio response.

11. The computing system of claim 10, wherein the voice response is a first voice response, and wherein the instructions further cause the one or more processors to:
    after causing the video doorbell to output the suggested audio response, receive a second voice response from the visitor; and
    store the second voice response as an audio message.

12. The computing system of claim 11, further comprising:
    convert the audio message to text using speech-to-text; and send, to a device associated with a user associated with the video doorbell, the text of the audio message.

13. The computing system of claim 10,
wherein the voice response includes an indication that the visitor is dropping off a package; and
wherein the suggested audio response includes an indication of a location to leave the package.

14. The computing system of claim wherein the instructions further cause the one or more processors to: receive, from the video doorbell, video data captured by the video doorbell; determine, based on the video data, that the visitor is approaching an entryway at which the video doorbell is located.

15. The computing system of claim 14, wherein the instructions further cause the one or more processors to: responsive to determining that the visitor is approaching, cause the video doorbell, to initiate an observation window; during the observation window:
continuously receive, from the video doorbell, additional video data; and determine, using facial recognition, whether the visitor is a known visitor based on the additional video data.

16. The computing system of claim 15, wherein the instructions further cause the one or more processors to:
responsive to determining that the visitor is a known visitor, determine whether a pre-assigned verbal announcement is associated with the known visitor; and
responsive to determining that the pre-assigned verbal announcement is associated with the known visitor, determine that the pre-assigned verbal announcement is the audio greeting.

17. The computing system of claim 14, wherein the instructions further cause the one or more processors to:
responsive to determining that the visitor is approaching the entryway, determine context information associated with the visitor, wherein the context information includes one or more of a facial recognition analysis result of the visitor, one or more behavioral characteristics of the visitor, one or more physical characteristics of the visitor, one or more clothing or accessory characteristics of the visitor, a time of day during which the visitor approaches the entryway, a day of the week during which the visitor approaches the entryway, proximity of a time at which the visitor approaches the entryway to a time of a prescheduled event, proximity of a time at which the visitor approaches the entryway to a time of a prescheduled status, a known or an unknown status of a user associated with the video doorbell, an expected or an unexpected status of the user,
wherein the instructions cause the one or more processors to determine the suggested audio response from the plurality of suggested audio responses further based on the context information, wherein the plurality of suggested audio responses includes one or more of a status of the user, a request for the visitor to perform an action, a request for the visitor to leave a message, a preprogrammed customized communication, and an audio version of a user-composed text message.

18. A non-transitory computer-readable storage medium encoded with instructions that, when executed by one or more processors of a remote computing system, cause the one or more processors to:
receive, from a video doorbell, an indication that a visitor activated the video doorbell;
cause the video doorbell to output an audio greeting;
receive, from the video doorbell, audio data that includes a voice response to the greeting from the visitor;
determine, based on the voice response, a suggested audio response; and
cause the video doorbell to output the suggested audio response.

19. The non-transitory computer-readable storage medium of claim 18, wherein the voice response is a first voice response, and wherein the instructions further cause the one or more processors to:
after causing the video doorbell to output the suggested audio response, receive a second voice response from the visitor;
convert the second voice response to text using speech-to-text; and
send, to a device associated with a user associated with the video doorbell, the text of the second voice response.

20. The non-transitory computer-readable storage medium of claim 18,
wherein the voice response includes an indication that the visitor is dropping off a package; and
wherein the suggested audio response includes an indication of a location to leave the package.

* * * * *

UNITED STATES PATENT AND TRADEMARK OFFICE
CERTIFICATE OF CORRECTION

| | | |
|---|---|---|
| PATENT NO. | : 11,356,643 B2 | |
| APPLICATION NO. | : 17/400887 | |
| DATED | : June 7, 2022 | |
| INVENTOR(S) | : Jason Evans Goulden et al. | |

It is certified that error appears in the above-identified patent and that said Letters Patent is hereby corrected as shown below:

In the Claims

Column 57, Lines 58 and 59, after "doorbell;" before "determining" enter --and--

Column 57, Lines 58 and 59, after "system" before "based" delete "and." enter "and"

Column 57, Line 62, after "comprising:" before "responsive" begin a new line

Column 57, Line 64, after "video" before "to" delete "doorbell," enter --doorbell--

Column 57, Line 64, after "window;" before "during" enter --and-- and begin a new line Column 57, Line 65, after "window:" before "continuously" begin a new line Column 57, Line 67, after "and" before "determining" begin a new line Column 58, Line 2, after "based" before "the" delete "On" enter --on--

Column 59, Lines 15 and 16, after "to:" before "responsive" begin a new line

Column 59, Line 17, after "video" before "to" delete "doorbell," enter --doorbell--

Column 59, Lines 17 and 18, after "window;" before "during" enter --and-- and begin a new line Column 59, Line 20, after "and" before "determine" begin a new line Signed and Sealed this
Twenty-sixth Day of July, 2022

Katherine Kelly Vidal
*Director of the United States Patent and Trademark Office*